(12) United States Patent
Nakanishi et al.

(10) Patent No.: US 6,170,924 B1
(45) Date of Patent: Jan. 9, 2001

(54) BRAKE FORCE CONTROL APPARATUS ACCURATELY DETECTING AN AMOUNT OF BRAKE OPERATION INTENDED BY A VEHICLE OPERATOR

(75) Inventors: Nobuyasu Nakanishi, Toyota; Akiyoshi Yamada, Toyoake; Satoshi Shimizu, Susono; Hideyuki Aizawa, Susono; Masahiro Hara, Susono, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/108,007

(22) Filed: Jun. 30, 1998

(30) Foreign Application Priority Data

| Jul. 8, 1997 | (JP) | 9-182822 |
|---|---|---|
| Jul. 8, 1997 | (JP) | 9-182823 |

(51) Int. Cl.[7] ............... B60T 8/60
(52) U.S. Cl. ............... 303/155; 303/115.5; 303/113.4
(58) Field of Search ............... 303/125, 155, 303/166, 165, 113.4, 146, DIG. 1, DIG. 2, DIG. 3, DIG. 4, 198, 116.2, 115.4, 115.5

(56) References Cited

U.S. PATENT DOCUMENTS

| 5,158,343 | * 10/1992 | Reichelt et al. ............... 303/113 SS |
| 5,261,730 | 11/1993 | Steiner et al. . |
| 5,350,225 | 9/1994 | Steiner et al. . |
| 5,367,942 | 11/1994 | Nell et al. . |
| 5,427,442 | 6/1995 | Heibel . |
| 5,445,444 | 8/1995 | Rump et al. ............... 303/125 |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,549,369 | 8/1996 | Rump et al. . |
| 5,556,173 | 9/1996 | Steiner et al. . |
| 5,564,797 | 10/1996 | Steiner et al. . |
| 5,567,021 | * 10/1996 | Gaillard ............... 303/113.4 |

(List continued on next page.)

FOREIGN PATENT DOCUMENTS

| 0711695 | 5/1996 | (EP) . |
| 2282649 | 4/1995 | (GB) . |
| 2295209 | 5/1996 | (GB) . |
| 2 297 134 | 7/1996 | (GB) . |
| 2 303 186 | 2/1997 | (GB) . |
| 61-268560 | 11/1986 | (JP) . |
| 3-227766 | 10/1991 | (JP) . |
| 4-121260 | 4/1992 | (JP) . |
| 4-334649 | 11/1992 | (JP) . |
| 5-97022 | 4/1993 | (JP) . |
| 7-81540 | 3/1995 | (JP) . |
| 7-329766 | 12/1995 | (JP) . |
| 8-34326 | 2/1996 | (JP) . |
| 8-40229 | 2/1996 | (JP) . |
| 8-295224 | 11/1996 | (JP) . |
| WO96/06763 | 3/1996 | (WO) . |
| 97 41014 | 11/1997 | (WO) . |

*Primary Examiner*—Matthew C. Graham
*Assistant Examiner*—Robert A. Siconolfi
(74) *Attorney, Agent, or Firm*—Kenyon & Kenyon

(57) ABSTRACT

A brake force control apparatus having a pump for pumping up brake fluid from a fluid pressure passage connecting a master cylinder and a wheel cylinder is provided which can accurately detect an amount of brake operation intended by a driver during execution of a brake assist control. The brake assist control is achieved by supplying the brake fluid delivered by the pump to the wheel cylinder when an emergency brake operation is performed by a driver. The brake force control apparatus has a control signal generator and a fluid pressure controller. The control signal generator generates a control signal by compensating a decrease generated in the output signal when the pump pumps up the brake fluid from the fluid pressure passage. The fluid pressure controller performs the brake assist control by using the control signal.

16 Claims, 29 Drawing Sheets

U.S. PATENT DOCUMENTS

| | | |
|---|---|---|
| 5,584,542 | 12/1996 | Klarer et al. . |
| 5,586,814 * | 12/1996 | Steiner .............................. 303/116.2 |
| 5,588,718 * | 12/1996 | Winner et al. .................... 303/113.1 |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,727,854 * | 3/1998 | Pueschel et al. ..................... 303/155 |
| 5,772,290 | 6/1998 | Heibel et al. . |
| 5,779,329 * | 7/1998 | Takeshima ........................... 303/155 |
| 5,978,725 * | 11/1999 | Kagawa ............................... 303/125 |

* cited by examiner

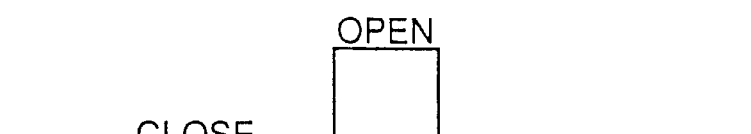
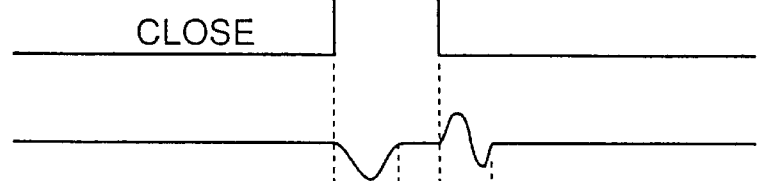
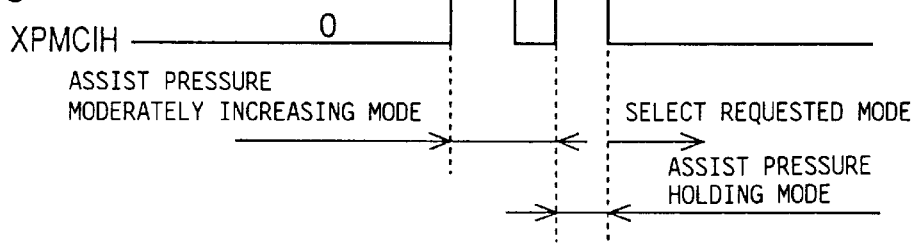

FIG. 30A
SRC
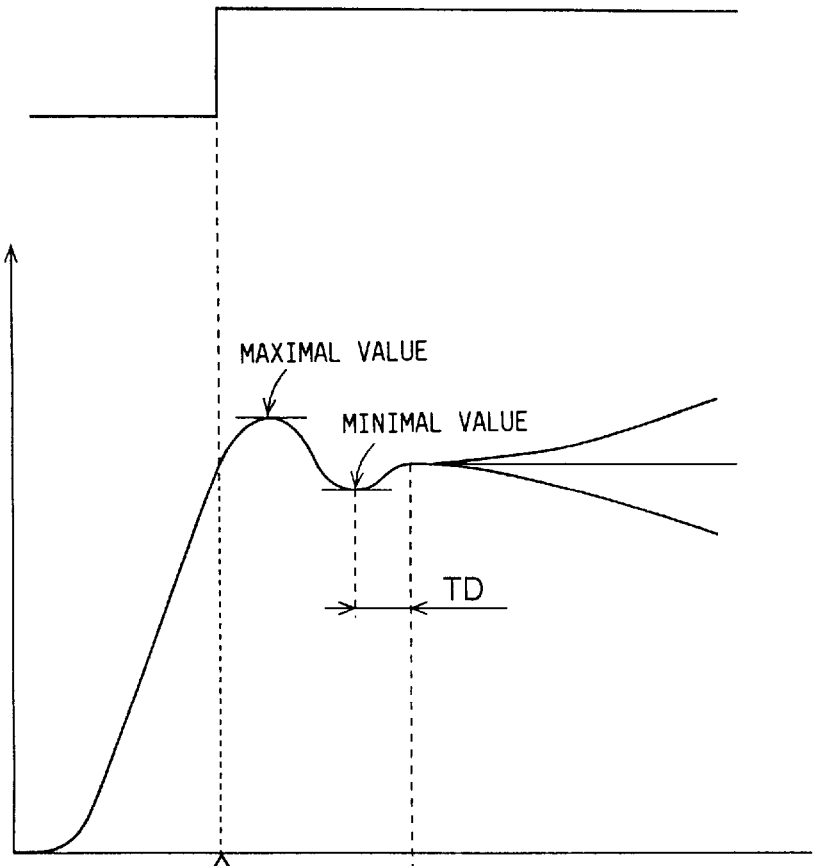
FIG. 30B
pMC
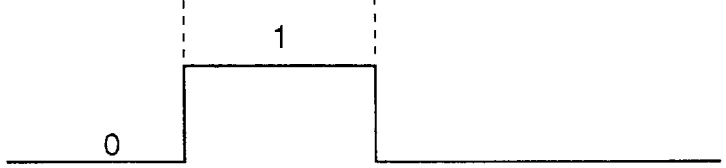
FIG. 30C
XPMCIH

BRAKE FORCE CONTROL APPARATUS ACCURATELY DETECTING AN AMOUNT OF BRAKE OPERATION INTENDED BY A VEHICLE OPERATOR

BACKGROUND OF THE INVENTION

1. Field of the Invention

The present invention is related to a brake force control apparatus, and particularly to a brake force control apparatus which is suitable for an apparatus used for controlling a brake force of a vehicle.

2. Description of the Related Art

Conventionally, as disclosed in Japanese Laid-Open Patent Application No. 4-121260, a brake force control apparatus is known which generates an increased brake fluid pressure as compared to that generated during a normal brake operation when a brake pedal is depressed at a speed exceeding a predetermined speed. A driver of a vehicle operates a brake pedal at a high speed when a rapid increase in a brake force is desired. According to the above-mentioned brake force control apparatus, when such a brake operation (hereinafter referred to as an emergency brake operation) is performed, it is possible to generate a brake force which appropriately responds to a request of the driver by generating an increased brake fluid pressure as compared to that generated during the normal brake operation.

The control for generating the increased brake fluid pressure as compared to that generated during a normal brake operation (hereinafter referred to as a brake assist (BA) control) can be achieved, for example, in a system in which a master cylinder and a wheel cylinder are connected via a first solenoid valve, the master cylinder and an inlet of a pump are connected via a second solenoid valve, and an outlet of the pump and the wheel cylinder are directly connected.

According to the above-mentioned system, the master cylinder and the wheel cylinder can be connected to each other and the master cylinder and the pump can be disconnected from each other by opening the first solenoid valve and closing the second solenoid valve. In this case, it is possible to generate a wheel cylinder pressure $P_{W/C}$ which is equal to a master cylinder pressure $P_{M/C}$. Thus, the above-mentioned system can operate as a normal brake apparatus by achieving the above-mentioned state.

Additionally, in the above-mentioned system, the master cylinder and the wheel cylinder can be disconnected from each other and brake fluid in the master cylinder can be pressurized by the pump and supplied to the wheel cylinder by closing the first solenoid valve, opening the second solenoid valve, and setting the pump in operation. In this case, it is possible to generate a wheel cylinder pressure $P_{W/C}$ which is higher than the master cylinder pressure $P_{M/C}$.

In the above-mentioned system, the master cylinder pressure $P_{M/C}$ can be detected by, for example, providing a fluid pressure sensor in a fluid pressure passage which connects the master cylinder and the first solenoid valve. If the master cylinder pressure $P_{M/C}$ can be detected during execution of the brake assist control, it is possible to detect a brake operation performed by the driver after the brake assist control is started based on the detected value.

However, in the above-mentioned system, that is, in a system in which the brake fluid is pumped up by the pump from the master cylinder, a decrease, which is not due to a change in the amount of brake operation, is generated in the master cylinder pressure $P_{M/C}$. Additionally, in the above-mentioned system, a pulsation which is not due to a change in the amount of brake operation (hereinafter simply referred to as a pulsation) is generated in the master cylinder pressure immediately after the pump has stopped to pump up the brake fluid.

Thus, in the above-mentioned system, a brake operation performed by the driver during execution of brake assist control cannot be accurately detected by simply detecting the master cylinder pressure $P_{M/C}$ using the fluid pressure sensor.

Further, in the above-mentioned system, there is a period in which the master cylinder pressure does not correspond to the amount of brake operation intended by the driver immediately after the pump has started pumping the brake fluid and immediately after the pump has stopped to pump up the brake fluid, as described above. Accordingly, it is necessary to prevent an erroneous detection of the brake operation during the period in which the master cylinder pressure does not correspond to the amount of brake operation, in order to accurately detect the brake operation intended by the driver in the above-mentioned system.

SUMMARY OF THE INVENTION

It is an object of the present invention to provide a brake force control apparatus comprising a pump for pumping up brake fluid from a fluid pressure passage connecting a master cylinder and wheel cylinder which can accurately detect an amount of brake operation intended by a driver during execution of the brake assist control.

It is another object of the present invention to provide a brake force control apparatus of the above-mentioned type which can prevent an erroneous detection of an amount of brake operation intended by a driver during execution of the brake assist control.

The above objects can be achieved by a brake force control apparatus comprising:

a master cylinder;

a wheel cylinder;

a fluid pressure passage connecting the master cylinder and the wheel cylinder;

a pump for pumping up brake fluid from the fluid pressure passage a fluid pressure sensor for generating an output signal corresponding to a master cylinder pressure;

a brake assist control means for supplying the brake fluid delivered by the pump to the wheel cylinder when an emergency brake operation is performed by a driver based on the output signal; and inhibiting means for inhibiting the output signal from being used when the master cylinder pressure fluctuates due to pumping up of the brake fluid by the pump.

The above objects can also be achieved by a brake force control apparatus which comprises a pump for pumping up brake fluid from a fluid pressure passage connecting a master cylinder and a wheel cylinder and a fluid pressure sensor for generating an output signal corresponding to a master cylinder pressure and performs a brake assist control for supplying the brake fluid delivered by the pump to the wheel cylinder when an emergency brake operation is performed by a driver, further comprising:

control signal generating means for generating a control signal to compensate a decrease generated in the output signal when the pump pumps up the brake fluid from the fluid pressure passage; and fluid pressure control means for performing the brake assist control based on the control signal.

In the present invention, when an emergency brake operation is performed by a driver, the brake assist control is started. During execution of the brake assist control, the brake fluid pumped up by the pump is supplied to the wheel cylinder, and thereby a relatively high wheel cylinder pressure is generated. After the BA control is started, the driver increases a brake operating force when a greater brake force is required and decreases the brake operating force when a smaller brake force is required. When these brake operations are performed during execution of the BA control, a change is generated in the master cylinder pressure, that is, in the output signal of the fluid pressure, in accordance with the brake operation. Thus, the driver's intention can be detected based on the output signal of the fluid pressure sensor.

In the brake force control apparatus of the present invention, the brake fluid supplied to the wheel cylinder is pumped up by the pump from the fluid pressure passage connecting the master cylinder and the wheel cylinder. When the brake fluid is pumped up by the pump from the fluid pressure passage, the master cylinder pressure is temporarily decreased. The output signal of the fluid pressure sensor reflects the change in the master cylinder pressure which is associated with the operation of the pump, as well as the change in the master cylinder pressure which is associated with the brake operation. The control signal is generated by eliminating the influence of the operation of the pump from the output signal of the fluid pressure sensor. Thus, the control signal accurately reflects the change in the master cylinder pressure which is associated with the brake operation performed by the driver.

In the present invention, the wheel cylinder pressure is controlled based on the control signal during execution of the BA control. Thus, according to the present invention, the wheel cylinder can be appropriately controlled in accordance with the brake operation performed by the driver.

The control signal generating means may comprise minimal value detecting means for detecting a minimal value which is generated in the output signal after the pump has started to pump up the brake fluid; amount of decrease detecting means for detecting an amount of decrease generated in the output signal until the output signal reaches the minimal value; and first generating means for correcting the output signal based on the amount of decrease after the minimal value is detected.

In the present embodiment, when the pump starts to pump up the brake fluid, the output signal of the fluid pressure sensor decreases (hereinafter, this decrease is referred to as pumping-up associated decrease). When the output signal starts to be increased after being decreased due to the pumping-up associated decrease, that is, when a minimal value is detected in the output signal, it can be determined that the amount of brake operation is being increased. In this case, the amount of decrease which is generated in the output signal at a time when the minimal value is detected can be regarded as a decrease due to the pumping-up associated decrease. In the present invention, the control signal is generated based on the amount of decrease so that the influence of the pumping-up associated decrease can be accurately eliminated from the control signal. Thus, according to the present invention, when the driver is increasing the amount of brake operation, the driver's intention can be accurately reflected in the control signal.

The control signal generating means may further comprise second generating means for maintaining the control signal at a constant value after the pump has started to pump up the brake fluid.

In the present invention, when the driver is increasing the amount of brake operation, the output signal starts to be increased after being temporarily decreased due to the pumping-up associated decrease after the pump starts to pump up the brake fluid. When the driver is maintaining the amount of brake operation, the output signal is maintained at a substantially constant value for a relatively long time after being decreased to some extent due to the pumping-up associated decrease. When the driver is decreasing the amount of brake operation, the output signal is further decreased after being decreased due to the pumping-up associated decrease. In this way, the output signal tends to be decreased immediately after the pump has started to pump up the brake fluid, independent of a change in the amount of brake operation. In the present invention, the control signal is maintained at a constant value when the pumping-up associated decrease is generated in the output signal. Thus, it is possible to prevent the control signal from being decreased when the amount of brake operation is being increased or maintained.

The control signal generating means may further comprise third generating means for setting the control signal to be equal to the output signal when the output signal exceeds a predetermined value.

In the present invention, when the output signal, which has been decreased due to the pumping-up associated decrease after the pump has started to pump up the brake fluid, is increased again to a level before the pumping-up associated decrease is generated, it can be determined that the driver is increasing the amount of brake operation. In such a case, the driver's intention can be accurately reflected in the control signal by setting the control signal to be equal to the output signal.

The control signal generating means may further comprise fourth generating means for, when a decrease exceeding a guard value is generated in the output signal, setting the control signal to a value which is a sum of the output signal and the guard value.

In the present invention, when the amount of decrease in the output signal exceeds the guard value after the pump has started to pump up the brake fluid, it can be determined that the driver is decreasing the amount of brake operation. In such a case, when the control signal is set to a value which is a sum of the output signal and the guard value, the influence of the pumping-up associated decrease can be eliminated from the control signal and the control signal can be decreased according to the same trend as that of the amount of the brake operation. Thus, according to the present invention, when the driver is increasing the amount of the brake operation, the driver's intention can be accurately reflected in the control signal.

The control signal generating means may further comprise first setting means for setting the guard value based on a time for which the pump continuously pumps up the brake fluid.

In the present invention, the control signal is maintained at a constant value until the amount of decrease in the output signal exceeds the guard value. If the guard value is excessively large, the control time is maintained to be constant for an excessively long time even when the driver is decreasing the amount of brake operation. On the other hand, if the guard value is excessively small, the amount of decrease in the output signal may reach the guard value while the output signal is being decreased due to the pumping-up associated decrease. Thus, the guard value is desired to be a value which is slightly greater than the amount of decrease generated in the output signal due to the pumping-up associated decrease.

The amount of decrease generated in the output signal due to the pumping-up associated decrease changes in accordance with a time for which the pump continuously pumps up the brake fluid (hereinafter referred to as pumping-up continuing time). Specifically, the amount of decrease in the output signal becomes greater as the pumping-up continuing time becomes longer and becomes smaller as the pumping-up continuing time becomes shorter. Thus, the guard value for maintaining the control signal to be constant is desired to be set in accordance with the pumping-up continuing time. In the present invention, the guard value is determined based on the pumping-up continuing time. Thus, according to the present invention, the influence of the pumping-up associated decrease can be correctly eliminated from the control signal and the driver's intention can be accurately reflected in the control signal.

The fluid pressure control means may achieve a plurality of modes having different times for which the pump continuously pumps up the brake fluid, and the control signal generating means may further comprise second setting means for setting the guard value based on the mode performed by the fluid pressure control means.

In the present invention, the guard value is desired to be a value slightly greater than the amount of decrease generated in the output signal due to the pumping-up associated decrease. The amount of the pumping-up associated decrease tends to become greater as the pumping-up continuing time becomes longer. The pumping-up continuing time uniquely corresponds to the mode which is performed. Accordingly, the amount of pumping-up associated decrease generated in the output signal is substantially unique to the mode which is performed. In the present invention, the guard value is determined based on the mode which is performed. Thus, according to the present invention, the influence of the pumping-up associated decrease can be correctly eliminated from the control signal and the driver's intention can be accurately reflected in the control signal.

The control signal generating means may further comprise initial fluid pressure detecting means for detecting an initial fluid pressure based on the output signal which is output by the fluid pressure sensor at a time when the pump starts to pump up the brake fluid; and third setting means for setting the guard value based on the initial fluid pressure.

In the present invention, the guard value is desired to be a value which is slightly greater than the amount of the pumping-up associated decrease generated in the output signal. The amount of the pumping-up associated decrease tends to become greater as a larger master cylinder pressure is generated at a time when the pump starts to pump up the brake fluid, that is, as a larger initial fluid pressure is generated. In the present invention, the guard value is determined based on the initial fluid pressure. Thus, according to the present invention, the influence of the pumping-up associated decrease can be correctly eliminated from the control signal and the driver's intention can be accurately reflected in the control signal.

The control signal generating means may comprise fifth generating means for maintaining the control signal at a constant value until a predetermined time has elapsed after the pump has stopped pumping up the brake fluid; and sixth generating means for setting the control signal to be equal to the output signal.

In the present invention, a pulsation is generated in the master cylinder pressure, and, thereafter, the master cylinder pressure corresponds to the amount of brake operation. Thus, when a predetermined time has elapsed after the pump has stopped pumping up the brake fluid, the amount of brake operation is accurately reflected in the output signal. In the present invention, after the pump has stopped pumping up the brake fluid, the control signal is set to be a value which is equal to the output signal after being maintained at a constant value for a predetermined time. Thus, according to the present invention, the amount of brake operation can be accurately reflected in the control signal before and after the pump stops pumping up the brake fluid.

The brake force control apparatus may further comprise a valve provided in the fluid pressure passage between the master cylinder and the wheel cylinder and the fluid pressure sensor and an inlet of the pump may be connected to a part of the fluid pressure passage between the valve and the master cylinder.

In the present invention, the master cylinder and the wheel cylinder are disconnected from each other by the valve. When the pump is operated in such a situation, the fluid pressure at a portion between the valve and the master cylinder tends to be decreased because the brake fluid in that portion is pumped up by the pump. Thus, in this case, the output signal of the fluid pressure sensor is decreased even if the amount of brake operation is not decreased. In the present invention, the control signal which accurately reflects the brake operation performed by the driver can be generated by correcting the output signal in the above-mentioned situation.

The above objects can also be achieved by a brake force control apparatus which comprises a pump for pumping up brake fluid from a fluid pressure passage connecting a master cylinder and a wheel cylinder and performs a brake assist control for supplying the brake fluid delivered by the pump to the wheel cylinder when an emergency brake operation is performed by a driver, further comprising:

a valve for connecting or disconnecting the fluid pressure passage and the pump;

control means for executing the brake assist control based on a master cylinder pressure; and inhibiting means for inhibiting execution of the brake assist control based on the master cylinder pressure for a predetermined inhibited period when the state of the valve is changed.

In the present invention, when the valve is changed from a closed state to an open state in a situation in which the pump is in operation, the pump starts to pump up the brake fluid in the fluid pressure passage. When the pump has started to pump up the brake fluid, the fluid pressure in the fluid pressure passage, that is, the master cylinder pressure, has started to be decreased due to the pumping-up associated decrease. For this reason, the master cylinder pressure does not accurately correspond to the amount of brake operation intended by the driver for a certain period after the valve is changed from a closed state to an open state.

When the valve is changed from an open state to a closed state after the pump has started to pump up the brake fluid, a flow of the brake fluid from the fluid pressure passage to the pump is prevented. In this case, a pulsation is generated in the fluid pressure within the fluid pressure passage. For this reason, the master cylinder pressure does not accurately correspond to the amount of brake operation intended by the driver for a certain period after the valve is changed from an open state to a closed state.

In the present invention, execution of the brake assist control based on the master cylinder pressure is inhibited for the inhibited period, that is, for the period during which the master cylinder pressure does not accurately correspond to the amount of brake operation intended by the driver after the state of the valve is changed. Accordingly, during execution of the brake assist control, it is possible to prevent an inappropriate process from being performed based on the master cylinder pressure which does not correspond to the amount of brake operation. That is, it is possible to prevent the master cylinder pressure from being reflected in the brake assist control in a situation where the master cylinder pressure does not accurately correspond to the amount of brake operation intended by the driver.

The brake force control apparatus may further comprise inhibited period setting means for setting the inhibited period based on at least one of the master cylinder pressure at a time when the pump starts to pump up the brake fluid and a change rate of the master cylinder pressure at that time.

In the present invention, the period during which the master cylinder pressure does not accurately correspond to the amount of brake operation becomes longer as the amount of brake operation is greater and as the amount of brake operation is increased at a higher rate. Before the pump starts to pump up the brake fluid, the amount of brake operation and the increasing rate thereof accurately correspond to the master cylinder pressure and the increasing rate thereof. Thus, the period during which the master cylinder pressure does not accurately correspond to the amount of brake operation becomes longer as a larger master cylinder pressure is generated at a time when the pump has started to pump up the brake fluid, and as the master cylinder pressure is increased at a higher rate at that time.

In the present invention, the inhibited period, that is, a period in which the master cylinder pressure is inhibited from being reflected in the brake assist control, is determined based on at least one of the master cylinder pressure at a time when the pump starts to pump up the brake fluid and the changing rate of the master cylinder pressure at that time. In this case, it is possible to achieve an accurate correspondence between the inhibited period and the period during which the master cylinder pressure does not accurately correspond to the amount of brake operation.

The brake force control apparatus may further comprise:

fluid pressure changing trend detecting means for detecting a changing trend in the master cylinder pressure;

inverting time detecting means for detecting an inverting time at which the master cylinder pressure changes its changing trend from decrease to increase after the pump has started to pump up the brake fluid based on the changing trend; and second inhibited time setting means for defining the inhibited period as a period after the inverting time until a predetermined time has elapsed.

In the present invention, when the pump starts to pump up the brake fluid, the master cylinder pressure is temporarily decreased due to the pumping-up associated decrease. Thus, the master cylinder pressure does not accurately correspond to the amount of brake operation immediately after the pump has started to pump up the brake fluid. The master cylinder pressure, which has been temporarily decreased due to the pumping-up associated decrease, starts to be increased when the amount of brake operation is increased. The master cylinder pressure returns to a value which accurately corresponds to the amount of brake operation when a predetermined time has elapsed after the master cylinder pressure has changed its changing trend to increase. In the present invention, the inhibited time, that is, a period in which the master cylinder pressure is inhibited from being reflected in the brake assist control, is defined as a period from after the master cylinder pressure has changed its changing trend to increase until the predetermined time has elapsed. In this case, it is possible to achieve an accurate correspondence between the inhibited period and the period during which the master cylinder pressure does not accurately correspond to the amount of brake operation.

Other objects, features and advantages of the present invention will be apparent from the following detailed description when read in conjunction with the accompanying drawings.

BRIEF DESCRIPTION OF THE DRAWINGS

FIG. 29A is a time chart illustrating changes in the state of the reservoir cut solenoid valves $SRC_{-1}$ and $SRC_{-2}$ when the assist pressure moderately increasing mode is performed;

FIG. 29B is a time chart illustrating changes in the output signal pMC of the fluid pressure sensor when the assist pressure moderately increasing mode is performed;

FIG. 29C is a time chart illustrating changes generated in the readout inhibiting flag XPMCIH when the assist pressure moderately increasing mode is performed;

FIG. 30A is a time chart illustrating changes in the state of the reservoir cut solenoid valves $SRC_{-1}$ and $SRC_{-2}$ when the assist pressure increasing state is started;

FIG. 30B is a time chart illustrating changes in the output signal pMC of the fluid pressure sensor when the assist pressure increasing state is started;

FIG. 30C is a time chart illustrating changes generated in the readout inhibiting flag XPMCIH when the assist pressure increasing state is started;

DESCRIPTION OF THE PREFERRED EMBODIMENTS

Figure 1:
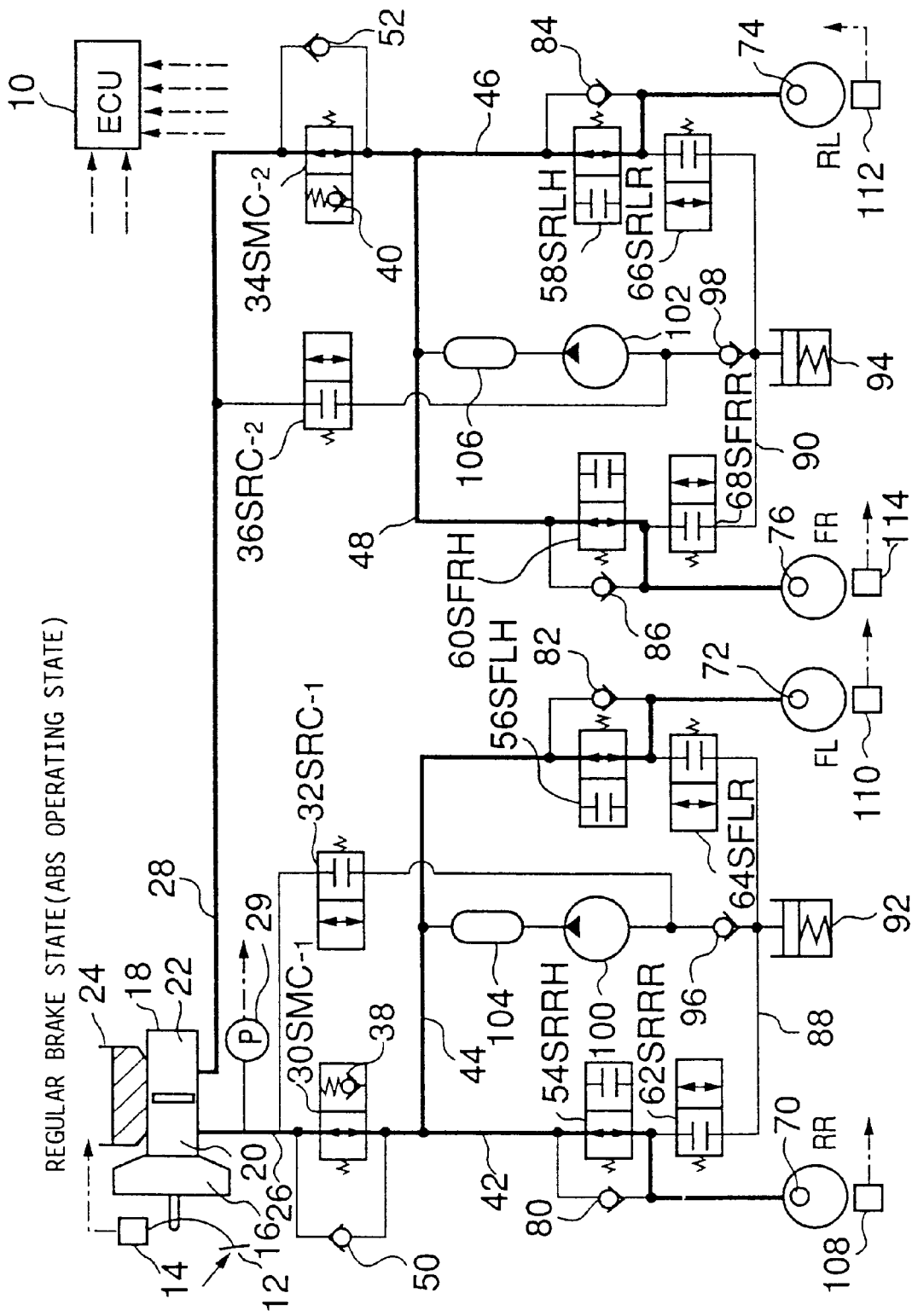
FIG. 1 is a system structure diagram of a brake force control apparatus according to an embodiment of the present invention.

FIG. 1 shows a system structure diagram of a brake force control apparatus of an embodiment of the present invention. The brake force control apparatus of the present embodiment is suitable for a brake force control apparatus used for a front-engine front-drive automobile (FF automobile). The brake force control apparatus of the present embodiment is controlled by an electronic control unit 10 (hereinafter referred to as ECU 10).

The brake force control apparatus includes a brake pedal 12. A brake switch 14 is provided near the brake pedal 12. The brake switch 14 outputs an ON signal when the brake pedal 12 is depressed. The ECU 10 determines whether or not the brake pedal is depressed based on an output signal of the brake switch 14.

The brake pedal 12 is connected to a vacuum booster 16. The vacuum booster 16 generates an assist force Fa having a predetermined power ratio with respect to a brake pressing force F when the brake pedal 12 is depressed. A master cylinder 18 is fixed to the vacuum booster 16. A first hydraulic pressure chamber 20 and a second hydraulic pressure chamber 22 are formed in the master cylinder 18. A master cylinder pressure $P_{M/C}$, which corresponds to a combined force of the brake pressing force F and the assist force Fa, is generated in the first hydraulic pressure chamber 20 and the second hydraulic pressure chamber 22.

A reservoir tank 24 is provided above the master cylinder 18. The master cylinder 18 and the reservoir tank 24 are connected only when the brake pedal 12 is not depressed. A first fluid pressure passage 26 and a second fluid pressure passage 28 are connected to the first hydraulic pressure chamber 20 and the second hydraulic pressure chamber 22, respectively.

A fluid pressure sensor 29 is provided to the first fluid pressure passage 26. The fluid pressure sensor 29 generates an electronic signal pMC corresponding to the fluid pressure in the first fluid pressure passage 26, that is, the master cylinder pressure $P_{M/C}$ generated by the master cylinder 18. The output signal pMC of the fluid pressure sensor 29 is supplied to the ECU 10. The ECU 10 detects the master cylinder pressure $P_{M/C}$ based on the output signal pMC.

The first fluid pressure passage 26 is connected to a first master cut solenoid valve 30 (hereinafter referred to as $SMC_{-1}$ 30) and a first reservoir cut solenoid valve 32 (hereinafter referred to as $SRC_{-1}$ 32). On the other hand, the second fluid pressure passage 28 is connected to a second master cut solenoid valve 34 (hereinafter referred to as $SMC_{-2}$ 34) and a second reservoir cut solenoid valve 36 (hereinafter referred to as $SRC_{-2}$ 36).

Constant pressure relief valves 38, 40 are provided inside $SMC_{-1}$ 30 and $SMC_{-2}$ 34, respectively. $SMC_{-1}$ 30 is connected to a fluid pressure passage 42 which is provided to a rear right wheel RR and a fluid pressure passage 44 which is provided to a front left wheel FL. Similarly, $SMC_{-2}$ 34 is connected to a fluid pressure passage 46 which is provided to a rear left wheel RL and a fluid pressure passage 48 which is provided to a front rear wheel FR.

$SMC_{-1}$ 30 and $SMC_{-2}$ 34 are two-position solenoid valves which are maintained to be opened in a regular state and connect the first fluid pressure passage 26 and the pressure passages 42, 44, or the second pressure passage 28 and the fluid pressure passages 46,48 via the constant pressure relief valves 38, 40, respectively, when an actuating signal is supplied from the ECU 10. $SRC_{-1}$ 32 and $SRC_{-2}$ 36 are two-position solenoid valves which are maintained to be closed in a regular state, and set to be opened when an actuating signal is supplied from the ECU 10.

A check valve 50 is provided between the first fluid pressure passage 26 and the fluid pressure passages 42, 44. The check valve 50 is a one-way valve which permits a flow of fluid only in a direction from the first fluid pressure passage 26 to the fluid pressure passages 42,44. Similarly, a check valve 52 is provided between the second fluid pressure passage 28 and the fluid pressure passages 46, 48. The check valve 52 is a one-way valve which permits a flow of fluid only in a direction from the second fluid pressure passage 28 to the fluid pressure passages 46, 48.

A rear right wheel holding solenoid valve 54 (hereinafter referred to as SRRH 54) is connected to the fluid pressure passage 42 corresponding to the rear right wheel RR. Similarly, a front left wheel holding solenoid valve 56 (hereinafter referred to as SFLH 56), rear left wheel holding solenoid valve 58 (hereinafter referred to as SRLH 58), and front right wheel holding solenoid valve 60 (hereinafter referred to as SFRH 60) are connected to the fluid pressure passages 44, 46 and 48 corresponding to the front left wheel FL, the rear left wheel RL and the front right wheel FR, respectively. Hereinafter, these solenoid valves may be referred to as "holding solenoid valves SH" as a whole. The holding solenoid valve SH is a two-position solenoid valve which is maintained to be opened in a regular state and set to be closed when an actuating signal is supplied from the ECU 10.

A rear right wheel pressure decreasing solenoid valve 62 (hereinafter referred to as SRRR 62) is connected to SRRH 54. Similarly, a front left wheel pressure decreasing solenoid valve 64 (hereinafter referred to as SFLR 64), a rear left wheel pressure decreasing solenoid valve 66 (hereinafter referred to as SRLR 66) and a front rear wheel pressure decreasing solenoid valve 68 (hereinafter referred to as SFRR 68) are connected to SFLH 56, SRLH 58 and SFRH 60, respectively. Hereinafter, these solenoid valves may be referred to as "pressure decreasing solenoid valves SR" as a whole. The pressure decreasing solenoid valve SR is a two-position solenoid valve which is maintained to be closed in a regular state and set to be opened when an actuating signal is supplied from the ECU 10.

Wheel cylinders 70, 72, 74, 76 are connected to the holding solenoid valves S**H of the respective wheels. Additionally, check valves 80, 82, 84, 86 are connected to the wheel cylinders 70, 72, 74, 76, respectively. The check valves 80, 82, 84, 86 are one-way valves which permit a flow of fluid only in a direction from the wheel cylinder 70, 72, 74, 76 to the fluid pressure passages 42, 44, 46, 48.

SRRR 62 and SFLR 64 are connected to a pressure decreasing passage 88. Similarly, SRLR 66 and SFRR 68 are connected to a pressure decreasing passage 90. Subsidiary reservoirs 92, 94 are connected to the pressure decreasing passages 88, 90, respectively. Inlets of pumps 100, 102 are connected to the subsidiary reservoirs 92, 94 via check valves 96, 98, respectively. The inlets of the pumps 100, 102 are also connected to $SRC_{-1}$ 32 and $SRC_{-2}$ 36, respectively.

The pumps 100, 102 pump up brake fluid which is stored in the subsidiary reservoirs 92, 94 or supplied via $SRC_{-1}$ 32 and $SRC_{-2}$ 36 and deliver the brake fluid from outlets thereof, when an actuating signal is supplied from the ECU 10. The outlets of the pumps 100, 102 are connected to dampers 104, 106, respectively. The dampers 104, 106 absorb fluctuations generated in the discharge pressure of the pumps 100, 102. The dampers 104, 106 are connected to the fluid pressure passages 44, 46, respectively.

The brake force control apparatus of the present embodiment comprises wheel speed sensors 108, 110, 112, 114. The wheel speed sensors 108, 110, 112, 114 output pulse signals in response to a rotational speed of each wheel. The output signals of the wheel speed sensors 108, 110, 112, 114 are supplied to the ECU 10. The ECU 10 detects the rotational speed $V_W$ of each wheel based on the output signals of the wheel speed sensors 108, 110, 112, 114.

Now a description will be given of an operation of the brake force control apparatus of the present embodiment. The brake force control apparatus of the present embodiment achieves the following functions by operating various solenoid valves provided in the fluid circuit:

① a function as a regular brake apparatus (hereinafter referred to as a regular brake function);

② a function as an antilock brake system (hereinafter referred to as ABS function); and ③ a function for generating a brake force greater than that generated in the normal condition when a rapid increase in the brake force is required (hereinafter referred to as a brake assist function).

FIG. 1 shows a state of the brake force control apparatus which is set during execution of a control for achieving the ① regular brake function (hereinafter referred to as a regular brake control) or a control for achieving the ②ABS function (hereinafter referred to as an ABS control). Hereinafter, the state shown in FIG. 1 is referred to as a regular brake state.

During execution of the regular brake control, all of the solenoid valves provided in the brake force control apparatus are turned off as shown in FIG. 1. According to the regular brake state, the wheel cylinders of all wheels are connected to the master cylinder 18. In this case, the wheel cylinder pressure $P_{W/C}$ of each of the wheels is controlled to be always equal to the master cylinder pressure $P_{M/C}$. Accordingly, the regular brake function is achieved in the regular brake state shown in FIG. 1.

During execution of the ABS control, $SMC_{-1}$ 30, $SRC_{-2}$ 32, $SMC_{-1}$ 34 and $SRC_{-1}$ 36 are turned off as shown in FIG. 1, the pumps 100, 102 are set in operation, and the holding solenoid valves SH and the pressure decreasing solenoid valves SR are appropriately operated in response to requirements of the ABS. Hereinafter, a state which is achieved during execution of the ABS control is referred to as an ABS state.

According to the ABS state, the master cylinder pressure $P_{M/C}$ can be supplied to all of the four fluid pressure passages 42, 44, 46, 48 which are provided to each of the wheels. When the holding solenoid valves SH are opened and the pressure decreasing solenoid valves SR are closed in this state, the wheel cylinder pressure $P_{W/C}$ of each of the wheels can be increased toward the master cylinder pressure $P_{M/C}$. Hereinafter, this state is referred to as a (i) pressurizing mode. Additionally, when both the holding solenoid valves SH and the pressure decreasing solenoid valves SR are closed in the above-mentioned state, the wheel cylinder pressure $P_{W/C}$ of each of the wheels can be maintained. Hereinafter, this state is referred to as a (ii) holding mode. Further, when the holding solenoid valves SH are closed and the pressure decreasing solenoid valves SR are opened in the above-mentioned state, the wheel cylinder pressure $P_{W/C}$ of each of the wheels can be decreased. Hereinafter, this state is referred to as a (ii) pressure decreasing mode.

After the ABS control is started, the ECU 10 achieves the above-mentioned (i) pressurizing mode, (ii) holding mode and (iii) pressure decreasing mode for each wheel so that an excessive slip rate is not generated for each wheel. When the holding solenoid valves SH and the pressure decreasing solenoid valves SR are controlled in the above-mentioned manner, the wheel cylinder pressure $P_{W/C}$ of each of the wheels is controlled to be an appropriate pressure which does not generate an excessive slip rate in the respective wheels. Thus, according to the above-mentioned control, the ABS function can be achieved in the brake force control apparatus.

Figure 2:
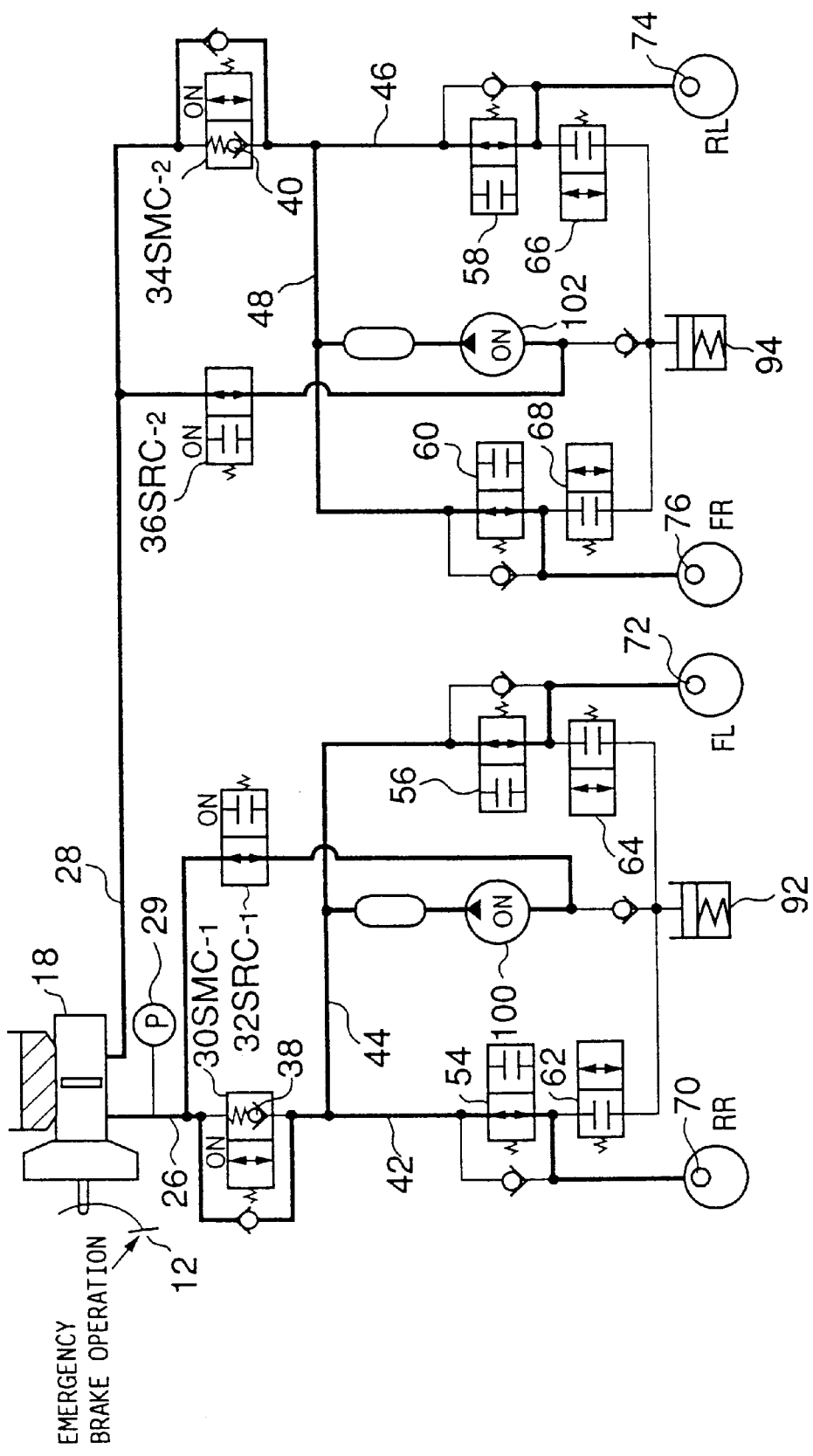
FIG. 2 is an illustration showing an assist pressure increasing state of the brake force control shown in FIG. 1.
Figure 3:
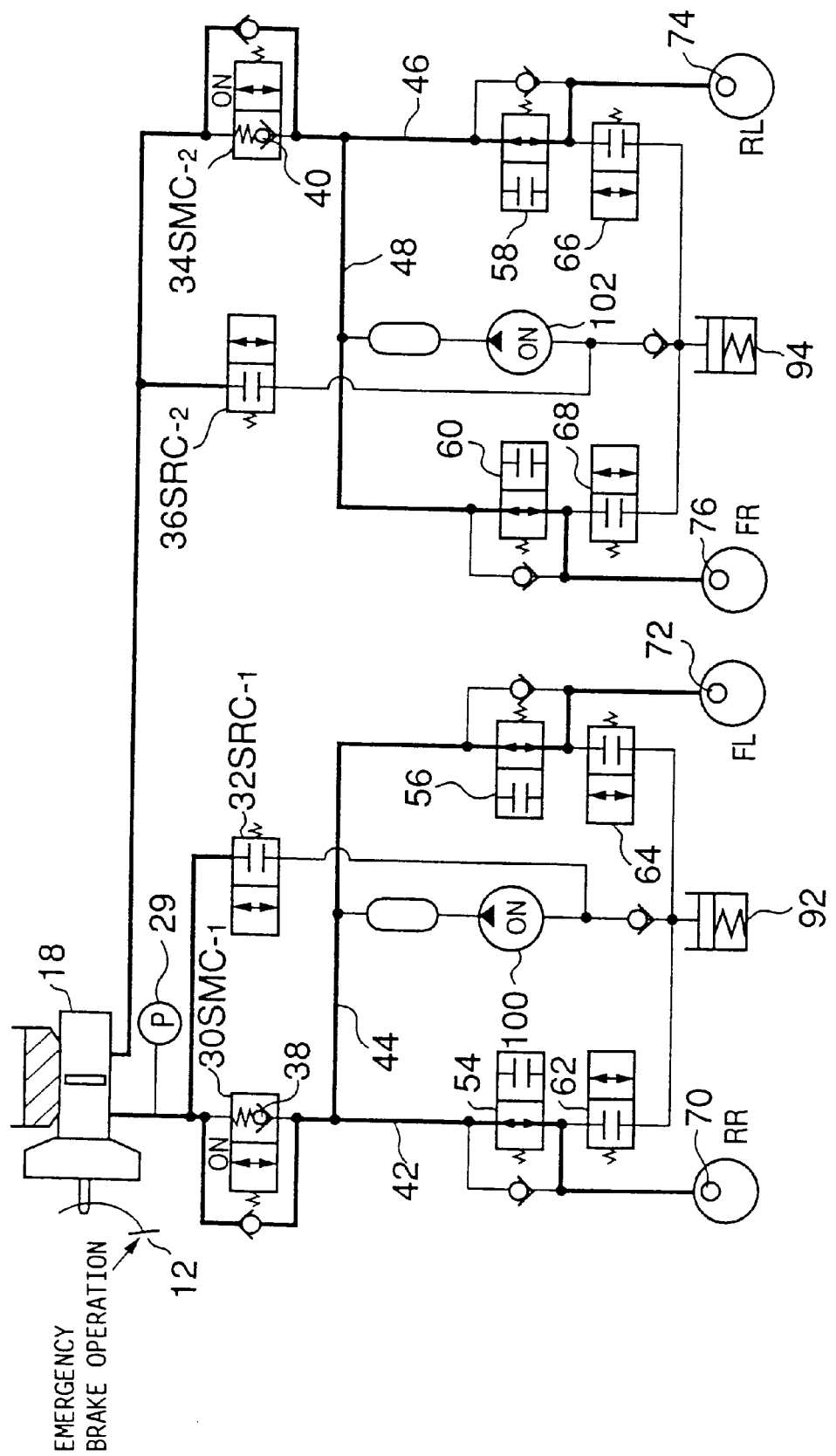
FIG. 3 is an illustration showing an assist pressure holding state of the brake force control shown in FIG. 1.
Figure 4:
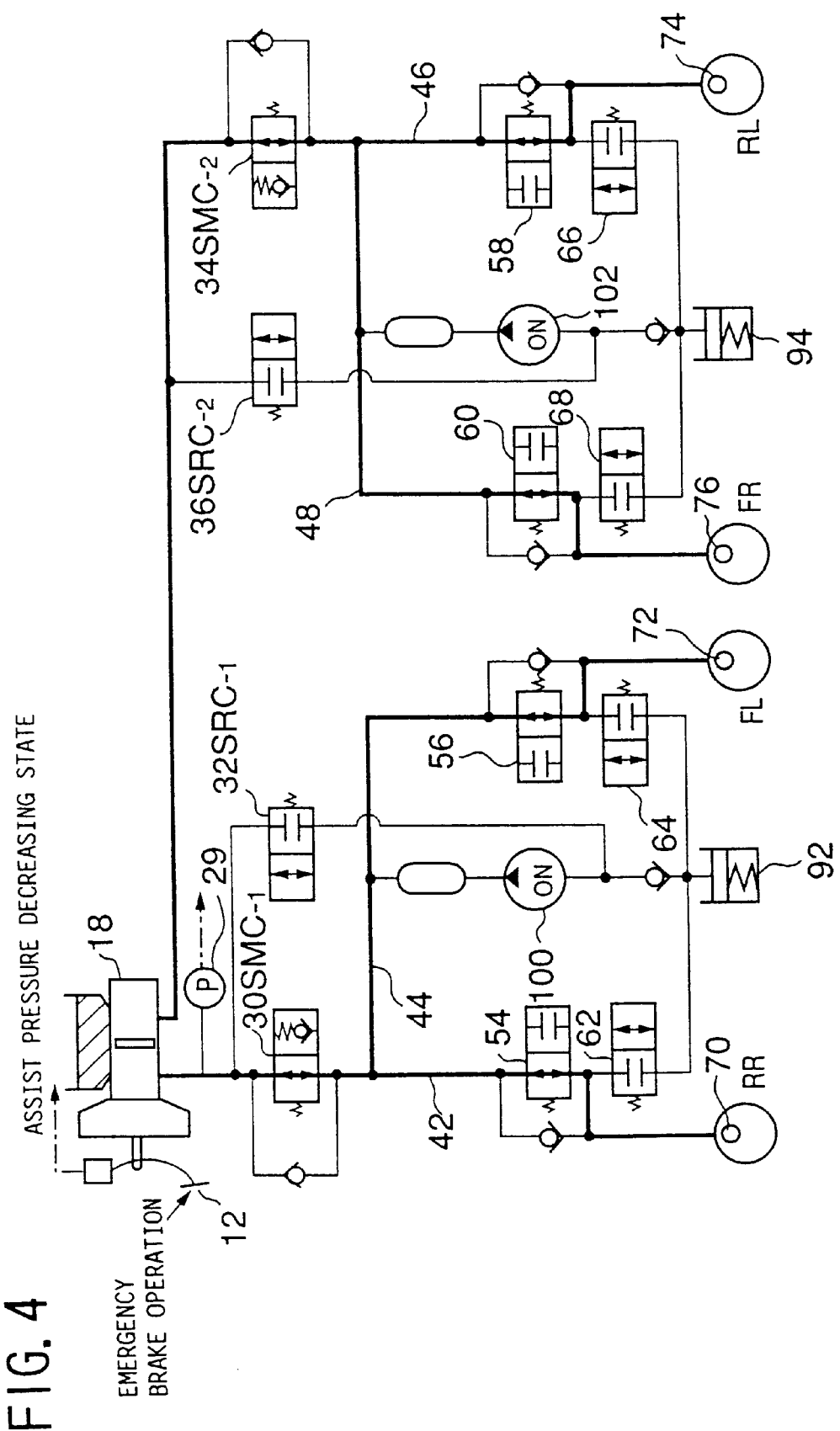
FIG. 4 is an illustration showing an assist pressure decreasing state of the brake force control shown in FIG. 1.

FIGS. 2 to 4 show states which are set during execution of a control for achieving the ③ brake assist function (hereinafter referred to as BA function). Hereinafter, this control is referred to as BA control. When an emergency brake operation is performed by a driver, the ECU 10 starts the BA control so as to generate an increased brake force as compared to that generated during a normal brake operation. During execution of the BA control, one of the states shown in FIGS. 2 to 4 is achieved by the ECU 10.

FIG. 2 shows an assist pressure increasing state which is set during execution of the BA control. The assist pressure increasing state is set when the wheel cylinder pressure $P_{W/C}$ of each of the wheels is needed to be increased during execution of the BA control. In the system of the present embodiment, the assist pressure increasing state is achieved by turning on $SMC_{-1}$ 30, $SRC_{-1}$ 32, $SMC_{-2}$ 34 and $SRC_{-2}$ 36 (that is, by closing $SMC_{-1}$ 30 and $SMC_{-2}$ 34 and opening $SRC_{-1}$ 32 and $SRC_{-2}$ 36) and also turning on the pumps 100, 102 as shown in FIG. 2.

In the assist pressure increasing state, the master cylinder 18 and inlets of the pumps 100, 102 are connected to each other. In this case, the pumps 100, 102 can pump up brake fluid from the master cylinder 18 and deliver the pressurized brake fluid to the fluid pressure passages 42, 44 or the fluid pressure passages 46, 48.

In the assist pressure increasing state, the fluid pressure passages 42, 44 and the fluid pressure passages 46, 48 are disconnected from the master cylinder 18 by the constant pressure relief valves 38, 40 contained in the $SMC_{-1}$ 30 and $SMC_{-2}$ 34, respectively. In this case, the brake fluid pumped up by the pumps 100, 102 is supplied to the wheel cylinders 70, 72, 74, 76 of the respective wheels via the fluid pressure passages 42, 44, 46, 48.

Thus, according to the assist pressure increasing state shown in FIG. 2, it is possible to increase the wheel cylinder pressure $P_{W/C}$ of each wheel to a fluid pressure which is higher than the master cylinder pressure $P_{M/C}$ by pumping up the brake fluid from the master cylinder 18 using the pumps 100, 102.

FIG. 3 shows an assist pressure holding state which is set during execution of the BA control. The assist pressure holding state is set when the wheel cylinder pressure $P_{W/C}$ is needed to be maintained during execution of the BA control. In the system of the present embodiment, the assist pressure holding state is achieved by turning on $SMC_{-1}$ 30 and $SMC_{-2}$ 34 (that is, by closing $SMC_{-1}$ 30 and $SMC_{-2}$ 34) and also turning on the pumps 100, 102 as shown in FIG. 3.

According to the assist pressure holding state, inlets of the pumps 100, 102 and the master cylinder 18 are disconnected from each other by $SRC_{-1}$ 32 and $SRC_{-2}$ 36. In this case, the pumps 100, 102 cannot pump up the brake fluid from the master cylinder 18. Additionally, the subsidiary reservoirs 92, 94 contain no brake fluid before the BA control is started. Therefore, when the assist pressure holding state is achieved, the pumps 100, 102 can no longer pump up the brake fluid. Thus, according to the assist pressure holding state, the wheel cylinder pressure $P_{W/C}$ of each of the wheels can be maintained at a constant value.

FIG. 4 shows an assist pressure decreasing state which is set during execution of the BA control. The assist pressure decreasing state is set when the wheel cylinder pressure $P_{W/C}$ is needed to be decreased during execution of the BA control. In the present embodiment, the assist pressure decreasing state is achieved by turning off all of the solenoid valves as shown in FIG. 4.

In the assist pressure decreasing state, $SRC_{-1}$ 32 and $SRC_{-2}$ 36 are closed. In this case, the pumps 100, 102 cannot pump up brake fluid. Additionally, in the assist pressure decreasing state, the wheel cylinders 70, 72, 74, 76 of the respective wheels are connected to the master cylinder 18 via $SMC_{-1}$ 30 or $SMC_{-2}$ 34. Thus, according to the assist pressure decreasing state, the wheel cylinder pressure $P_{W/C}$ of each of the wheels can be decreased down to the master cylinder pressure $P_{M/C}$ as a lower limit.

Figure 5:
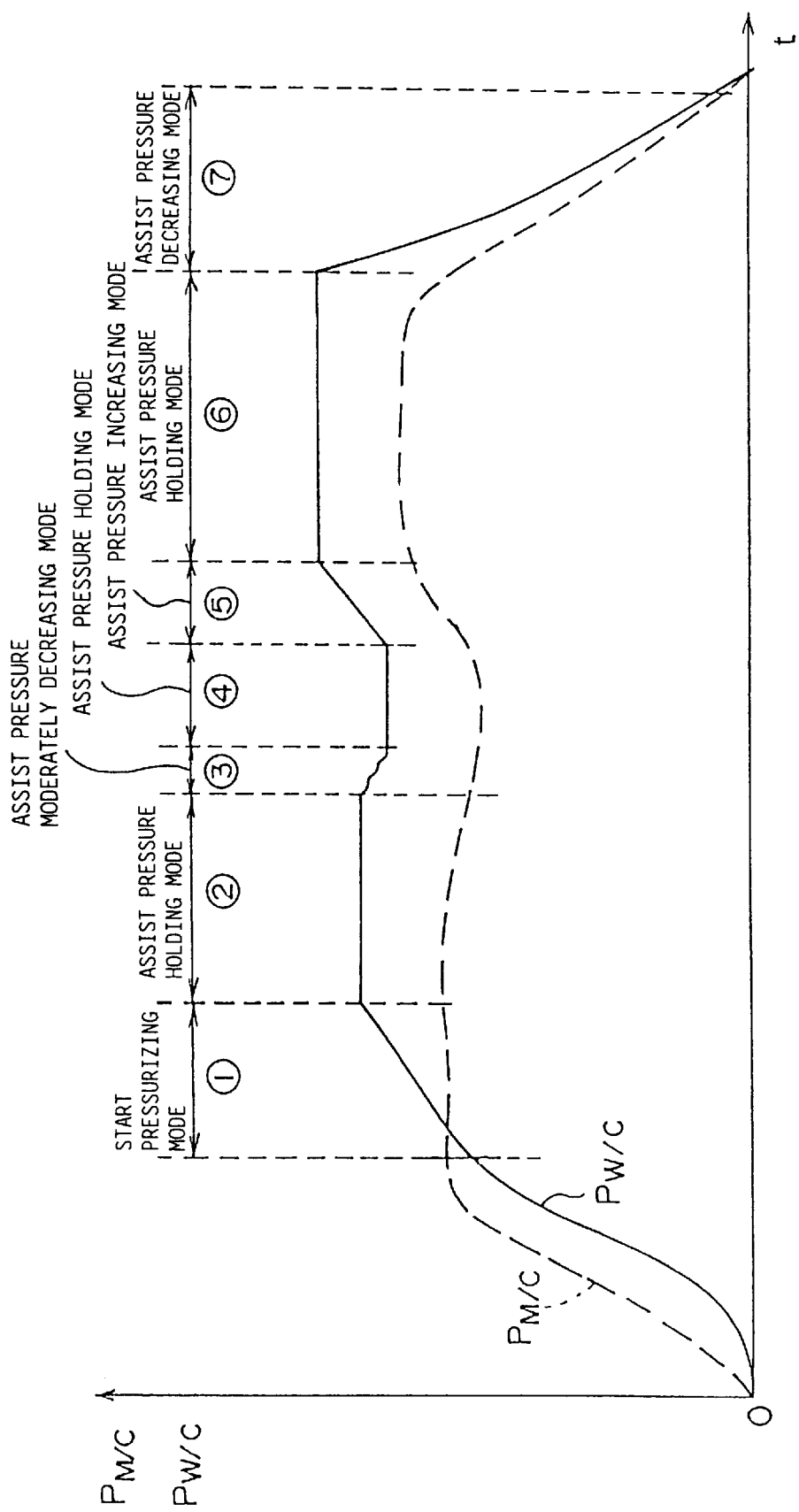
FIG. 5 is a diagram illustrating changes generated in the master cylinder pressure $P_{M/C}$ and the wheel cylinder pressure $P_{W/C}$ when an emergency brake operation is performed in the brake force control apparatus shown in FIG. 1.

FIG. 5 shows changes generated in the master cylinder pressure $P_{M/C}$ and the wheel cylinder pressure $P_{W/C}$ when an emergency brake operation is performed by a driver. When the emergency brake operation is performed by the driver, the master cylinder pressure $P_{M/C}$ is rapidly increased as shown by a dashed line in FIG. 5. The ECU 10 determines that the emergency brake operation is performed when a rapid and sufficiently large increase in the master cylinder pressure $P_{M/C}$ is detected based on the output signal pMC of the fluid pressure sensor 29. When the ECU 10 determines that the emergency brake operation is performed, the BA control is started.

When the BA control is started in the brake force control apparatus, a (I) start pressurizing mode is performed (FIG.

5, period ①). The start pressurizing mode is achieved by alternately setting the assist pressure increasing state shown in FIG. 2 and the assist pressure holding state shown in FIG. 3 with a predetermined duty ratio Duty1. More specifically, the start pressurizing mode is achieved by maintaining $SMC_{-1}$ 30 and $SMC_{-2}$ 34 in an ON state (closed state), maintaining the pumps 100, 102 in operation, and repeatedly turning on and off $SRC_{-1}$ 32 and $SRC_{-2}$ 36 with the predetermined duty ratio Duty1.

The start pressurizing mode is continuously performed for a predetermined pressurizing time $T_{STA}$. The pressurizing time $T_{STA}$ has been set to be a time required to increase the wheel cylinder pressure $P_{W/C}$ to a pressure which is higher than the master cylinder pressure $P_{M/C}$ by a predetermined assist pressure Pa. The predetermined assist pressure Pa is a pressure which is required to generate a predetermined deceleration G0 in a vehicle. Accordingly, when the start pressurizing mode is performed, a deceleration G+G0 is generated in the vehicle which is larger than a deceleration G generated by the regular brake control by the predetermined value G0.

In the brake force control apparatus, after the (I) start pressurizing mode is ended, one of an (II) assist pressure increasing mode, an (III) assist pressure decreasing mode, an (IV) assist pressure holding mode, an (V) assist pressure moderately increasing mode or an (VI) assist pressure moderately decreasing mode is set in accordance with the brake operation performed by the driver.

Figure 6:
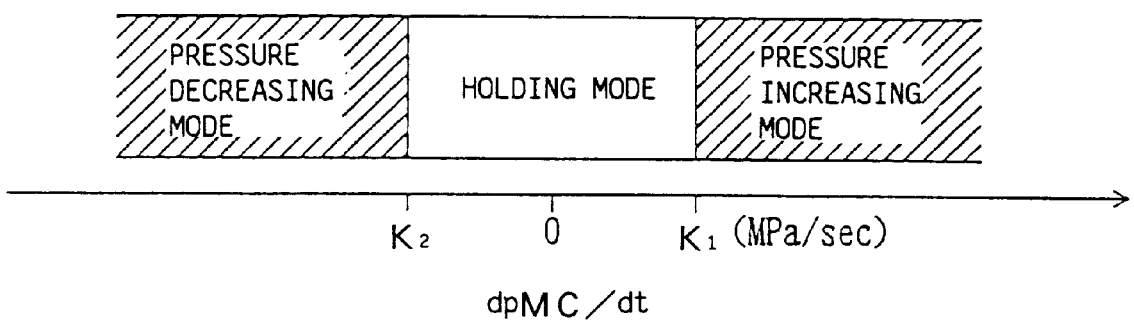
FIG. 6 is a map showing a control mode which is performed subsequent to a start pressurizing mode when the BA control is executed in the brake force control apparatus shown in FIG. 1.

FIG. 6 shows an example of a map referred to by the ECU 10 so as to determine a mode which is performed subsequent to the start pressurizing mode. In FIG. 6, the horizontal axis indicates a change rate dpMC/dt of the output signal pMC of the fluid pressure sensor 29.

If a positive change rate is generated in the master cylinder pressure $P_{M/C}$ at a time when the start pressurizing mode is ended, it can be determined that the driver is requesting a further large brake force. The ECU 10 determines that the driver is requesting a further large brake force if a change rate dpMC/dt exceeding a predetermined value K1 (>0) is generated at a time when the start pressurizing mode is ended. In this case, the ECU 10 sets the mode which is performed subsequent to the start pressurizing mode to be the (II) assist pressure increasing mode.

If a negative change rate is generated in the master cylinder pressure $P_{M/C}$ at a time when the start pressurizing mode is ended, it can be determined that the driver is requesting a decrease in the brake force. The ECU 10 determines that the driver is requesting a decrease in the brake force if a change rate dpMC/dt which is smaller than a predetermined value K2 (<0) is generated at a time when the start pressurizing mode is ended. In this case, the ECU 10 sets the mode which is performed subsequent to the start pressurizing mode to be the (III) assist pressure decreasing mode.

If a large change rate is not generated in the master cylinder pressure $P_{M/C}$ at a time when the start pressurizing mode is ended, it can be determined that the driver is requesting the brake force to be maintained. The ECU 10 determines that the driver is requesting the brake force to be maintained if a change rate dpMC/dt satisfying K2≦dpMC/dt≦K1 is generated at a time when the start pressurizing mode is ended. In this case, the ECU 10 sets the mode which is performed subsequent to the start pressurizing mode to be the (IV) assist pressure holding mode.

The (II) assist pressure increasing mode is performed in a case where the amount of brake operation is substantially increased at a time when the start pressurizing mode is ended, and in a case where the amount of brake operation is substantially increased during execution of the assist pressure holding mode or the assist pressure moderately increasing mode which will be described below (FIG. 5, period ⑤).

The assist pressure increasing mode is achieved by alternately achieving the assist pressure increasing state shown in FIG. 2 and the assist pressure holding state shown in FIG. 3 with a predetermined duty ratio Duty2. The duty ratio Duty2 used in the assist pressure increasing mode may be equal to or different from the duty ratio Duty 1 used in the start pressurizing mode. According to the assist pressure increasing mode, the wheel cylinder pressure $P_{W/C}$ of each wheel can be rapidly increased in a region of a pressure which is higher than the master cylinder pressure $P_{M/C}$.

Figure 7:
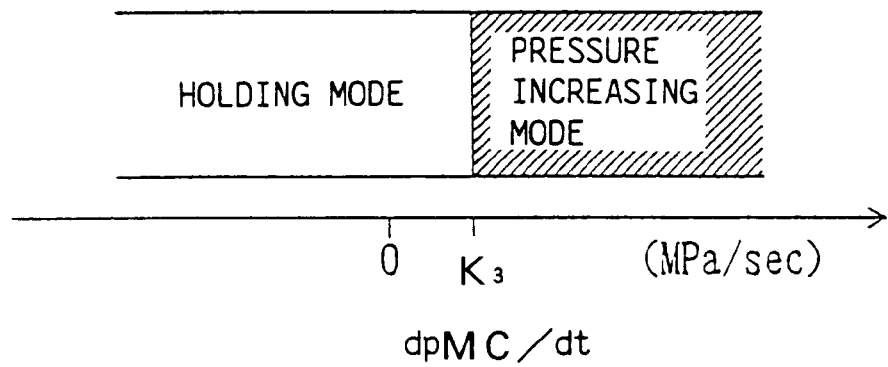
FIG. 7 is a map showing a control mode which is performed subsequent to an assist pressure increasing mode when the BA control is executed in the brake force control apparatus shown in FIG. 1.

FIG. 7 shows an example of a map which is referred to by the ECU 10 during execution of the assist pressure increasing mode so as to determine a mode which should be performed. In FIG. 7, the horizontal axis indicates the change rate pMC/dt of the output signal pMC of the fluid pressure sensor 29.

If the master cylinder pressure $P_{M/C}$ continues to be increased during execution of the assist pressure increasing mode, it can be determined that the driver is requesting a further large brake force. The ECU 10 determines that the driver is requesting a further large brake force if a change rate dpMC/dt exceeding a predetermined value K3 is generated during execution of the assist pressure increasing mode. In this case, the ECU 10 maintains the mode which should be performed to be the assist pressure increasing mode.

On the contrary, if a large increase is not generated in the master cylinder pressure $P_{M/C}$ during execution of the assist pressure increasing mode, it can be determined that the driver no longer requires an increase in the brake force. The ECU 10 determines that the driver does not require an increase in the brake force if a change rate dpMC/dt exceeding the predetermined value K3 (>0) is not generated during execution of the assist pressure increasing mode. In this case, the ECU 10 sets the mode which should be performed to be the assist pressure holding mode.

The (III) assist pressure decreasing mode is performed in a case where the amount of brake operation is substantially decreased at a time when the start pressurizing mode is ended and in a case where the amount of brake operation is substantially decreased during execution of the assist pressure holding mode or the assist pressure moderately decreasing mode which will be described below (FIG. 5, period ⑦).

The assist pressure decreasing mode is achieved by alternately setting the assist pressure holding state shown in FIG. 3 and the assist pressure decreasing state shown in FIG. 4 with a predetermined duty ratio Duty3. More specifically, the assist pressure decreasing mode is achieved by maintaining $SRC_{-1}$ 32 and $SRC_{-2}$ 36 in an OFF state (closed state), maintaining the pumps 100, 102 in operation, and turning on and off $SMC_{-1}$ 30 and $SMC_{-2}$ 34 with the predetermined duty ratio Duty3. According to the assist pressure decreasing mode, the wheel cylinder pressure $P_{W/C}$ can be rapidly decreased down to the master cylinder pressure as a lower limit when the amount of brake operation is substantially decreased.

Figure 8:
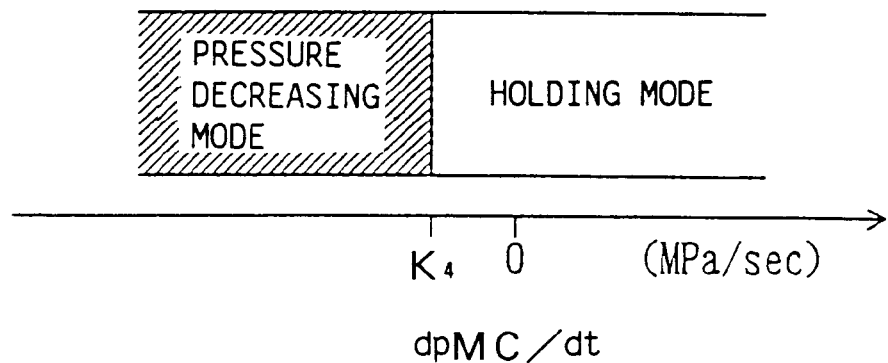
FIG. 8 is a map showing a control mode which is performed subsequent to an assist pressure decreasing mode when the BA control is executed in the brake force control apparatus shown in FIG. 1.

FIG. 8 shows an example of a map which is referred to by the ECU 10 during execution of the assist pressure decreasing mode so as to determine a mode which should be performed. In FIG. 8, the horizontal axis indicates the change rate dpMC/dt of the output signal pMC of the fluid pressure sensor 29.

If the master cylinder pressure $P_{M/C}$ continues to be decreased during execution of the assist pressure decreasing mode, it can be determined that the driver is requesting a further smaller brake force. The ECU 10 determines that the driver is requesting a further smaller brake force if a change rate dpMC/dt which is smaller than a predetermined value K4 (<0) is generated during execution of the assist pressure increased mode. In this case, the ECU 10 maintains the mode which should be performed to be the assist pressure decreasing mode.

On the contrary, if a large decrease is not generated in the master cylinder pressure $P_{M/C}$ during execution of the assist pressure decreasing mode, it can be determined that the driver no longer requires a decrease in the brake force. The ECU 10 determines that the driver does not require a decrease in the brake force if a change rate dpMC/dt which is smaller than the predetermined value K4 (<0) is not generated during execution of the assist pressure decreasing mode. In this case, the ECU 10 sets the mode which should be performed to be the assist pressure holding mode.

The assist pressure holding mode is performed in a case where a large increase or decrease is not detected in the amount of brake operation at a time when the start pressurizing mode is ended or during execution of the assist pressure increasing mode or the assist pressure decreasing mode and in a case where the assist pressure moderately increasing mode or the assist pressure moderately decreasing mode has been performed for a predetermined period (FIG. 5, periods ②, ④, ⑥).

The assist pressure holding mode is achieved by maintaining the assist pressure holding state shown in FIG. 3. According to the assist pressure holding mode, the wheel cylinder pressure $P_{W/C}$ of each wheel can be maintained at a constant value when a large increase or decreased is not generated in the amount of brake operation.

Figure 9:
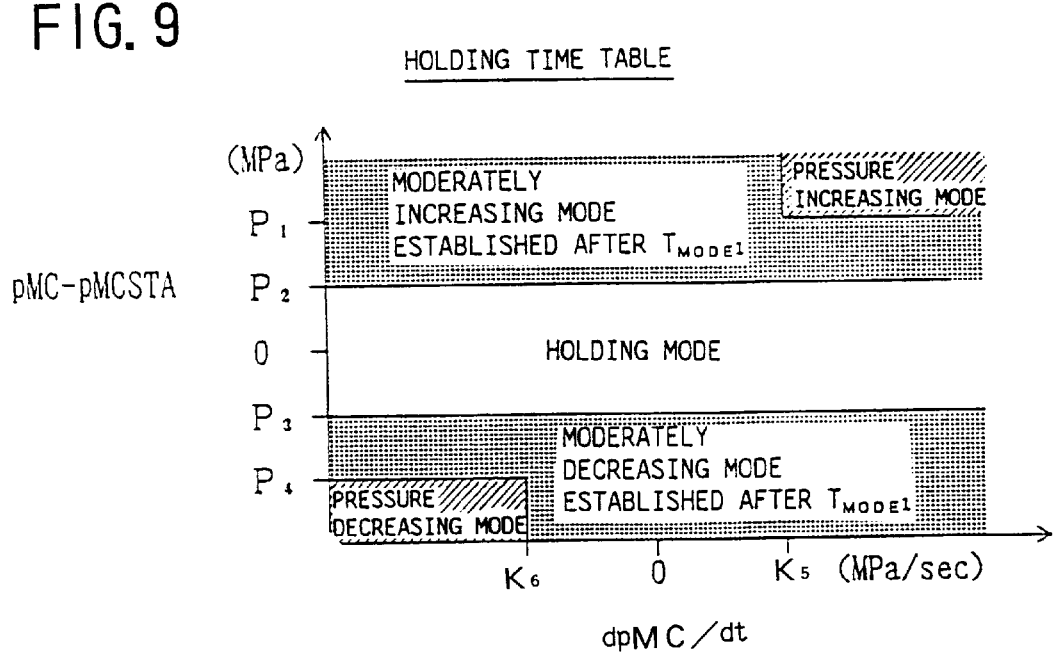
FIG. 9 is a map showing a control mode which is performed subsequent to an assist pressure holding mode when the BA control is executed in the brake force control apparatus shown in FIG. 1.

FIG. 9 shows an example of a map which is referred to by the ECU 10 during execution of the assist pressure holding mode so as to determine a mode which should be performed. In FIG. 9, the horizontal axis indicates the change rate dpMC/dt of the output signal pMC of the fluid pressure sensor 29. Additionally, the vertical axis indicates a value of the output signal pMC subtracted by a initial output value pMCSTA. The initial output value pMCSTA is a value of the output signal pMC output by the fluid pressure sensor 29 at a time when the assist pressure holding mode is started. Accordingly, the vertical axis of FIG. 9 corresponds to the amount of increase in the output signal pMC after the assist pressure holding mode is started.

If the master cylinder pressure $P_{M/C}$ is rapidly increased during execution of the assist pressure holding mode, it can be determined that the driver is requesting a rapid increase in the brake force. The ECU 10 determines that the driver is requesting a rapid increase in the brake force if a change exceeding a predetermined value P1 (that is, a change satisfying pMC−pMCSTA>P1) is generated before a predetermined time $T_{MODE1}$ has elapsed after start of the assist pressure holding mode and the change rate dpMC/dt is greater than a predetermined value K5 (>0) at a time when the change is generated. In this case, the ECU 10 changes the mode which should be performed from the assist pressure holding mode to the assist pressure increasing mode.

If the master cylinder pressure $P_{M/C}$ is rapidly decreased during execution of the assist pressure holding mode, it can be determined that the driver is requesting a rapid decrease in the brake force. The ECU 10 determines that the driver is requesting a rapid decrease in the brake force if the output signal pMC is decreased below a predetermined value P4 (that is, pMC is decreased until pMC−pMCSTA<P4 is satisfied) before the predetermined time $T_{MODE1}$ has elapsed after start of the assist pressure holding mode and the change rate dpMC/dt is smaller than a predetermined value K6 (<0) at a time when that decrease is generated. In this case, the ECU 10 changes the mode which should be performed from the assist pressure holding mode to the assist pressure decreasing mode.

If the master cylinder pressure $P_{M/C}$ is moderately increased during execution of the assist pressure holding mode, it can be determined that the driver is requesting a moderate increase in the brake force. The ECU 10 determines that the driver is requesting a moderate increase in the brake force if the above-mentioned conditions for shifting to the assist pressure increasing mode or the assist pressure decreasing mode are not satisfied after the assist pressure holding mode is started and a change exceeding a predetermined value P2 (0<P2<P1) (that is, a change satisfying pMC−pMCSTA>P2) continues to be generated in the output signal pMC for the predetermined time $T_{MODE1}$. In this case, the ECU 10 changes the mode which should be performed from the assist pressure holding mode to the assist pressure moderately increasing mode.

If the master cylinder pressure $P_{M/C}$ is moderately decreased during execution of the assist pressure holding mode, it can be determined that the driver is requesting a moderate decrease in the brake force. The ECU 10 determines that the driver is requesting a moderate decrease in the brake force if the above-mentioned conditions for shifting to the assist pressure increasing mode or the assist pressure decreasing mode are not satisfied after the assist pressure holding mode is started and a decrease exceeding a predetermined value P3 (0>P3>P4) (that is, a decrease satisfying pMC−pMCSTA<P3) continues to be generated in the output signal pMC for the predetermined time $T_{MODE1}$. In this case, the ECU 10 changes the mode which should be performed from the assist pressure holding mode to the assist pressure moderately decreasing mode.

If a substantial change is not generated in the master cylinder pressure $P_{M/C}$ during execution of the assist pressure holding mode, it can be determined that the driver is requesting the brake force to be maintained. The ECU 10 determines that the driver is requesting the brake force to be maintained if the amount of change in the output signal pMC is between the predetermined values P2 and P3 (that is, if P3≦pMC−pMCSTA≦P2 is satisfied). In this case, the ECU 10 maintains the mode which should be performed to be the assist pressure holding mode.

The (V) assist pressure moderately increasing mode is performed when a moderate increase is detected in the amount of brake operation during execution of the assist pressure holding mode, as described above. When the assist pressure moderately increasing mode is requested to be performed, the ECU 10 maintains the brake force control apparatus in the assist pressure increasing state shown in FIG. 2 for a predetermined short time $T_{MODE2}$. After the predetermined time $T_{MODE2}$ has elapsed, the ECU 10 ends the assist pressure moderately increasing mode and starts the assist pressure holding mode again, so long as a rapid increase is not detected in the amount of brake operation. According to the assist pressure moderately increasing mode, the wheel cylinder pressure $P_{W/C}$ can be intermittently increased when the amount of brake operation is moderately increased.

Figure 10:
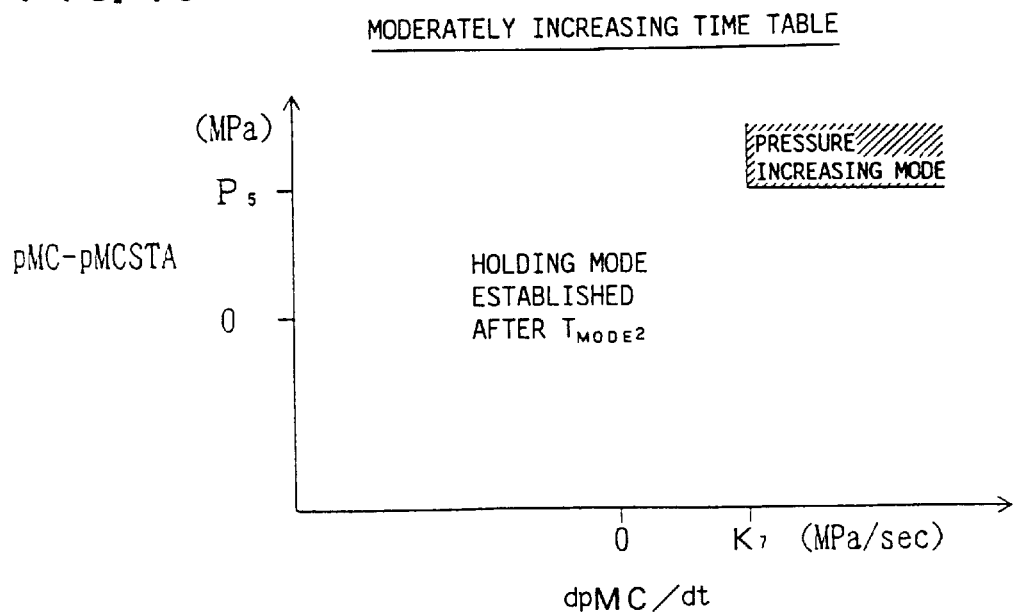
FIG. 10 is a map showing a control mode which is performed subsequent to an assist pressure moderately increasing mode when the BA control is executed in the brake force control apparatus shown in FIG. 1.

FIG. 10 shows an example of a map which is referred to by the ECU 10 during execution of the assist pressure moderately increasing mode so as to determine a mode which should be performed. In FIG. 10, the horizontal axis indicates the change rate dpMC/dt of the output signal pMC of the fluid pressure sensor 29, and the vertical axis indicates the amount of change pMC–pMCSTA generated in the output signal pMC after the assist pressure moderately increasing mode is started.

If the master cylinder pressure $P_{M/C}$ is rapidly increased during execution of the assist pressure moderately increasing mode, it can be determined that the driver is requesting a rapid increase in the brake force. The ECU 10 determines that the driver is requesting a rapid increase in the brake force if a change exceeding a predetermined value P5 (that is, a change satisfying pMC–pMCSTA>P5) is generated in the output signal pMC before a predetermined time $T_{MODE2}$ has elapsed after start of the assist pressure moderately increasing mode and the change rate dpMC/dt is greater than a predetermined value K7 (>0) at a time when that change is generated. In this case, the ECU 10 changes the mode which should be performed from the assist pressure moderately increasing mode to the assist pressure increasing mode.

If a rapid increase is not detected in the master cylinder pressure $P_{M/C}$ during execution of the assist pressure moderately increasing mode, it can be determined that the driver is not requesting a rapid increase in the brake force. The ECU 10 determines that the driver is not requesting a rapid increase in the brake force if the above-mentioned condition for shifting to the assist pressure increasing mode is not established before the predetermined time $T_{MODE2}$ has elapsed after start of the assist pressure moderately increasing mode. In this case, the ECU 10 changes the mode which should be performed from the assist pressure moderately increasing mode to the assist pressure holding mode.

The (VI) assist pressure moderately decreasing mode is performed when a moderate decrease is detected in the amount of brake operation during execution of the assist pressure holding mode, as described above (FIG. 5, period ③). When the assist pressure moderately decreasing mode is requested to be performed, the ECU 10 maintains the brake force control apparatus in the assist pressure decreasing state shown in FIG. 4 for a predetermined short time $T_{MODE3}$. After the predetermined time $T_{MODE3}$ has elapsed, the ECU 10 ends the assist pressure moderately decreasing mode and starts the assist pressure holding mode again, so long as a rapid decrease is not detected in the amount of brake operation. According to the assist pressure moderately decreasing mode, the wheel cylinder pressure $P_{W/C}$ of each wheel can be intermittently decreased when the amount of brake operation is moderately decreased.

Figure 11:
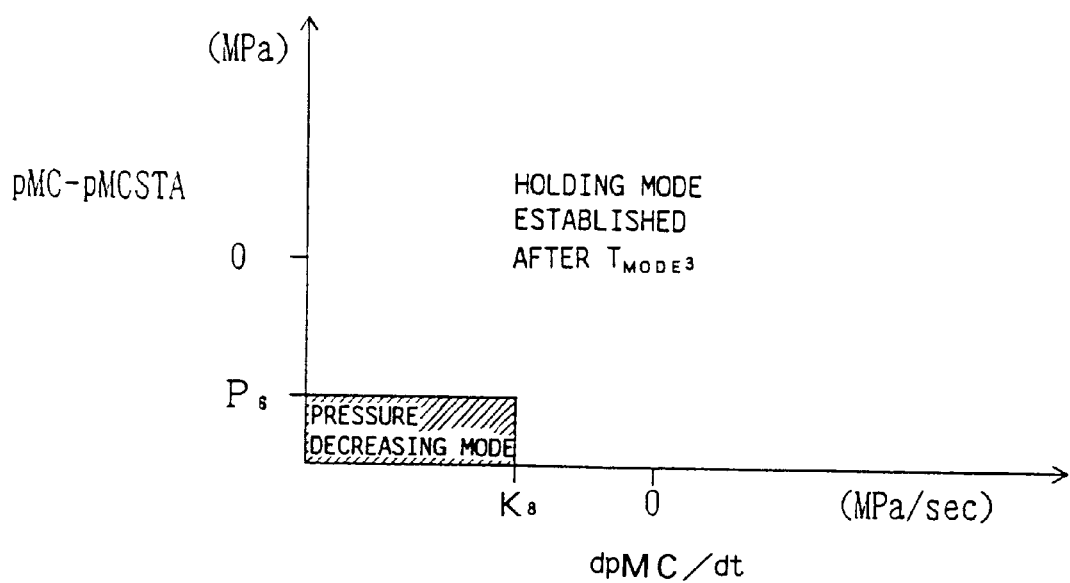
FIG. 11 is a map showing a control mode which is performed subsequent to an assist pressure moderately decreasing mode when the BA control is executed in the brake force control apparatus shown in FIG. 1.

FIG. 11 shows an example of a map which is referred to by the ECU 10 during execution of the assist pressure moderately decreasing mode so as to determine a mode which should be performed. In FIG. 11, the horizontal axis indicates the change rate dpMC/dt of the output signal pMC of the fluid pressure sensor 29, and the vertical axis indicates the amount of change pMC–pMCSTA generated in the output signal pMC after the assist pressure moderately decreasing mode is started.

If the master cylinder pressure $P_{M/C}$ is rapidly decreased during execution of the assist pressure moderately decreasing mode, it can be determined that the driver is requesting a rapid decrease in the brake force. The ECU 10 determines that the driver is requesting a rapid decrease in the brake force if a decrease exceeding a predetermined value P6 (that is, a change satisfying pMC–pMCSTA<P6) is generated in the output signal pMC before the predetermined time $T_{MODE3}$ has elapsed after start of the assist pressure moderately decreasing mode and the change rate dpMC/dt is smaller than a predetermined value K8 (<0) at a time when that change is generated. In this case the ECU 10 changes the mode which should be performed from the assist pressure moderately decreasing mode to the assist pressure decreasing mode.

If a rapid decrease is not detected in the master cylinder pressure $P_{M/C}$ during execution of the assist pressure moderately decreasing mode, it can be determined that the driver is not requesting a rapid decrease in the brake force. The ECU 10 determines that the driver is not requesting a rapid decrease in the brake force if the above-mentioned condition for shifting to the assist pressure decreasing mode is not established before the predetermined time $T_{MODE3}$ has elapsed after start of the assist pressure moderately decreasing mode. In this case, the ECU 10 changes the mode which should be performed from the assist pressure moderately decreasing mode to the assist pressure holding mode.

As described above, according to the brake force control apparatus of the present embodiment, the wheel cylinder pressure $P_{W/C}$ of each wheel can be increased to a pressure which is higher than the master cylinder pressure $P_{M/C}$ by executing the BA control when the emergency brake operation is performed by the driver. Additionally, according to the brake force control apparatus of the present embodiment, an increase or a decrease in the amount of brake operation performed by the driver can be detected during execution of the BA control based on the output signal pMC of the fluid pressure sensor 29, and the wheel cylinder pressure $P_{W/C}$ can be increased or decreased in accordance with the increase or the decrease in the amount of brake operation. Thus, according to the brake force control apparatus of the present embodiment, the brake force can be increased or decreased in accordance with the driver's intention during execution of the BA control.

Figure 12A:
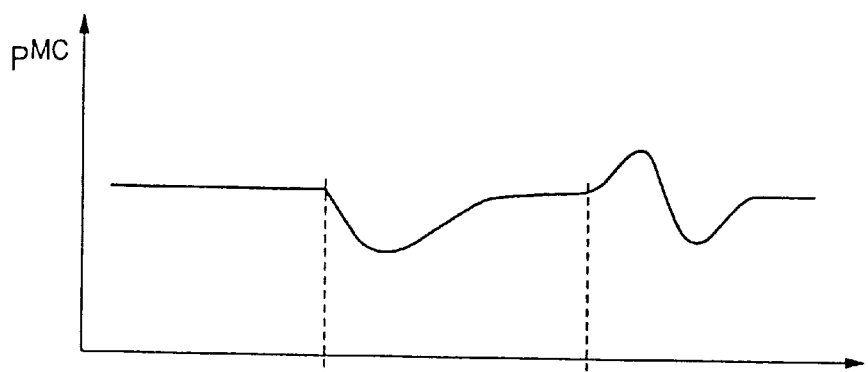
FIG. 12A is a time chart illustrating changes in an output signal pMC of a fluid pressure sensor before and after the assist pressure increasing stated is achieved.
Figure 12B:
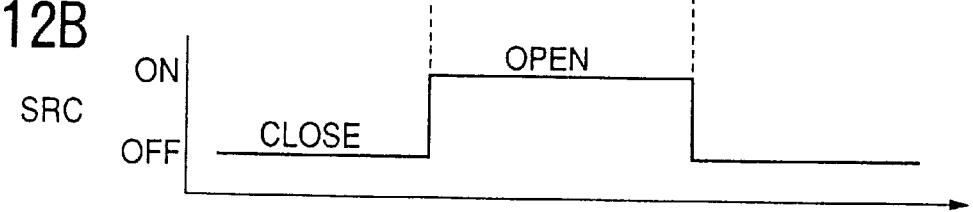
FIG. 12B is a time chart illustrating changes in the state of reservoir cut solenoid valves $SRC_{-1}$ and $SRC_{-2}$ before and after the assist pressure increasing state is achieved.
Figure 12C:
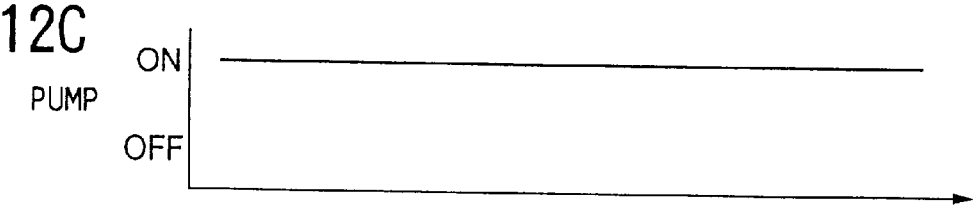
FIG. 12C is a time chart illustrating the state of pumps before and after the assist pressure increasing state is achieved.

FIG. 12A shows a time chart illustrating changes generated in the output signal pMC of the fluid pressure sensor 29 during execution of the BA control. Specifically, FIG. 12A shows a change generated in the output signal pMC in association with execution of the above-mentioned (I) start pressurizing mode, (II) assist pressure increasing mode and (V) assist pressure moderately increasing mode. Additionally, FIG. 12B and FIG. 12C show the states of $SRC_{-1}$ 32, $SRC_{-2}$ 36 and pumps 100, 102, respectively, during execution of the above-mentioned (I) start pressurizing mode, (II) assist pressure increasing mode and (V) assist pressure moderately increasing mode.

As described above, during execution of the (I) start pressurizing mode and the (II) assist pressure increasing mode, the assist pressure increasing state shown in FIG. 2 and the assist pressure holding state shown in FIG. 3 are alternately achieved with the predetermined duty ratio Duty1 or Duty2. Additionally, the (V) assist pressure moderately increasing mode is achieved by changing the state of the brake force control apparatus from the assist pressure holding state to the assist pressure increasing state for the predetermined time $T_{MODE2}$, as described above. Accordingly, during execution of these modes, the pumps 100, 102 are maintained in operation and $SRC_{-1}$ 32 and $SRC_{-2}$ 36 are opened in a pulse-like manner, as shown in FIGS. 12B and 12C.

In the brake force control apparatus of the present embodiment, when $SRC_{-1}$ 32 and $SRC_{-2}$ 36 are opened, the pumps 100, 102 pump up the brake fluid from the first fluid pressure passage 26 and the second fluid pressure passage 28, respectively, and deliver the brake fluid to the wheel cylinders 70, 72, 74, 76 of the respective wheels. When the pumps 100, 102 start to pump up the brake fluid, the fluid pressure in the first fluid pressure passage 26 and the second fluid pressure passage 28, that is, the master cylinder pressure $P_{M/C}$, is decreased, even if the amount of brake operation performed by the driver is maintained to be constant. Hereinafter, the decrease in the master cylinder pressure $P_{M/C}$ caused by the pumps 100, 102 starting to pump up the brake fluid is referred to as a pumping-up associated decrease.

When the pumping-up associated decrease is generated in the master cylinder pressure $P_{M/C}$, the output signal pMC is decreased accordingly. Thus, as shown in FIG. 12A, the output signal pMC of the fluid pressure sensor 29 is temporarily decreased independent of the driver's intention after $SRC_{-1}$ 32 and $SRC_{-2}$ 36 is changed from a close state to an open state.

When the $SRC_{-1}$ 32 and $SRC_{-2}$ 36 are closed after the pumps 100, 102 have started to pump up the brake fluid, a flow of the brake fluid from the first fluid pressure passage 26 and the second fluid pressure passage 28 to the pumps 100, 102 is prevented. When the flow of the brake fluid to the pumps 100, 102 is prevented, a pulsation is generated in the pressure in the first fluid pressure passage 26 and the second fluid pressure passage 28, that is, the master cylinder pressure $P_{M/C}$. Thus, the output signal pMC of the fluid pressure sensor 29 fluctuates independent of the driver's intention for a certain period of time after $SRC_{-1}$ 32 and $SRC_{-2}$ 36 have changed from an open state to a closed state as shown in FIG. 12(A).

As described above, in the brake force control apparatus of the present embodiment, the output signal pMC of the fluid pressure sensor 29 may change independent of an increase or a decrease in the amount of brake operation when the state of $SRC_{-1}$ 32 and $SRC_{-2}$ 36 is changed. For this reason, if a change in the amount of brake operation is determined based on the output signal pMC, it is possible that an increase or a decrease in the amount of brake operation is erroneously detected when no change is generated in the amount of brake operation.

The brake force control apparatus of the present embodiment can generate a control signal pMC* in which the pumping-up associated decrease is compensated so as to prevent the above-mentioned erroneous detection, and perform the BA control based on the control signal pMC*.

Figure 13:
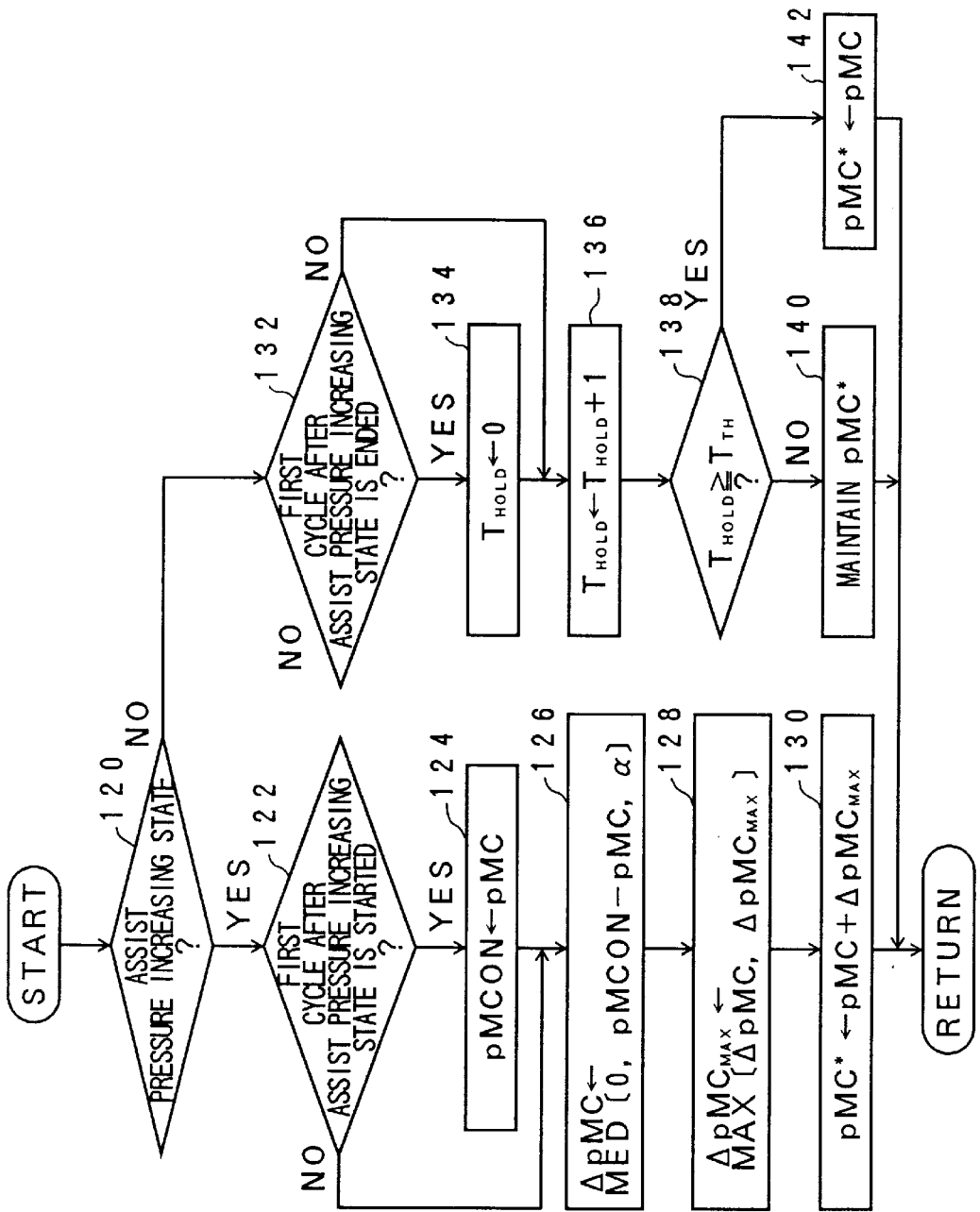
FIG. 13 is a flowchart of an example of a control routine performed so as to calculate a control signal pMC* in the first embodiment of the present invention.

Now a description will be given of the above-mentioned function of the brake force control apparatus of the present embodiment with reference to FIGS. 13 to 16. FIG. 13 is a flowchart of an example of a control routine performed by the ECU 10 so as to achieve the above-mentioned function. The routine shown in FIG. 13 is a periodic interruption routine which is started at predetermined times. When the routine shown in FIG. 13 is started, the process of step 120 is performed first.

In step 120, it is determined whether or not the assist pressure increasing state (the state shown in FIG. 2) is achieve. If it is determined that the assist pressure increasing state is achieved, then the process of step 122 is performed.

In step 122, it is determined whether or not the present process cycle is the first cycle after the assist pressure increasing state is achieved. If it is determined the present process cycle is the first cycle, then the process of step 124 is performed. On the other hand, if it is determined that the present process cycle is not the first cycle, then the step 124 is skipped and the process of step 126 is performed.

In step 124, the current output signal pMC of the fluid pressure sensor 29 is memorized as an initial output value pMCON.

Instep 126, a correction term ΔpMC is calculated. Specifically, in step 126, "0", "pMCON−pMC" and "α" are compared and the correction term ΔpMC is set to be a medium value of these three values. The value "α" used in step 126 is a guard value for the correction term ΔpMC.

In step 128, a maximum correction term $\Delta pMC_{MAX}$ is calculated. Specifically, in step 128, the correction term ΔpMC calculated in the present process cycle and the maximum correction term $\Delta pMC_{MAX}$ calculated in the previous process cycle are compared, and if correction term ΔpMC is greater than the maximum correction term $\Delta pMC_{MAX}$, the maximum correction term $\Delta pMC_{MAX}$ is updated to be the correction term ΔpMC calculated in the present cycle.

In step 130, the control signal pMC* is calculated. In the present step 130, the control signal pMC* is calculated by adding the maximum correction term $\Delta pMC_{MAX}$ to the output signal pMC. When the process of step 130 is finished, the present routine is ended.

Figure 14:
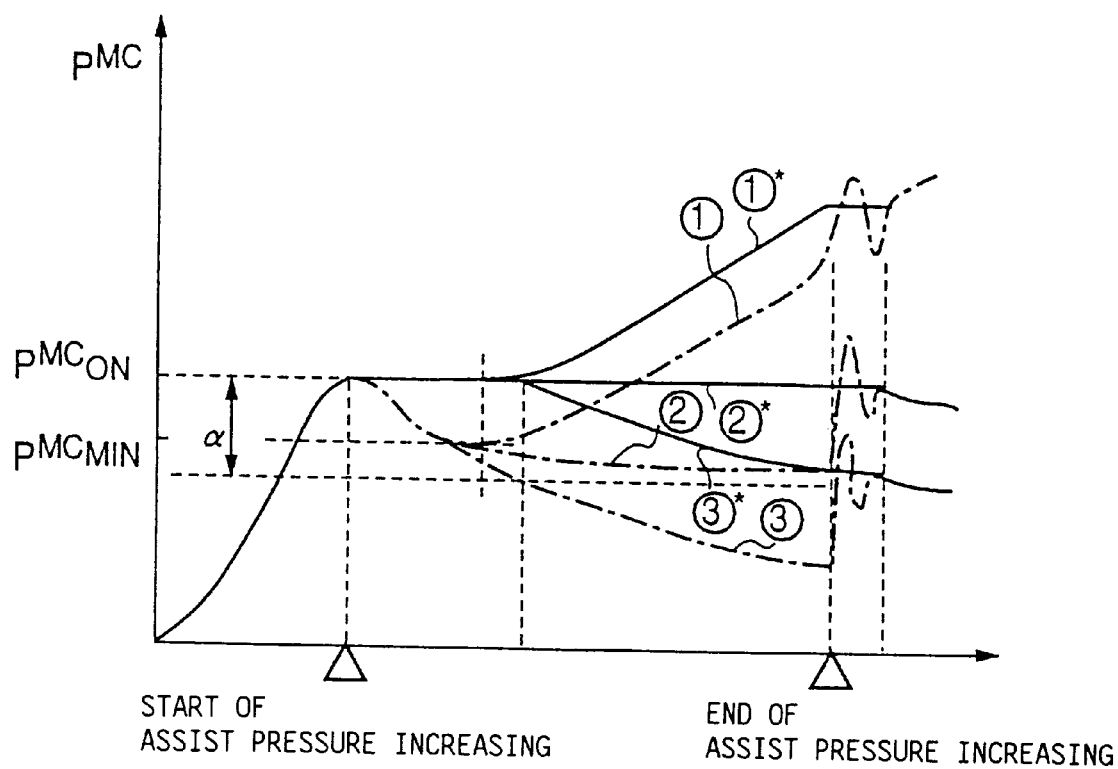
FIG. 14 is a diagram illustrating the output signal pMC of the fluid pressure sensor (curves ① to ③) and the control signal pMC* (curves ①* to ③*) corresponding to the output signal pMC.

FIG. 14 is a diagram illustrating the output signal pMC of the fluid pressure sensor 29 and the control signal pMC* calculated by the above-mentioned process. In FIG. 14, a chain line indicated by ① shows changes generated in the output signal pMC when the assist pressure increasing state is achieved in a situation where the amount of brake operation is being increased, and a solid line indicated by ①* shows changes in the control signal pMC* corresponding to that output signal pMC.

Additionally, in FIG. 14, a chain line indicated by ① shows changes generated in the output signal pMC when the assist pressure increasing state is achieved in a situation where the amount of brake operation is maintained, and a solid line indicated by ②* shows changes in the control signal pMC* corresponding to that output signal pMC. Similarly, a chain line indicated by ③ shows changes generated in the output signal pMC when the assist pressure increasing state is achieved in a situation where the amount of brake operation is being decreased, and a solid line indicated by ③* shows changes in the control signal pMC* corresponding to that output signal pMC.

In the above-mentioned step 130, the control signal pMC* is calculated in accordance with an equation pMC*=pMC+$\Delta pMC_{MAX}$. Additionally, according to the process of the above-mentioned step 128, the maximum correction term $\Delta pMC_{MAX}$ is updated to be a new correction term ΔpMC in every process cycle when the correction term ΔpMC continues to be increased. On the other hand, the maximum correction term $\Delta pMC_{MAX}$ is maintained to be a maximum value of the correction term ΔpMC in the past when the ΔpMC is maintained at a constant value or after the ΔpMC has started to be decreased.

According to the process of the above-mentioned step 126, the correction term ΔpMC is always maintained at "0" while the output signal pMC is being increased, that is, when "pMCON−pMC" is a negative value after the state of the brake force control apparatus has shifted to the assist pressure increasing state. While the correction term ΔpMC is maintained at "0", the maximum correction term $\Delta pMC_{MAX}$ is also maintained at "0". Accordingly, the control signal pMC* is maintained at a value which is equal to the output signal pMC during that period.

After the output signal pMC is decreased to a value which is smaller than the initial output value pMCON, that is, after "pMCON−pMC" has changed to a positive value, the correction term ΔpMC is set to be "pMCON−pMC". Afterwards, the correction term ΔpMC is increased in association with the decrease in the output signal pMC until "pMCON−pMC" exceeds the guard value α. While the correction term ΔpMC continues to be increased as described above, the maximum correction term $\Delta pMC_{MAX}$ is updated to be a larger value, with the equation $\Delta pMC_{MAX}$= pMCON−pMC being always satisfied. During this period, the control signal pMC* (=pMC+$\Delta pMC_{MAX}$) is maintained at a value which is equal to pMCON.

Accordingly, as shown in FIG. 14, the control signal pMC* (see the curves ①* to ③*) is maintained to be the initial output value pMCON during a period in which the output signal pMC (see the curves ① to ③) continues to be decreased after start of the assist pressure increasing state. As described above, the pumping-up associated decrease is generated in the output signal pMC after start of the assist pressure increasing state. Therefore, after the assist pressure increasing state is started, the output signal pMC is decreased even if the amount of brake operation is not decreased. In this case, by maintaining the output signal pMC* to be the initial output value pMCON as described above, it is possible to prevent an erroneous detection of a decrease in the amount of brake operation when the amount of brake operation is increased or maintained.

As shown by the curve ①, when the output signal pMC changes its changing trend from decrease to increase, a minimal value $pMC_{MIN}$ is generated in the output signal pMC. When the minimal value $pMC_{MIN}$ is detected, the maximum correction term $\Delta pMC_{MAX}$ is calculated as $\Delta pMC_{MAX}$=pMCON−$pMC_{MIN}$ at that time. Afterwards, the maximum correction term $\Delta pMC_{MAX}$ is maintained to be pMCON−$pMC_{MIN}$ while the output signal pMC is increased. Accordingly, after the output signal pMC has changed its changing trend to increase, the control signal pMC* (=pMC+$\Delta pMC_{MAX}$) becomes larger than the initial output value pMCON (see the curve ①*). Assuming that the amount of increase in the output signal pMC from the minimal value $pMC_{MIN}$ is Δp, the control signal pMC* can be expressed as pMC*=pMCON+Δp.

When the output signal pMC changes its changing trend from decrease to increase as shown by the curve ①, it can be determined that the driver is requesting a further large brake force. Additionally, changes generated in the output signal pMC after the changing trend is changed from decrease to increase accurately reflect the trend of the brake operation performed by the driver. According to the above-mentioned process, the control signal pMC* can be rapidly increased according to the same trend as that of the output signal pMC after the output signal pMC has changed its changing trend to increase, that is, after it is determined that the driver is requesting a further large brake force. Thus, according to the above-mentioned process, when the driver requests an increase in the brake force, the driver's intention can be accurately reflected in the control signal pMC* with the influence of the pumping-up associated decrease being eliminated therefrom.

When the output signal becomes smaller than the initial output value pMCON by a value exceeding the guard value α as shown by the curve ③, the correction term ΔpMC is fixed at α. Thus, the maximum correction term $\Delta pMC_{MAX}$ is fixed at the guard value α even if the output value pMC is further decreased. After the output signal pMC is further decreased in a situation where the maximum correction term $\Delta pMC_{MAX}$ is fixed at the guard value α, the control signal pMC* becomes smaller than the initial output value pMCON (see the curve ③*). In this case, the control signal pMC* can be expressed as pMC*=pMC+α.

When the output signal pMC is decreased by a value exceeding the guard value α as shown by the curve ③, it can be determined that the driver is decreasing the amount of brake operation. In this case, the trend of brake operation performed by the driver is accurately reflected in the change in the output signal pMC. According to the above-mentioned process, the control signal pMC* can be decreased according to the same trend as that of the output signal pMC immediately after the output signal pMC is decreased by a value exceeding the guard value α, that is, after it is determined that the driver is requesting a decrease in the brake force. Thus, according to the above-mentioned process, when the driver requests a decrease in the brake force, the driver's intention can be accurately reflected in the control signal pMC* with the influence of the pumping-up associated decrease being eliminated therefrom.

When the output signal pMC is moderately decreased within a range which does not exceed the guard value α as shown by the curve ②, both of the correction term ΔpMC and the maximum correction term $\Delta pMC_{MAX}$ are maintained to be pMCON−pMC. In this case, the control signal pMC* is maintained at a value equal to the initial output value pMCON (see the curve ②*).

When the output signal pMC is moderately decreased within a range which does not exceeds the guard value α as shown by the curve ②, it can be determined that the driver is maintaining the amount of brake operation. According to the above-mentioned process, the control signal pMC* can be maintained at a constant value in such a situation. Thus, according to the above-mentioned process, when the driver requests the brake force to be maintained, the driver's intention can be accurately reflected in the control signal pMC* with the influence of the pumping-up associated decrease being eliminated therefrom.

In FIG. 13, if it is determined, in the above-mentioned step 120, that the assist pressure increasing state is not achieved, then the process of step 132 is performed subsequent to step 120.

In step 132, it is determined whether or not the present process cycle is the first cycle after the assist pressure increasing state is ended. If it is determined that the present process cycle is the first cycle after the assist pressure increasing state is ended, then the process of step 134 is performed. On the other hand, if it is determined that the present process cycle is not the first cycle after the assist pressure increasing state is ended, step 134 is skipped and the process of the step 136 is performed.

In step 134, a holding time timer $T_{HOLD}$ is reset to "0". The holding time timer $T_{HOLD}$ is a timer for counting time which has elapsed after the assist pressure increasing state is ended.

In step 136, the holding time timer $T_{HOLD}$ is incremented.

In step 138, it is determined whether or not the time counted by the holding time timer $T_{HOLD}$ is greater than or equal to a predetermined time $T_{TH}$. The predetermined time $T_{TH}$ is a time required for the pulsation generated in the master cylinder pressure $P_{M/C}$ to converge after the assist pressure increasing state is ended, that is, after $SRC_{-1}$ 32 and $SRC_{-2}$ 36 are changed from an open state to a closed state. Thus, when $T_{HOLD} \geq T_{TH}$ is not established, it can be determined that the pulsation in the master cylinder pressure $P_{M/C}$ has not yet converged. In this case, the process of step 140 is then performed. On the other hand, if $T_{HOLD} \geq T_{TH}$ is established, it can be determined that the pulsation in the master cylinder pressure $P_{M/C}$ has converged. In this case, the process of step 142 is then performed.

In step 140, a process for maintaining the control signal pMC* to be its value in the previous cycle is performed. When the process of step 140 is finished, the present routine is ended.

In step 142, the control signal pMC* is set to be a value which is equal to the output signal pMC. When the process of step 142 is finished, the present routine is ended.

According to the above-mentioned processes, the control signal pMC* can be maintained at a constant value (see the curves ①* to ③*) until the pulsation in the master cylinder pressure $P_{M/C}$ has converged (see the curves ① to ③) as shown in FIG. 14. Additionally, according to the above-mentioned processes, the control signal pMC* can be set to be a value associated with the master cylinder $P_{M/C}$ after the pulsation in the master cylinder pressure $P_{M/C}$ has converged. Thus, according to the brake force control apparatus of the present embodiment, it is possible to always accurately reflect the driver's intention in the wheel cylinder pressure $P_{W/C}$ during execution of the BA control without being influenced by the pulsation in the master cylinder pressure $P_{M/C}$ which is generated in association with ending of the assist pressure increasing state.

As described above, in the present embodiment, the influence of the pumping-up associated decrease in the output signal pMC is eliminated from the output signal pMC* by maintaining the control signal pMC* at a value equal to the initial output value pMCON until the output signal is decreased by a value exceeding the guard value α. In order to appropriately eliminate the influence of the pumping-up associated decrease by using the guard value α as described above, it is necessary to set the guard value α to be greater than the maximum amount of decrease generated in the output signal pMC due to the pumping-up associated decrease.

However, if the guard value α is set to be an excessively large value, it is possible that the amount of decrease in the output signal pMC does not reach the guard value α for a relatively long time after the amount of brake operation is decreased. In this case, a long delay occurs after the amount of brake operation is decreased until this change is reflected in the control signal pMC*. Accordingly, in terms of quickly reflecting the brake operation to the control signal pMC* when the driver decreases the amount of brake operation, the guard value α is desired to be as small as possible.

Thus, it is important to set the guard value α to be a minimum value which is needed to compensate the decrease generated in the output signal pMC due to the pumping-up associated decrease, in order to appropriately eliminate the influence of the pumping-up associated decrease from the control signal pMC* and accurately reflect the driver's intention in the control signal pMC* in the brake force control apparatus of the present embodiment.

The maximum value of the amount of decrease generated in the output signal pMC due to the pumping-up associated decrease changes in accordance with the time for which the assist pressure increasing state lasts. Specifically, the maximum amount of the decrease becomes greater as the assist pressure increasing state lasts for a longer time. Thus, the guard value α is desired to be changed in accordance with the time for which the assist pressure increasing state lasts.

Additionally, the maximum amount of decrease generated in the output signal pMC due to the pumping-up associated decrease becomes greater as the master cylinder pressure $P_{M/C}$ becomes higher at a time when the assist pressure increasing state is started, that is, as the initial output value pMCON becomes larger. Accordingly, the guard value α is desired to be changed in accordance with the initial output value pMCON.

Now a description will be given, with reference to FIGS. 15 and 16, of a process performed by the ECU 10 so as to achieve the above functions.

Figure 15:
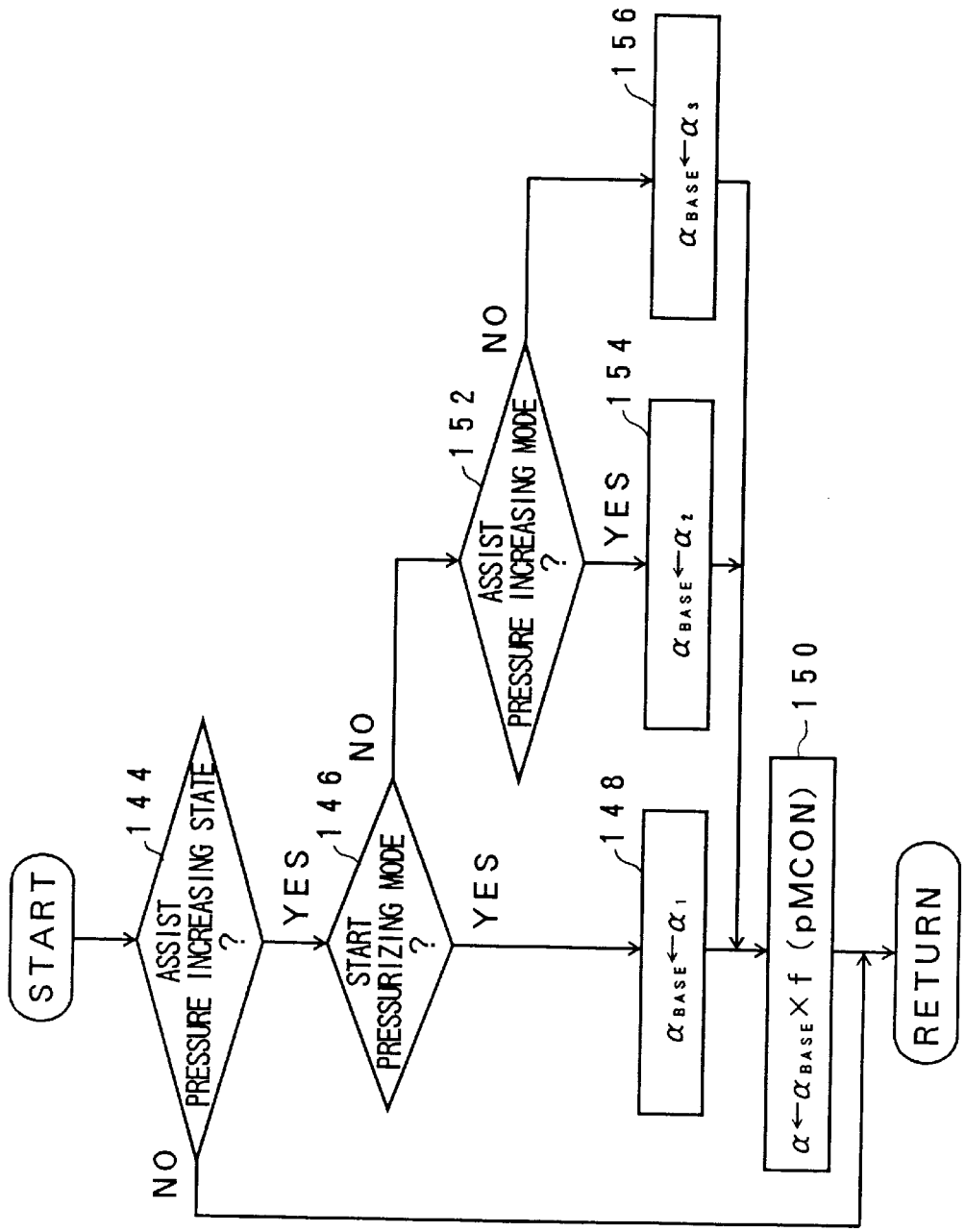
FIG. 15 is a flowchart of an example of a control routine performed so as to calculate a guard value a in the first embodiment of the present invention.

FIG. 15 shows a flowchart of an example of a control routine performed by the ECU 10 so as to set the guard value α. The routine shown in FIG. 15 is a periodic interruption routine which is started at predetermined times. When the routine shown in FIG. 15 is started, the process of step 144 is performed first.

In step 144, it is determined whether or not the assist pressure increasing state is achieved. If it is determined that the assist pressure increasing state is not achieved, no further process is performed thereafter and the present routine is ended. On the other hand, if it is determined that the assist pressure increasing state is achieved, the process of step 146 is performed. It should be noted that, in the present embodiment, the assist pressure increasing state is achieved during execution of the (I) start pressurizing mode, the (II) assist pressure increasing mode or the (V) the assist pressure moderately increasing mode, as described above.

In step 146, it is determined whether or not the (I) start pressurizing mode is being performed. If it is determined that the start pressurizing mode is being performed, then the process of step 148 is performed.

In step 148, a predetermined value $α_1$ is assigned to the base guard value $α_{BASE}$. In the start pressurizing mode, the assist pressure increasing state and the assist pressure holding state are alternately achieved with the duty ratio Duty1. The predetermined value $α_1$ has been set to be a value corresponding to a time for which the assist pressure increasing state is maintained in the process of the alternation.

In step 150, the guard value α is calculated by multiplying the base guard value $α_{BASE}$ by a correction factor f(pMCON). The correction factor f(pMCON) is a value which is calculated as a function of the initial output value pMCON.

Figure 16:
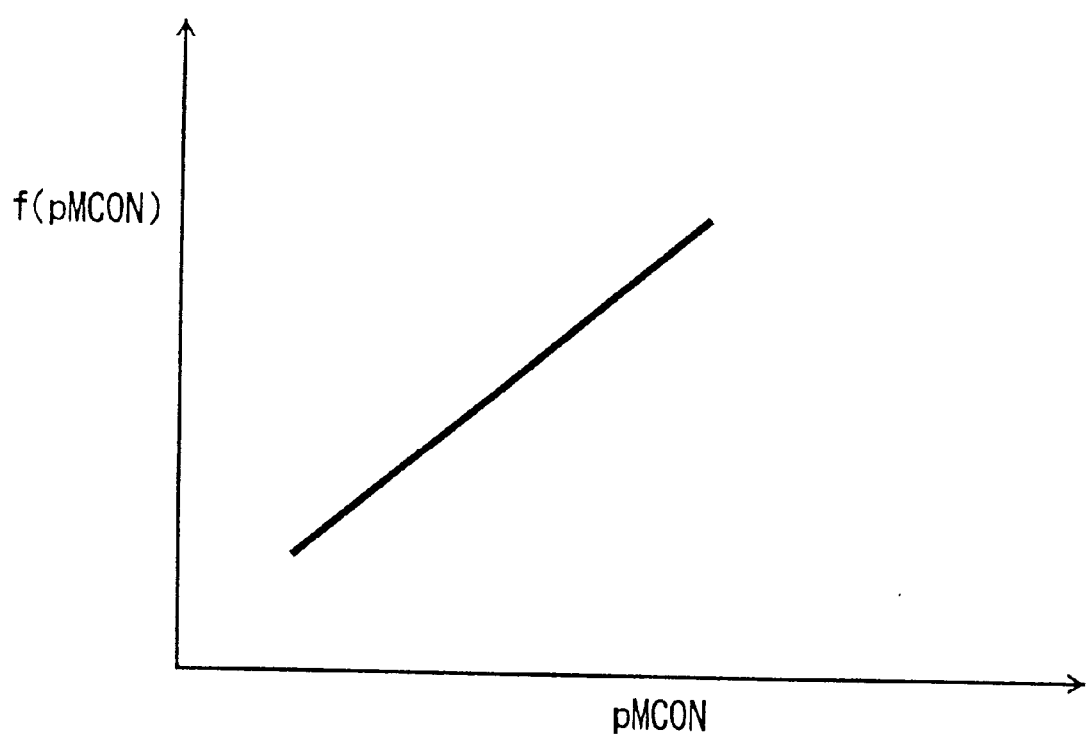
FIG. 16 is an example of a map which is referred to so as to determine a factor f(pMCON) during execution of the control routine shown in FIG. 15.

FIG. 16 shows an example of a map which is referred to by the ECU 10 so as to determine the correction factor f(pMCON). As shown in FIG. 16, the correction factor f(pMCON) becomes a greater value as the initial output value pMCON becomes greater. Accordingly, in the above-mentioned step 150, the guard value α is corrected to be a greater value as compared to the base guard value $α_{BASE}$ as the initial output value pMCON becomes greater, that is, as the master cylinder pressure $P_{M/C}$ becomes higher at a time when the assist pressure increasing state is started. When the process of step 150 is finished, the present routine is ended.

In the above-mentioned step 146 of the present routine, if it is determined that the start pressurizing mode is not being performed, then the process of step 152 is performed.

In step 152, it is determined whether or not the (II) assist pressure increasing mode is being performed. If it is determined that the assist pressure increasing mode is being performed, then the process of step 154 is performed. On the other hand, if it is determined that the assist pressure increasing mode is not being performed, it can be determined that the (V) assist pressure moderately increasing mode is being performed. In this case, the process of step 156 is performed.

In step 154, a predetermined value $α_2$ is assigned to the base guard value $α_{BASE}$. In the assist pressure increasing mode, the assist pressure increasing state and the assist pressure holding state are alternately achieved with the duty ratio Duty2. The predetermined value $α_2$ has been set to be a value corresponding a time for which the assist pressure increasing state is maintained in the process of the alternation. When the process of step 154 is finished, the process of the above-mentioned step 150 is performed and then the present routine is ended.

Instep 156, a predetermined value α3 is assigned to the base guard value $\alpha_{BASE}$. In the assist pressure moderately increasing mode, the assist pressure increasing state is maintained for the predetermined time $T_{MODE2}$ at maximum. The predetermined value α3 has been set to be a value corresponding to the predetermined time $T_{MODE2}$. When the process of step 156 is finished, the process of the above-mentioned step 150 is performed and then the present routine is ended.

As described above, according to the above-mentioned processes, the base guard value $\alpha_{BASE}$ is set to be $\alpha_1$, $\alpha_2$ or α3 in accordance with the time for which the assist pressure increasing state is maintained. Additionally, according to the above-mentioned processes, the base guard value $\alpha_{BASE}$ can be corrected in accordance with the initial output value pMCON, that is, the master cylinder pressure $P_{M/C}$ which is generated at a time when the assist pressure increasing state is started, and thus an appropriate guard value α can be calculated. Therefore, according to the brake force control apparatus of the present embodiment, during execution of the BA control, it is possible to generate the wheel cylinder pressure $P_{W/C}$ in the wheel cylinders 70, 72, 74, 76 of the respective wheels to which the driver's intention is accurately reflected without being influenced by the pumping-up associated decrease in the output signal pMC.

Now a description will be given, with reference to FIGS. 17 and 18, of a second embodiment of the present invention. The brake force control apparatus of the present embodiment is achieved by the ECU 10 performing the routine shown in FIG. 17 in the above-mentioned system construction shown in FIG. 1.

Figure 17:
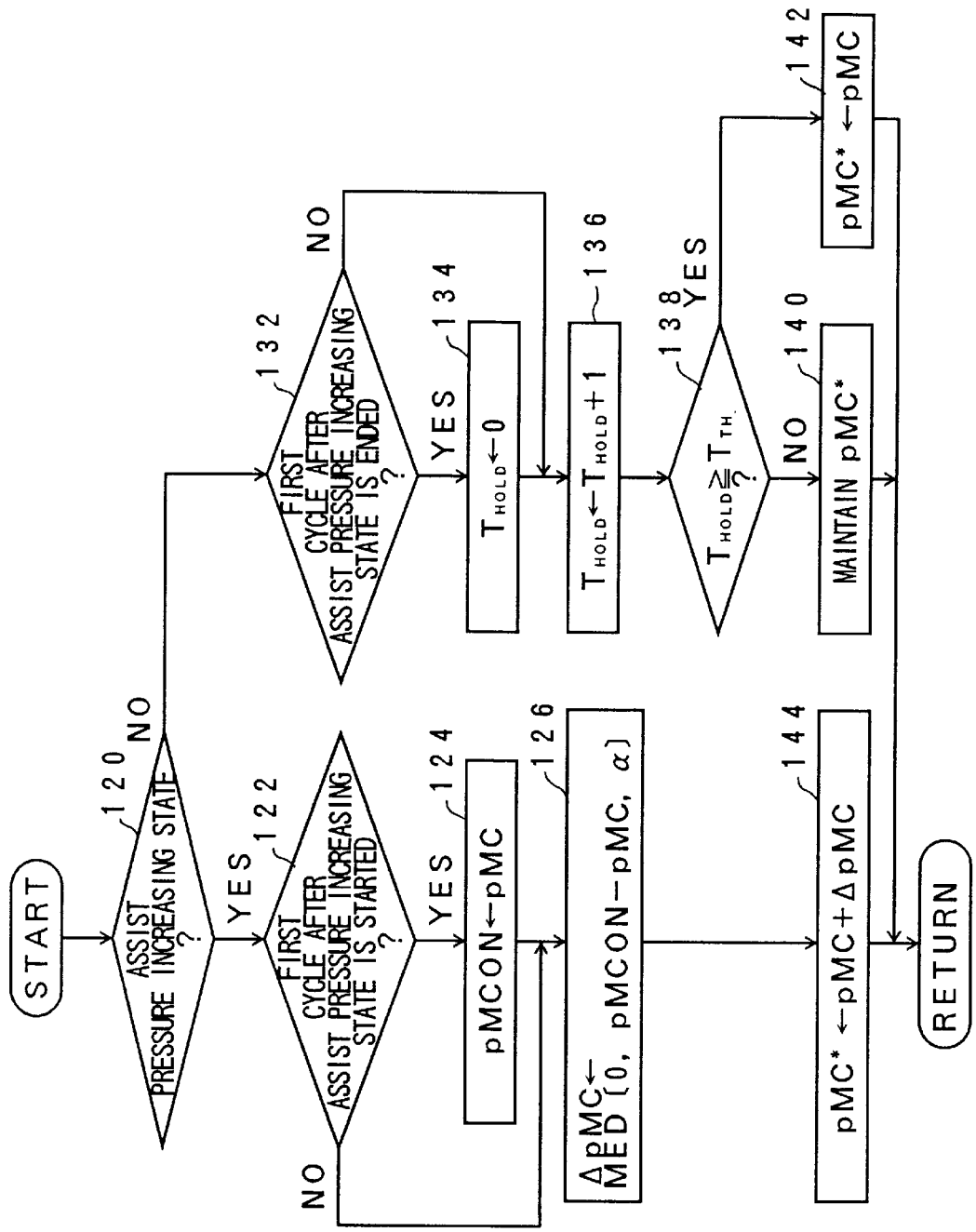
FIG. 17 is a flowchart of an example of a control routine performed so as to calculate the control signal pMC* in a second embodiment of the present invention.

FIG. 17 shows a flowchart of an example of a control routine performed by the ECU 10 in the present embodiment. The routine shown in FIG. 17 is the same as the routine shown in FIG. 13 except that the process of step 144 is performed instead of the process of steps 128, 130 after the process of step 126 is finished. A description for steps which are the same as those in the routine shown in FIG. 13 will be omitted.

In step 144 of the routine shown in FIG. 17, the control signal pMC* is calculated. In the present step 144, the control signal pMC* is calculated by adding the correction term ΔpMC to the output signal pMC. When the process of step 144 is finished, the present routine is ended.

Figure 18:
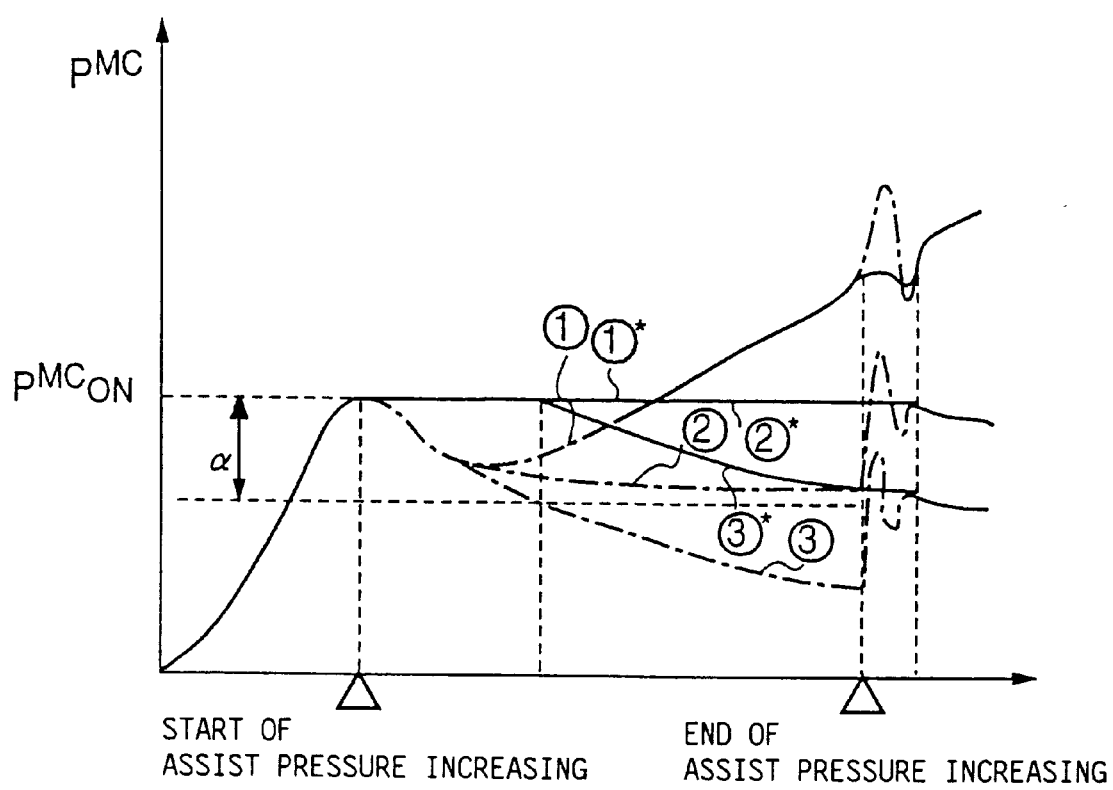
FIG. 18 is a diagram illustrating the output signal pMC of the fluid pressure sensor (curves ① to ③) and the control signal pMC* (curves ①* to ③*) corresponding to the output signal pMC.

FIG. 18 is a diagram illustrating the output signal pMC and the control signal pMC* calculated by the above-mentioned process. In FIG. 18, a chain line indicated by ① shows changes generated in the output signal pMC when the assist pressure increasing state is achieved in a situation where the amount of brake operation is being increased and a solid line indicated by ①* shows changes in the control signal pMC* corresponding to that output signal pMC.

Additionally, in FIG. 18, a chain line indicated by ② shows changes generated in the output signal pMC when the assist pressure increasing state is achieved in a situation where the amount of brake operation is maintained, and a solid line indicated by ②* shows changes in the control signal pMC* corresponding to that output signal pMC. Similarly, a chain line indicated by ③ shows changes generated in the output signal pMC when the assist pressure increasing state is achieved in a situation where the amount of brake operation is being decreased, and a solid line indicated by ③* shows changes in the control signal pMC* corresponding to that output signal pMC.

As shown in FIG. 18, the output signal pMC is temporarily decreased due to the pumping-up associate decrease after the assist pressure increasing state is established, independent of the amount of brake operation. Thus, after the assist pressure increasing state is started, the output signal pMC is smaller than the initial output value pMCON.

According to the above-mentioned process of step 126, the correction term ΔpMC is set to be "pMCON−pMC" when the output signal pMC is smaller than or equal to the initial output value pMCON and the amount of decrease in the output signal pMC is smaller than the guard value α, that is, when the output signal pMC satisfies "pMCON≧pMC≧pMCON−α". In this case, the control signal pMC* is set to be a value equal to the initial output value pMCON in step 144. Therefore, the output value pMC is maintained to be the initial output value pMCON for a predetermined period immediately after start of the assist pressure increasing state, irrespective of a change in the amount of brake operation, as shown in FIG. 18.

As described above, the control signal pMC* is maintained to be the initial output value pMCON (see the curves ①* to ③*) while the pumping-up associated decrease is generated in the output signal pMC (see the curves ① to ③) after start of the assist pressure increasing state. Thus, it is possible to prevent an erroneous detection of a decrease in the amount of brake operation in a situation where the amount of brake operation is maintained or increased.

When the driver continues to increase the amount of brake operation as shown by the curve ① in FIG. 18, the output signal pMC starts to be increased after being temporarily decreased due to the pumping-up associated decrease. In this case, the output signal pMC reaches a value exceeding the initial output value pMCON after some time. In the above-mentioned step 126, the correction term ΔpMC is set to "0" if the output signal pMC satisfies "pMC>pMCON". In this case, as shown by the curve ①* in FIG. 18, the control signal pMC* is set to a value equal to the output signal pMC in step 144. In this way, according to the above-mentioned process, when the driver intends to increase the amount of brake operation, it is possible to accurately reflect the driver's intention to the control signal pMC* while eliminating the influence of the pumping-up associated decrease.

When the driver is decreasing the amount of brake operation, the output signal pMC is decreased by a value exceeding the guard value α as shown by the curve ③ in FIG. 18. In the above-mentioned step 126, the correction term ΔpMC is set to "α" if the output signal pMC satisfies "pMCON−α>pMC". In this case, as shown by the curve ③* in FIG. 18, the control signal pMC is set to "pMC+α" in the above-mentioned step 144. Thus, according to the above-mentioned process, when the driver intends to decrease the amount of brake operation, it is possible to accurately reflect the driver's intention to the control signal pMC* while eliminating the influence of the pumping-up associated decrease.

When the driver maintains the amount of brake operation, the output signal pMC is moderately changed within a range which does not exceed the guard value as shown by the curve ② in FIG. 18. In this case, according to the above-mentioned process, the control signal pMC* is maintained to be the initial output value pMCON for a relatively long time. Thus, according to the above-mentioned process, when the driver intends to maintain the amount of brake operation, it is possible to accurately reflect the driver's intention to the control signal pMC* while eliminating the influence of the pumping-up associated decrease.

Now a description will be given of a brake force control apparatus of a third embodiment of the present invention. Similar to the first and second embodiments, the above-mentioned (I) start pressurizing mode, (II) assist pressure increasing mode, (III) assist pressure increasing mode, (IV) assist pressure holding mode, (V) assist pressure moderately increasing mode and (VI) assist pressure moderately decreasing mode are performed in the system shown in FIG. 1 by the ECU 10 referring to the maps shown in FIGS. 6 to 11.

In the present embodiment, during execution of the assist pressure moderately increasing mode, the ECU 10 refers to the map shown in FIG. 10 at a time when a predetermined time "$T_{MODE2}$+TCIH" has elapsed after start of the assist pressure moderately increasing mode so as to determine a mode which should be performed subsequent to the assist pressure moderately increasing mode.

As described in connection with the first embodiment, after the assist pressure moderately increasing mode is requested, the brake force control apparatus is maintained in the assist pressure increasing state for the predetermined time $T_{MODE2}$ and then returned to the assist pressure holding state. Additionally, the pulsation is generated in the output signal pMC of the fluid pressure sensor 29 for a predetermined time after the state of the brake force control apparatus is changed from the assist pressure increasing mode to the assist pressure holding state. Accordingly, it is appropriate not to determine the driver's intention based on the output signal pMC until the predetermined time has elapsed after the brake force control apparatus is returned to the assist pressure holding state. Thus, by referring to the map shown in FIG. 10 at a time when the predetermined time $T_{MODE2}$+TCIH has elapsed after start of the assist pressure moderately increasing mode as described above, it is possible to determined the mode to be performed subsequent to the assist pressure moderately increasing mode based on the output signal pMC in which the pulsation has converged.

If the master cylinder pressure $P_{M/C}$ is being rapidly increased at a time when the predetermined time $T_{MODE2}$+TCIH has elapsed after start of the assist pressure moderately increasing mode, it can be determined that the driver is requesting a rapid increase in the brake force. The ECU 10 determines that the driver is requesting a rapid increase in the brake force if a change exceeding the predetermined value P5 (that is, a change satisfying pMC−pMCSTA>P5) is generated in the output signal pMC and the change rate dpMC/dt is greater than the predetermined value K7 (>0) at a time when the mode is selected. In this case, the ECU 10 changes the mode which should be performed from the assist pressure moderately increasing mode to the assist pressure increasing mode.

If a rapid increase is not detected in the master cylinder pressure $P_{M/C}$ at a time when the predetermined time $T_{MODE2}$+TCIH has elapsed after start of the assist pressure moderately increasing mode, it can be determined that the driver is not requesting a rapid increase in the brake force. The ECU 10 determines that the driver is not requesting a rapid increase in the brake force if the above-mentioned condition for shifting to the assist pressure increasing mode is not established at a time when the mode is selected. In this case, the ECU 10 changes the mode which should be performed from the assist pressure moderately increasing mode to the assist pressure holding mode As described in connection with the first embodiment, during execution of the above-mentioned (I) start pressurizing mode, (II) assist pressure increasing mode and (V) assist pressure moderately increasing mode, the assist pressure increasing state shown in FIG. 2 and the assist pressure holding state shown in FIG. 3 are alternately achieved.

Figure 19A:
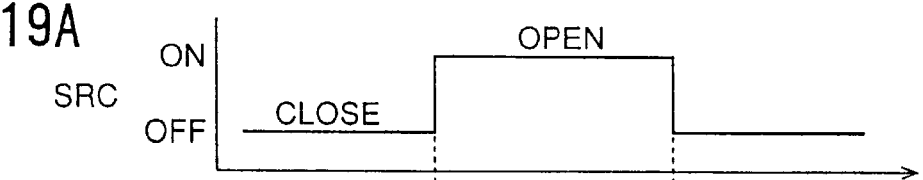
FIG. 19A is a time chart illustrating changes in the state of the reservoir cut solenoid valves $SRC_{-1}$ and $SRC_{-2}$ before and after the assist pressure increasing state is achieved in a third embodiment of the present invention.
Figure 19B:
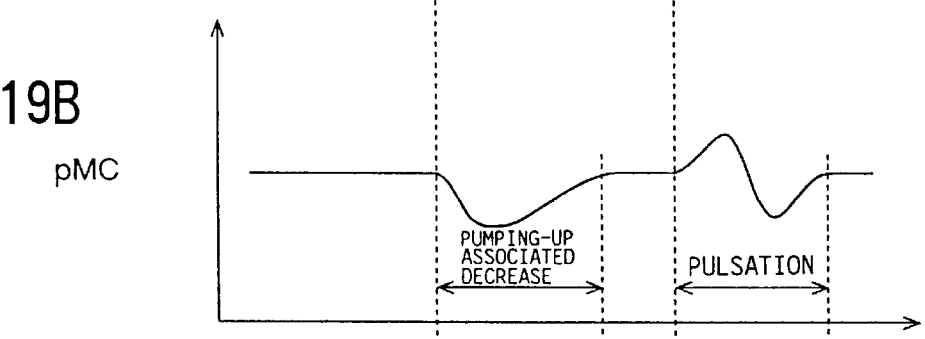
FIG. 19B is a time chart illustrating changes in the output signal pMC of the fluid pressure sensor before and after the assist pressure increasing state is achieved in the third embodiment of the present invention.

FIGS. 19A and 19B are diagrams illustrating changes generated in the state of SRC$_{-1}$ 32 and SRC$_{-2}$ 36 and the output signal pMC, respectively, when the assist pressure increasing state and the assist pressure holding state are alternately achieved.

In the brake force control apparatus of the present embodiment, as described in connection with the first embodiment, the output signal pMC is temporarily decreased independent of the driver's intention due to the pumping-up associated decrease immediately after SRC$_{-1}$ 32 and SRC$_{-2}$ 36 are switched from a closed state to an open state, as shown in FIGS. 19A and 19B. Additionally, also as described in connection with the first embodiment, the pulsation is generated in the output signal pMC independent of the driver's intention when SRC$_{-1}$ 32 and SRC$_{-2}$ 36 are switched from an open state to a closed state, as shown in FIGS. 19A and 19B.

As described above, the output signal pMC of the fluid pressure sensor 29 may be changed independent of the amount of brake operation performed by the driver when the state of the SRC$_{-1}$ 32 and SRC$_{-2}$ 36 is changed, that is, when the state of the brake force control apparatus is changed between the assist pressure increasing state and the assist pressure holding state. For this reason, if the amount of brake operation is always detected based on the output signal pMC during execution of the BA control, the change may be erroneously detected in a situation where the brake operation is not changed.

Figure 19C:
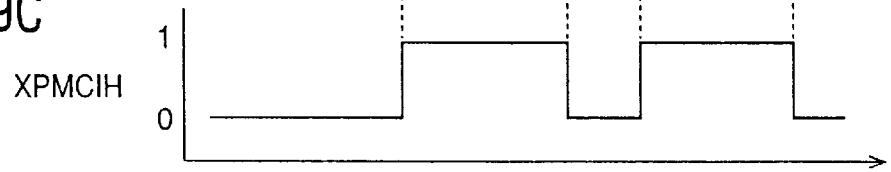
FIG. 19C is a time chart illustrating changes generated in a readout inhibiting flag XPMCIH before and after the assist pressure increasing state is achieved in the third embodiment of the present invention.

FIG. 19C is a diagram showing the state of an readout inhibiting flag XPMCIH used by the ECU 10 so as to prevent the above-mentioned erroneous detection during execution of the BA control. As shown in FIG. 19C, the readout inhibiting flag XPMCIH is set to "1" ① when the output signal pMC is decreased due to the pumping-up associated decrease after SRC$_{-1}$ 32 and SRC$_{-2}$ 36 are changed to an open state, or ② when the output signal pMC fluctuates after SRC$_{-1}$ 32 and SRC$_{-1}$ 36 are changed to a closed state.

In other words, the readout inhibiting flag XPMCIH is a flag which is set to "0" when the output signal pMC and the amount of brake operation intended by the driver accurately correspond to each other and set to "1" when they do not accurately correspond to each other. The ECU 10 permits the output signal pMC to be reflected in the BA control when the readout inhibiting flag is set to "0" and inhibits the output signal pMC from being reflected in the BA control when the readout inhibiting flag is set to "1". Thus, according to the brake force control apparatus of the present embodiment, it is possible to perform the BA control in which the driver's intention is accurately reflected without being influenced by the pumping-up associated decrease or the pulsation generated in the master cylinder pressure $P_{M/C}$.

Now a description will be given, with reference to FIGS. 20 to 29, of contents of the process performed by the ECU 10 so as to achieve the above-mentioned function.

Figure 20:
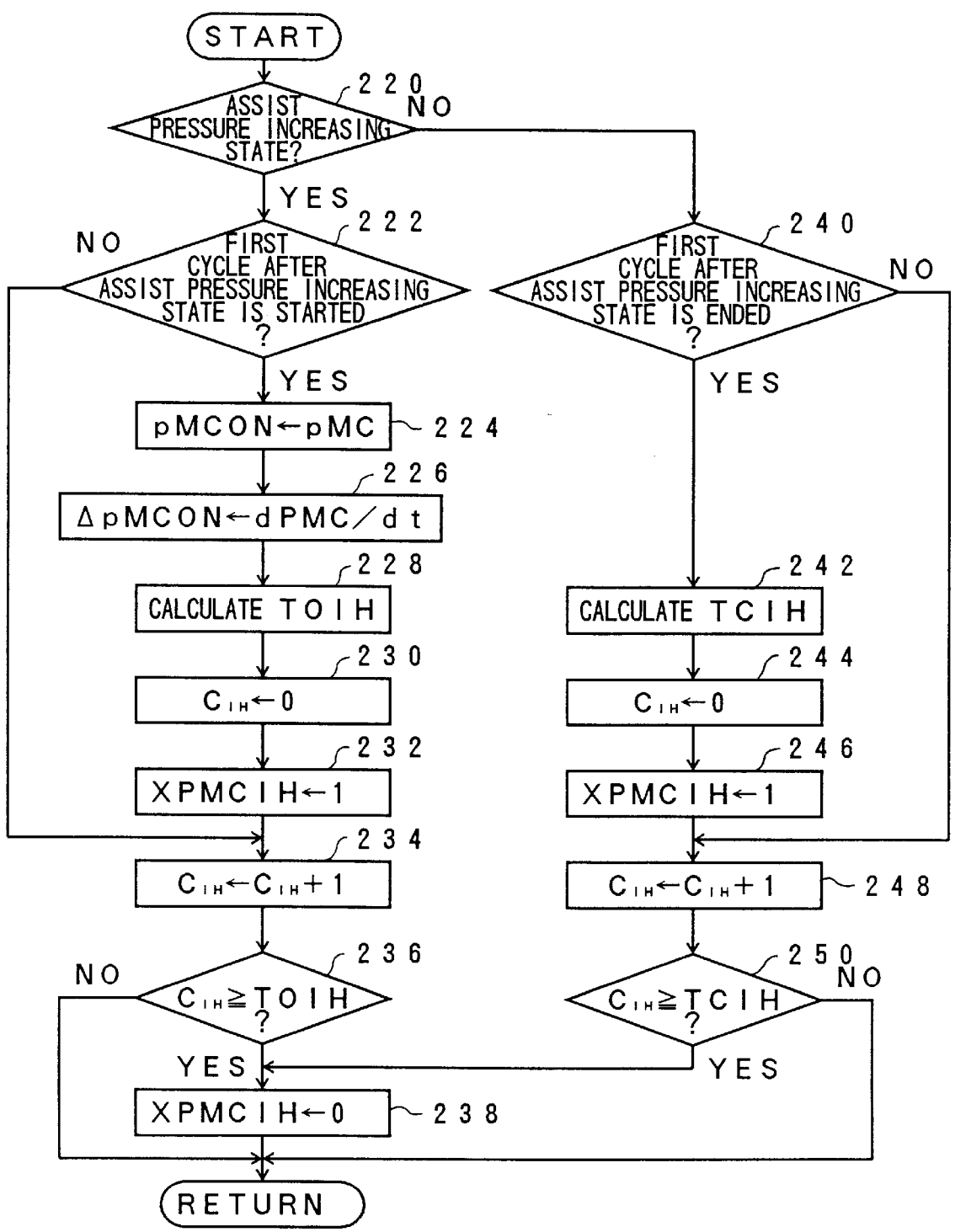
FIG. 20 is a flowchart of an example of a control routine performed so as to process the readout inhibiting flag XPMCIH in the third embodiment of the present invention.

FIG. 20 is a flowchart of an example of a control routine performed by the ECU 10 so as to process the readout inhibiting flag XPMCIH. The routine shown in FIG. 20 is a periodic interruption routine which is started at predetermined times. When the routine shown in FIG. 20 is started, the process of step 220 is performed first.

In step 220, it is determined whether or not the brake force control apparatus is set in the assist pressure increasing state shown in FIG. 2. If it is determined that the assist pressure increasing state is achieved, then the process of step 222 is performed.

In step 222, it is determined whether or not the present process cycle is the first process cycle after the assist pressure increasing state is started. If it is determined that the present process is the first cycle, then the process of step 224 is performed. On the other hand, if it is determined that the present process cycle is not the first cycle, steps 224 to 232 are skipped and the process of step 234 is performed.

In step 224, the value of the output signal pMC at a time when the assist pressure increasing state is started is memorized as the initial output value pMCON. Before the assist pressure increasing state is started, the output signal pMC accurately corresponds to the amount of brake operation intended by the driver. Thus, the initial output value pMCON accurately corresponds to the amount of brake operation at a time when the assist pressure increasing state is started.

In step 226, the change rate dpMC/dt at a time when the assist pressure increasing state is started is memorized as initial change rate $\Delta$pMCON. Before the assist pressure increasing state is started, the change rate dpMC/dt accurately corresponds to a change rate of the amount of brake operation. Thus, the initial change rate $\Delta$pMCON accurately corresponds to the brake operating speed at a time when the assist pressure increasing state is started.

In step 228, an open time inhibiting period TOIH is calculated. The open time inhibiting period TOIH is a period during which the output signal pMC is assumed to be decreased due to the pumping-up associated decrease after the assist pressure increasing state is started, that is, after the $SRC_{-1}$ 32 and $SRC_{-2}$ 36 are changed to the open state.

Figure 21:
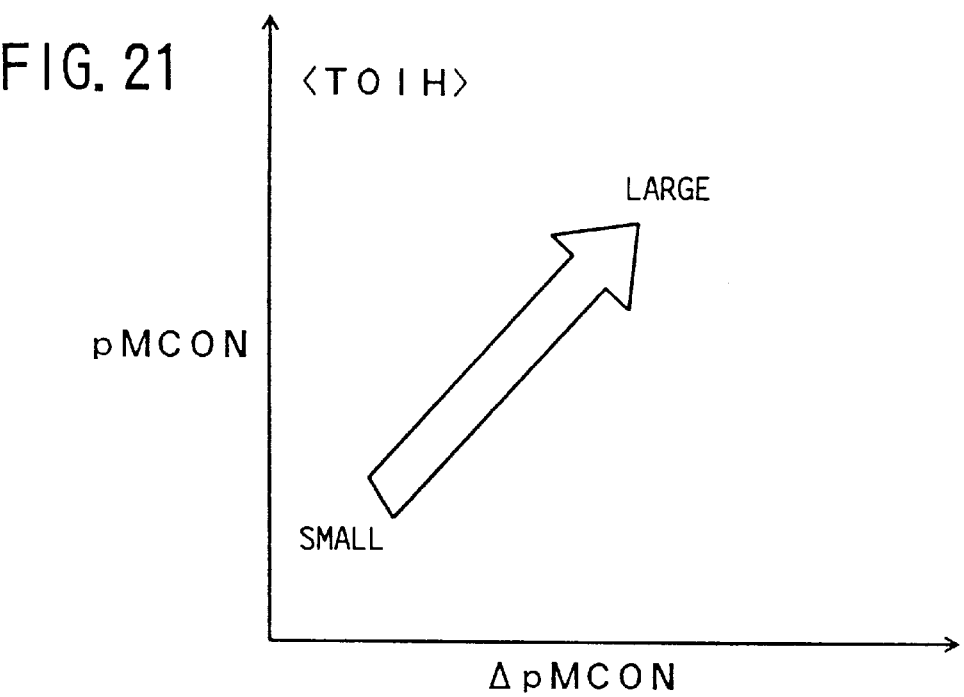
FIG. 21 is a map which is referred to during execution of the control routine shown in FIG. 20 so as to determine an open time inhibiting time TOIH.

FIG. 21 is an example of a map which defines the open time inhibiting period TOIH in relation to the initial output value pMCON and the initial change rate $\Delta$pMCON. In the above-mentioned step 228, the ECU 10 calculates the open time inhibiting period TOIH in accordance with the map shown in FIG. 21. According to the map shown in FIG. 21, the open time inhibiting period TOIH is set to be a greater value as the initial output value pMCON becomes greater and as the initial change rate $\Delta$pMCON becomes greater.

Due to the pumping-up associated decrease, the master cylinder pressure $P_{M/C}$ is decreased to a greater extent as the value thereof becomes greater. Thus, the period during which the output signal pMC is decreased due to the pumping-up associated decrease after $SRC_{-1}$ 32 and $SRC_{-2}$ 36 are changed to an open state becomes longer as the master cylinder pressure $P_{M/C}$ becomes higher at that time, that is, as the initial output value pMCON becomes greater.

Additionally, a time which is taken for the master cylinder pressure $P_{M/C}$ to be returned to a value which corresponds to the amount of brake operation intended by the driver after $SRC_{-1}$ 32 and $SRC_{-2}$ 36 are changed to an open state becomes longer as the amount of brake operation is more rapidly increased. Thus, a time during which the output signal pMC is decreased as compared to the amount of brake operation intended by the driver becomes longer as the initial change rate $\Delta$pMCON becomes greater.

As described above, according to the map shown in FIG. 21, the open time inhibiting period TOIH can be set to be longer as the initial output value pMCON becomes greater and as the initial change rate $\Delta$pMCON becomes greater. Thus, according to the above-mentioned process, it is possible to achieve an accurate correspondence between the open time inhibiting period TOIH and the period during which the output signal pMC does not correspond to the amount of brake operation intended by the driver.

In step 230, an inhibiting counter $C_{IH}$ is reset to "0". In step 232, the readout inhibiting flag XPMCIH is set to "1". According to this process in step 232, the readout inhibiting flag XPMCIH can be set to "1" simultaneously with the start of the assist pressure increasing state. In step 234, the inhibiting counter $C_{IH}$ is incremented.

In step 236, it is determined whether or not the inhibiting counter $C_{IH}$ has reached the open time inhibiting period TOIH. If it is determined that $C_{IH} \geq$ TOIH is not established, it can be determined that the output signal pMC has not yet returned to a value which accurately corresponds to the amount of brake operation. In this case, no further process is performed thereafter and the present routine is ended. On the other hand, if it is determined that $C_{IH} \leq$ TOIH is established, it can be determined that the output signal pMC has returned to a value which accurately corresponds to the amount of brake operation. In this case, the process of step 238 is performed.

In step 238, the readout inhibiting flag XPMCIH is reset to "0". According to this process, the readout inhibiting flag XPMCIH can be set to "1" only in a period during which the output signal pMC is decreased as compared to the amount of brake operation intended by the driver due to the pumping-up associated decrease. When the process of step 238 is finished, the present routine is ended.

In the above-mentioned step 220 of the routine shown in FIG. 20, if it is determined that the assist pressure increasing state is not achieved, then the process of step 240 is performed.

In step 240, it is determined whether or not the present process cycle is the first cycle after the assist pressure increasing state is ended. If it is determined that the present process is the first cycle, then the process of step 242 is performed. On the other hand, if it is determined that the present process cycle is not the first cycle, steps 242 to 246 are skipped and the process of step 248 is performed.

In step 242, a close time inhibiting period TCIH is calculated. The close time inhibiting period TCIH is a period during which the output signal pMC is assumed to fluctuate due to the pulsation after the assist pressure increasing state is ended, that is, after $SRC_{-1}$ 32 and $SRC_{-2}$ 36 are changed to a closed state.

Figure 22:
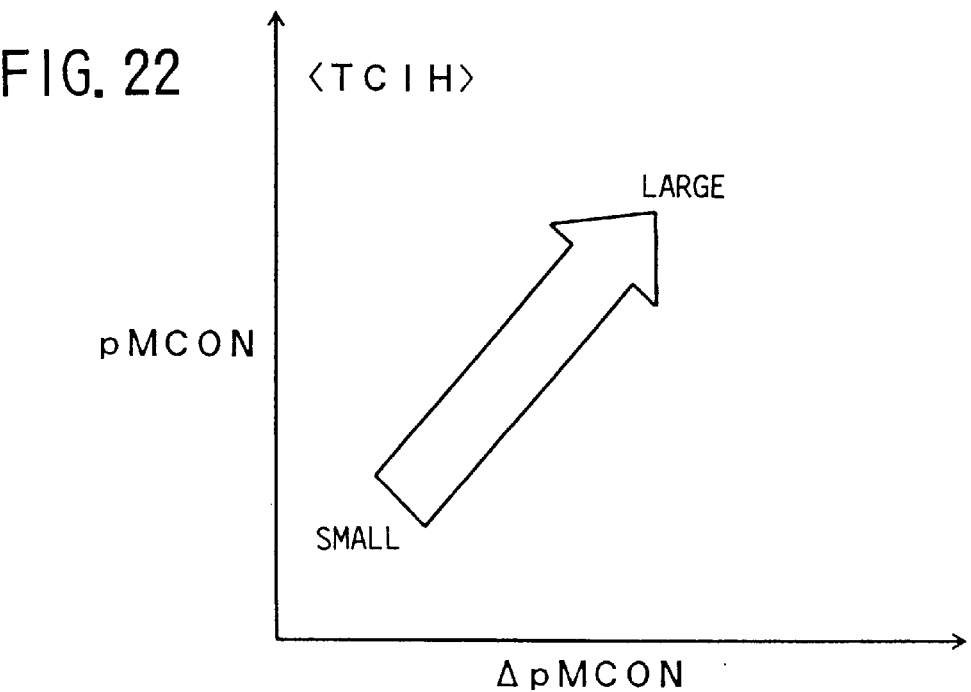
FIG. 22 is a map which is referred to during execution of the control routine shown in FIG. 20 so as to determine a close time inhibiting time TCIH.

FIG. 22 is an example of a map which defines the close time inhibiting period TCIH in relation to the initial output value pMCON and the initial change rate $\Delta$pMCON. In the above-mentioned step 242, the ECU 10 determines the close time inhibiting period TCIH in accordance with the map shown in FIG. 22. According to the map shown in FIG. 22, the close time inhibiting period TCIH becomes longer as the initial output value pMCON becomes greater and as the initial change rate $\Delta$pMCON becomes greater.

A period during which the pulsation is generated in the master cylinder pressure $P_{M/C}$ becomes longer as a higher master cylinder pressure $P_{M/C}$ is generated and as the brake operation is performed at a higher speed at a time when $SRC_{-1}$ 32 and $SRC_{-2}$ 36 are changed to a closed state. The initial output value pMCON and the initial change rate $\Delta$pMCON substantially correspond to the master cylinder pressure $P_{M/C}$ and the brake operating speed, respectively, at a time when the $SRC_{-1}$ 32 and $SRC_{-2}$ 36 are changed to a closed state. Accordingly, the period during which the pulsation is generated in the master cylinder pressure $P_{M/C}$ becomes longer as the initial output value pMCON becomes greater and as the initial change rate $\Delta$pMCON becomes greater.

As described above, according to the map shown in FIG. 22, the close time inhibiting period TCIH can be set to be longer as the initial output value pMCON becomes greater and as the initial change rate $\Delta$pMCON becomes greater. Thus, according to the above-mentioned process, it is possible to achieve an accurate correspondence between the close time inhibiting period TCIH and the period during which the output signal pMC does not accurately correspond to the amount of brake operation intended by the driver due to the pulsation in the master cylinder pressure $P_{M/C}$.

In step 244, the inhibiting flag $C_{IH}$ is reset to "0". In step 246, the readout inhibiting flag XPMCIH is set to "1". According to this process in step 246, the readout inhibiting flag XPMCIH can be set to "1" simultaneously with ending of the assist pressure increasing state. In step 248, the inhibiting flag is incremented.

In step 250, it is determined whether or not the inhibiting counter $C_{IH}$ has reached the close time inhibiting period TCIH. If it is determined that $C_{IH} \geq$ TCIH is not established, it can be determined that the pulsation in the output signal pMC has not yet converged. In this case, no further process is performed thereafter and the present routine is ended. On the other hand, if it is determined that $C_{IH} \geq$ TCIH is established, it can be determined that the output signal pMC has reached a value which accurately corresponds to the amount of the brake operation. In this case, the process of the above-mentioned step 238 is performed.

According to the above-mentioned process, the readout inhibiting flag XPMCIH can be set to "1" only in a period during which the pulsation is generated in the output signal pMC. Thus, according to the routine shown in FIG. 20, the readout inhibiting flag XPMCIH can be set to "1" in a period during which the output signal pMC and the amount brake operation do not accurately correspond to each other and can be set to "0" in a period during which they accurately correspond to each other, in a situation where the assist pressure increasing state and the assist pressure holding state are alternately achieved, that is, in a situation where the $SRC_{-1}$ 32 and $SRC_{-2}$ 36 are repeatedly closed and opened with the pumps 100, 102 being in operation.

As described above, the ECU 10 inhibits the output signal pMC from being reflected in the BA control when the readout inhibiting flag is "1". In the present embodiment, the readout inhibiting flag XPMCIH may be set to "1" in association with execution of the (I) start pressurizing mode, the (II) assist pressure increasing mode and the (V) assist pressure moderately increasing mode. Now a description will be given of a process performed by the ECU 10 so as to achieve these three modes while achieving the above-mentioned inhibiting function.

Figure 23:
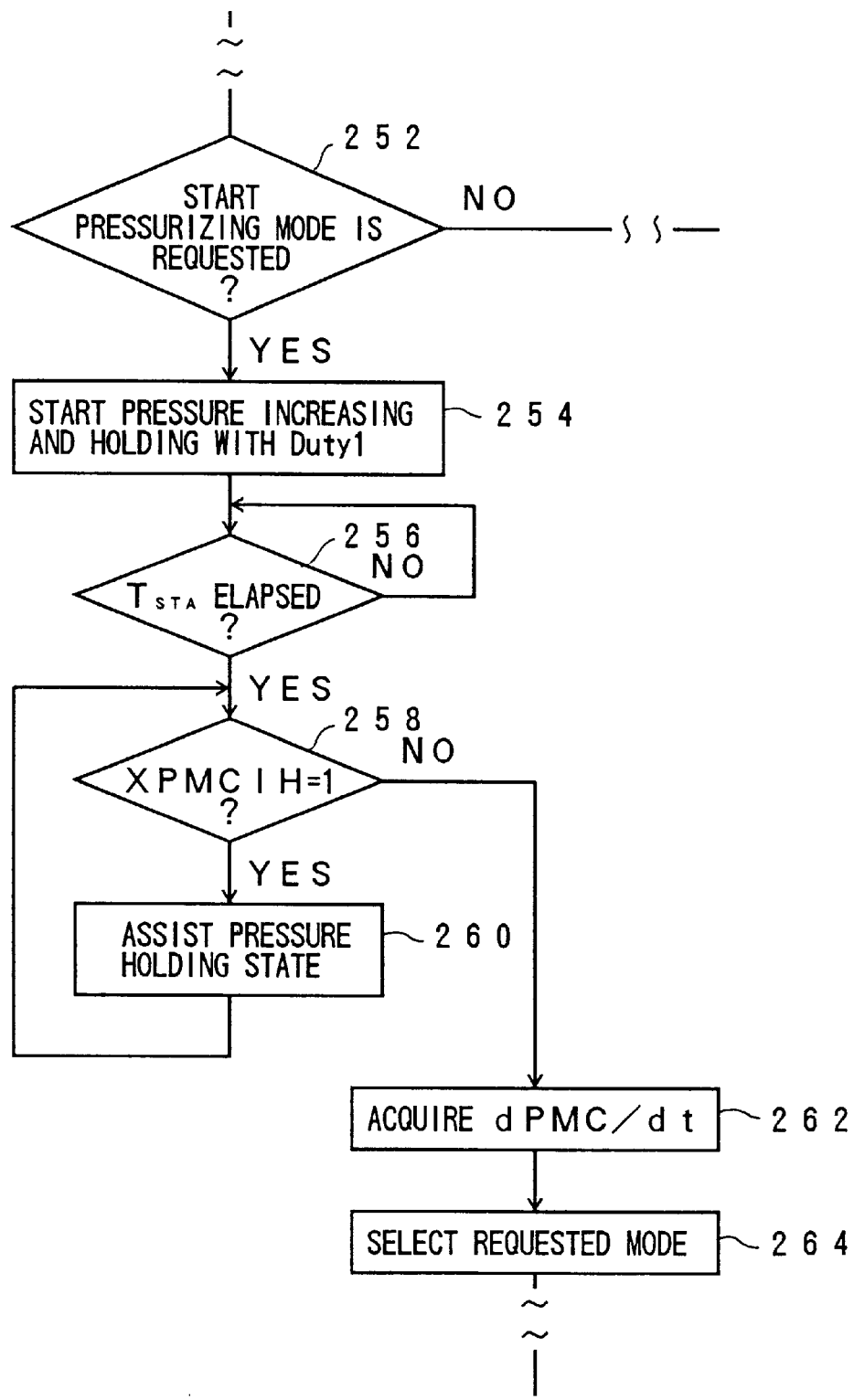
FIG. 23 is a flowchart of the processes performed so as to achieve the start pressurizing mode in third to fifth embodiments of the present invention.
Figure 24:
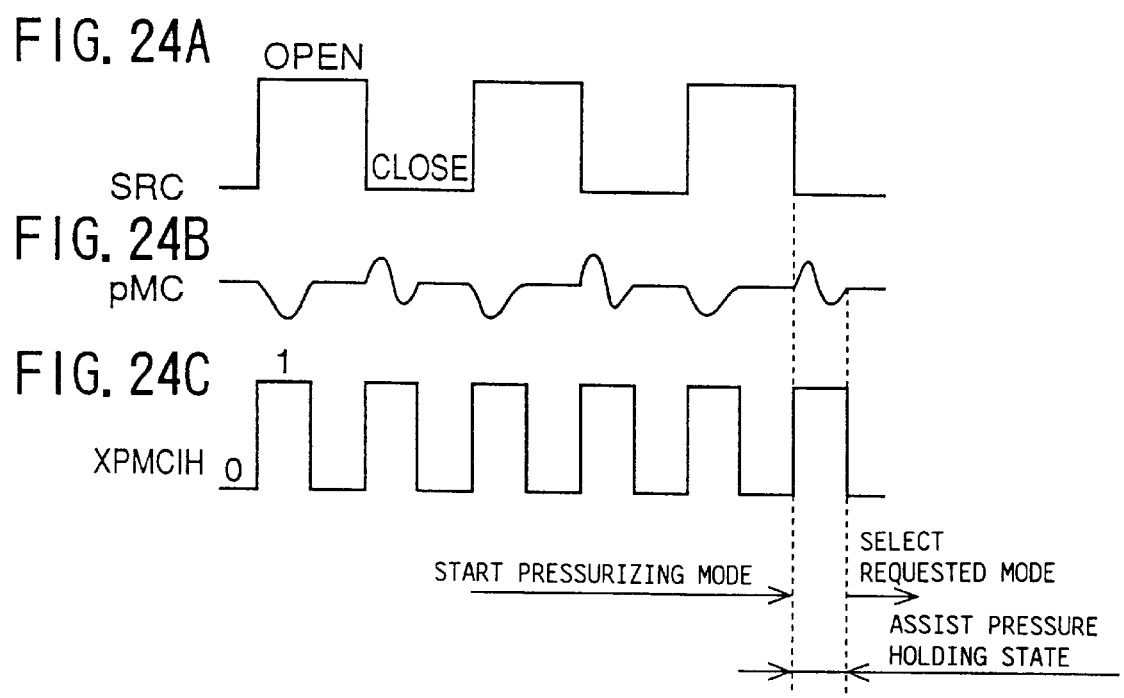
FIG. 24A is a time chart illustrating changes in the state of the reservoir cut solenoid valves $SRC_{-1}$ and $SRC_{-2}$ when the start pressurizing mode is performed.
FIG. 24B is a time chart illustrating changes in the output signal pMC of the fluid pressure sensor when the start pressurizing mode is performed.
FIG. 24C is a time chart illustrating changes generated in the readout inhibiting flag XPMCIH when the start pressurizing mode is performed.

FIG. 23 is a part of a flowchart of a main routine performed by the ECU 10. The ECU 10 achieves the (I) start pressurizing mode by performing the processes shown in FIG. 23. The processes shown in FIG. 23 are performed in a situation where a condition for executing the BA control is established, specifically, in a situation where it is determined that an emergency brake operation is being performed by the driver. The processes shown in FIG. 23 are started from step 252.

In step 252, it is determined whether or not the start pressurizing mode is requested. The start pressurizing mode is requested immediately after the emergency brake operation performed by the driver is detected. If, in step 252, it is determined that the start pressurizing mode is requested, then the process of step 254 is performed. On the other hand, if it is determined that the start pressurizing mode is not requested, processes not shown in FIG. 23 are performed thereafter.

In step 254, a control is started for alternately achieving the assist pressure increasing state shown in FIG. 2 and the assist pressure holding state shown in FIG. 3 with the predetermined duty ratio Duty1. After the process of step 254 is performed, $SRC_{-1}$ 32 and $SRC_{-2}$ 36 are repeatedly set to ON and OFF with the predetermined duty ratio Duty1 while $SMC_{-1}$ 30 and $SMC_{-2}$ 34 are maintained in an open state and the pumps 100 and 102 are maintained in operation. Thus, when the process of step 254 is performed, the wheel cylinder pressure $P_{W/C}$ is started to be increased to a pressure which is higher than the master cylinder pressure $P_{M/C}$ with a rate corresponding to the predetermined duty ratio Duty1.

In step 256, it is determined whether or not a predetermined time $T_{STA}$ has elapsed after the start pressurizing mode is started. The predetermined time $T_{STA}$ is a time for which the start pressurizing mode lasts. The process of step 256 is repeatedly performed until it is determined that the predetermined time $T_{STA}$ has elapsed. If it is determined that the predetermined time $T_{STA}$ has elapsed, then the process of step 258 is performed.

In step 258, it is determined whether or not the flag XPMCIH is set to "1", that is, whether or not the output signal pMC is inhibited from being read out. If it is determined that XPMCIH=1 is established, then the process of step 260 is performed.

In step 260, a process for setting the brake force control apparatus in the assist pressure holding state is performed. When the process of step 260 is finished, the process of the above-mentioned step 258 is performed again. According to the above-mentioned process, the brake force control apparatus can be maintained in the assist pressure holding state while XPMCIH=1 is established after the predetermined time $T_{STA}$ has elapsed.

If, in the above-mentioned step 258, it is determined that the readout inhibiting flag XPMCIH is not set to "1", then the process of step 262 is performed.

In step 262, the change rate $\Delta$pMC is acquired. The change rate $\Delta$pMC acquired in step 262 is a value calculated based on the output signal pMC which is obtained in a situation where the XPMCIH is not set to "1". Thus, the brake operating speed intended by the driver can be accurately detected based on the above-mentioned change rate $\Delta$pMC.

In step 264, the mode which should be performed subsequent to the start pressurizing mode is selected. Specifically, in step 264, the requested mode is selected based on the change rate $\Delta$pMC acquired in the above-mentioned step 262, in accordance with the map shown in FIG. 6. When the process of step 264 is finished, then processes not shown in FIG. 23 are performed thereafter.

FIG. 24A shows changes generated in the state of $SRC_{-1}$ 32 and $SRC_{-2}$ 36 during execution of the start pressurizing mode. Additionally, FIGS. 24B and 24C show changes generated in the output signal pMC and the readout inhibiting flag XPMCIH, respectively, when $SRC_{-1}$ 32 and $SRC_{-2}$ 36 are operated as shown in FIG. 24A According to the processes shown in FIG. 23, the assist pressure increasing state and the assist pressure holding state are alternately achieved with the predetermined duty ratio Duty1 independent of the state of the readout inhibiting flag XPMCIH until the predetermined time $T_{STA}$ has elapsed after the start pressurizing mode is started (steps 252 to 256). Additionally, the requested mode is selected after the readout inhibiting flag XPMCIH is reset to "0" (steps 258, 262, 264).

In this case, the mode to be performed next can be selected based on the output signal pMC after the pulsation in the master cylinder pressure $P_{M/C}$ has converged, that is, based on the output signal pMC which accurately corresponds to the amount of brake operation intended by the driver. Thus, according to the above-mentioned process, after the start pressurizing mode is ended at a time when the pulsation is generated in the output signal pMC, the requested mode can be set to a mode which satisfies the driver's intention.

Figure 25:
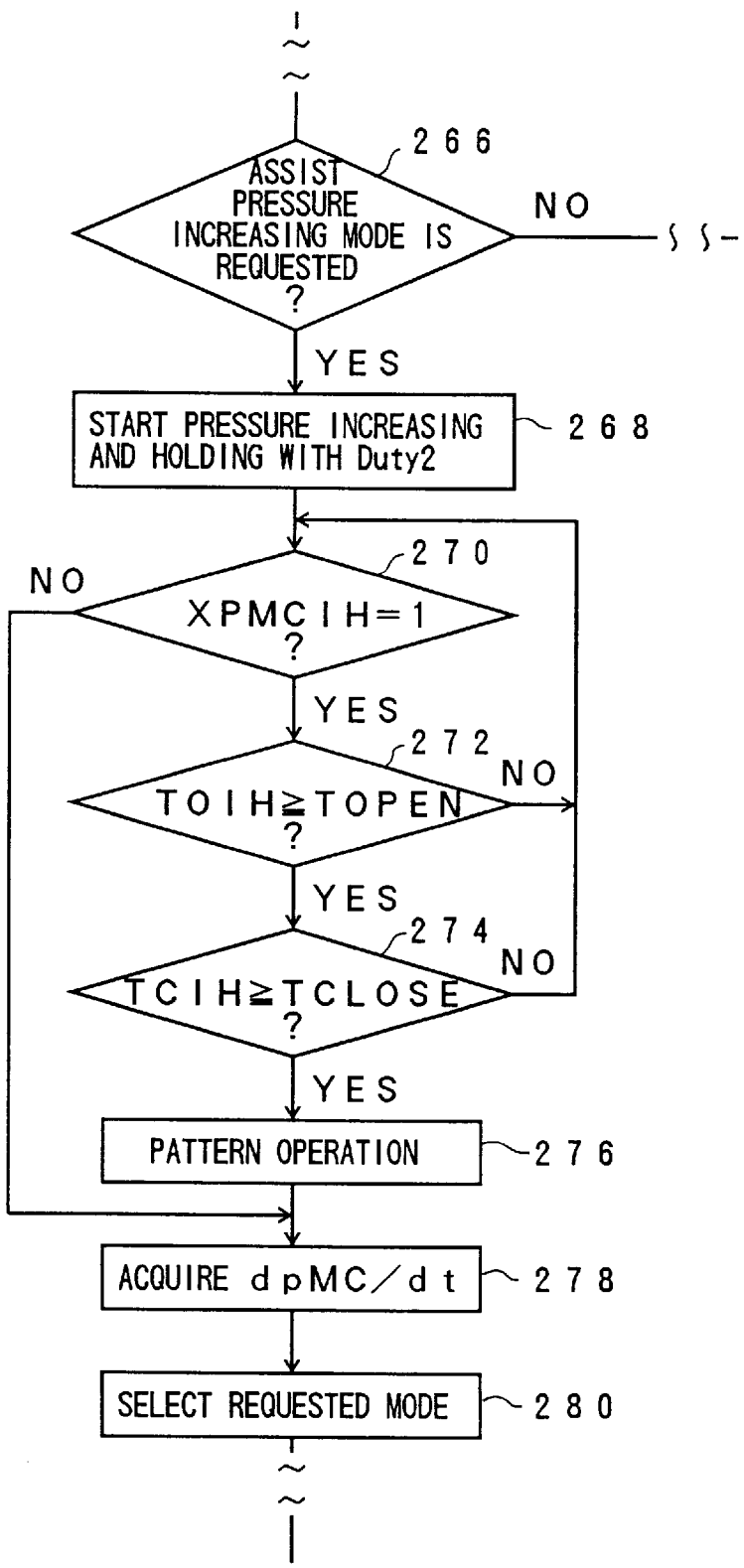
FIG. 25 is a flowchart of the processes performed so as to achieve the assist pressure increasing mode in the third to fifth embodiments of the present invention.
Figure 26:
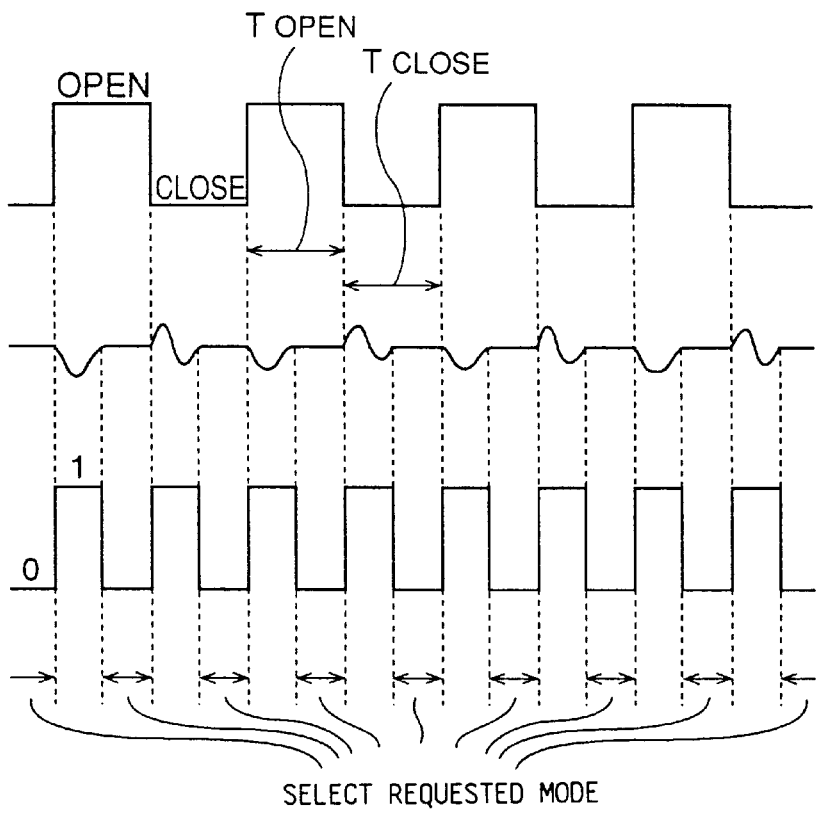
FIG. 26A is a time chart illustrating an example of changes in the state of the reservoir cut solenoid valves $SRC_{-1}$ and $SRC_{-2}$ when the assist pressure increasing mode is performed.
FIG. 26B is a time chart illustrating an example of changes in the output signal pMC of the fluid pressure sensor when the assist pressure increasing mode is performed.
FIG. 26C is a time chart illustrating an example of changes generated in the readout inhibiting flag XPMCIH when the assist pressure increasing mode is performed.
Figure 27:
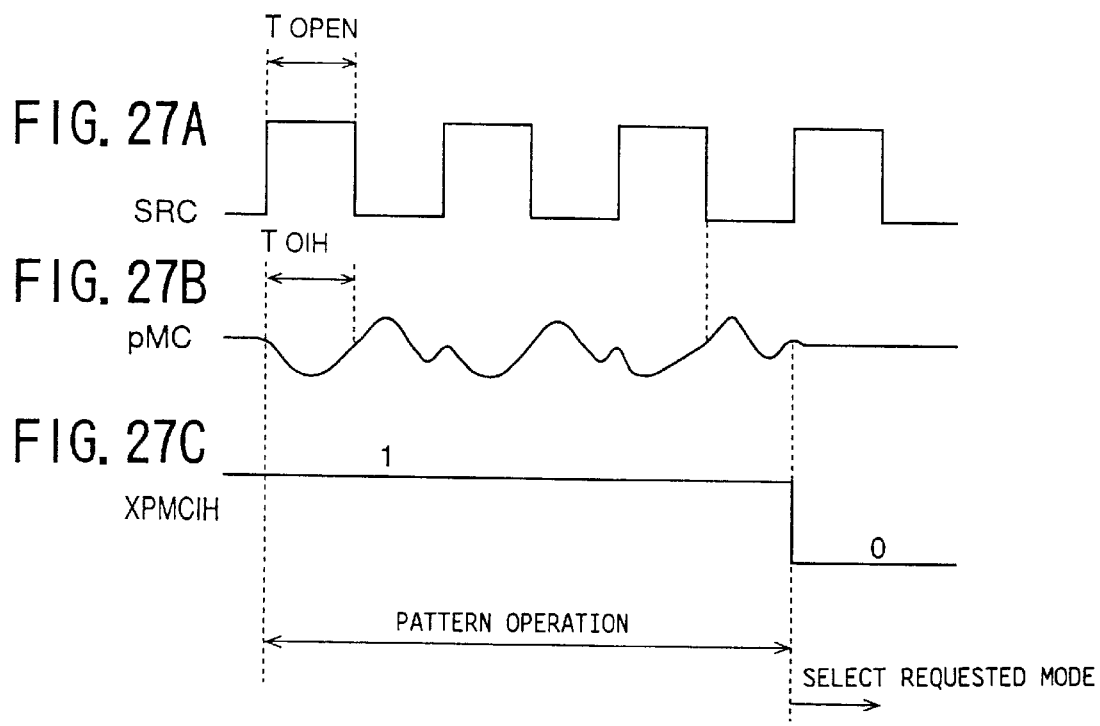
FIG. 27A is a time chart illustrating another example of changes in the state of the reservoir cut solenoid valves $SRC_{-1}$ and $SRC_{-2}$ when the assist pressure increasing mode is performed.
FIG. 27B is a time chart illustrating another example of changes in the output signal pMC of the fluid pressure sensor when the assist pressure increasing mode is performed.
FIG. 27C is a time chart illustrating another example of changes generated in the readout inhibiting flag XPMCIH when the assist pressure increasing mode is performed.

FIG. 25 is a flowchart of a part of the main routine performed by the ECU 10 so as to achieve the (II) assist pressure increasing mode. The processes shown in FIG. 25 are performed in a situation where the condition for executing the BA control is established. The processes shown in FIG. 25 are started from step 266.

In step 266, it is determined whether or not the assist pressure increasing mode is requested. If it is determined that the assist pressure increasing mode is requested, the process of step 268 is performed. On the other hand, if it is determined that the assist pressure increasing mode is not requested, processes not shown in FIG. 25 are performed thereafter.

In step 266, a control for alternately achieving the assist pressure increasing state shown in FIG. 2 and the assist pressure holding state shown in FIG. 3 with the predetermined duty ratio Duty2 is started.

Hereinafter, a time during which the assist pressure increasing state is maintained, that is, a time during which $SRC_{-1}$ 32 and $SRC_{-2}$ 36 are set in the open state in the above-mentioned control is referred to as a valve open time TOPEN. Additionally, a time during which the assist pressure holding state is maintained, that is, a time during which the $SRC_{-1}$ 32 and $SRC_{-2}$ 36 are set in the closed state in the above-mentioned control is referred to as a valve close time TCLOSE.

When the process of step 266 is performed, the wheel cylinder pressure $P_{W/C}$ of the respective wheels has started to be increased to a pressure which is higher than the master cylinder pressure $P_{M/C}$ with a rate corresponding to the predetermined duty ratio Duty2.

In step 270, it is determined whether or not the readout inhibiting flag XPMCIH is set to "1", that is, whether or not the output signal pMC is inhibited from being read. If it is determined that XPMCIH=1 is established, then the process of step 272 is performed. On the other hand, if it is determined that XPMCIH=1 is not established, steps 272 to 276 are skipped and the process of step 278 is performed.

In step 272, it is determined whether or not the open time inhibiting period TOIH calculated in step 228 shown in FIG. 20 is greater than or equal to the valve open time TOPEN. If it is determined that TOIH≧TOPEN is established, it can be determined that the output signal pMC is not permitted to be acquired during a time for which the assist pressure increasing state is maintained. In this case, the process of step 274 is performed.

In step 274, it is determined whether or not the close time inhibiting period TCIH calculated in step 242 shown in FIG. 20 is greater than or equal to the valve close time TCLOSE of $SRC_{-1}$ 32 and $SRC_{-2}$ 36. If it is determined that TCIH≧TCLOSE is established, it can be determined that the output signal pMC is not permitted to be acquired during a time for which the assist pressure holding state is maintained. In this case, the process of step 276 is performed.

That is, if both of the conditions in the above-mentioned steps 272 and 274 are established, it can be determined that the close time inhibiting period TOIH and the close time inhibiting period TCIH overlap each other at their start and end parts. In this case, the output signal pMC is not permitted to be acquired, that is, the readout inhibiting flag XPMCIH is not reset to "0" while the assist pressure increasing state and the assist pressure holding state are alternately achieved. Thus, the requested mode can not be selected while the assist pressure increasing state and the assist pressure holding state are alternately achieved. In this case, the process of step 276 is performed.

On the other hand, if at least one of the conditions in the above-mentioned steps 272 and 274 is not established, a period in which the output signal pMC is permitted to be acquired, that is, a period in which the readout inhibiting time is reset to "0" exists while the assist pressure increasing state and the assist pressure holding state are alternately achieved. Thus, the requested mode can be selected while the assist pressure increasing state and the assist pressure holding state are alternately achieved. In this case, the process of the above-mentioned step 270 is performed subsequent to step 272 or 274.

In step 276, a pattern operation of the brake force control apparatus is performed. Specifically, in step 276, a process is performed for alternately achieving the assist pressure increasing state and the assist pressure holding state with the predetermined duty ratio Duty2 and, thereafter, maintaining the brake force control apparatus in the assist pressure holding state at least for the close time inhibiting period TCIH. According to this process in step 276, it is possible to wait for the readout inhibiting flag XPMCIH to be reset to "0" after increasing the wheel cylinder pressure $P_{W/C}$ of the respective wheels by a predetermined pressure.

In step 278, the change rate dpMC/dt is acquired. The change rate dpMC/dt acquired in step 278 is calculated based on the output signal pMC which is obtained in a situation where the readout inhibiting flag XPMCIH is not set to "1". Thus, the brake operating speed intended by the driver can be accurately detected based on the above-mentioned change rate dpMC/dt.

In step 280, the requested mode is selected in accordance with the map shown in FIG. 7 based on the change rate dpMC/dt acquired in the above-mentioned step 278. After the process of step 280 is finished, processes not shown in FIG. 25 are performed thereafter.

FIG. 26A shows a time chart illustrating changes in the state of $SRC_{-1}$ 32 and $SRC_{-2}$ 36 during execution of the assist pressure increasing mode. FIG. 26B shows a time chart illustrating changes generated in the output signal pMC when the $SRC_{-1}$ 32 and $SRC_{-2}$ 36 are operated as shown in FIG. 26A. Additionally, FIG. 26C shows a time chart illustrating changes in the readout inhibiting flag XPMCIH during execution of assist pressure increasing mode. The time charts shown in FIGS. 26A to 26C are achieved when the output signal pMC fluctuates to such an extent that the open time inhibiting time TOIH and the close time inhibiting time TCIH do not overlap each other.

In a case where the open time inhibiting time TOIH and the close time inhibiting time TCIH do not overlap each other, a period in which the readout inhibiting flag XPMCIH is set to "0" occurs while the assist increasing state and the assist pressure holding state are alternately achieved, as shown in FIG. 26C. According to the processes shown in FIG. 25, when a period in which the readout inhibiting flag XPMCIH is set to "0" exists, the requested mode is selected based on the output signal pMC which is acquired during that period (steps 270, 278, 280).

According to the above-mentioned process, the mode which should be performed subsequent to the assist pressure increasing mode can be selected based on the output signal pMC which accurately corresponds to the amount of brake operation intended by the driver. Thus, according to the above-mentioned process, it is possible to perform the BA control in accordance with the driver's intention irrespective of the pumping-up associated decrease and the pulsation generated in the master cylinder pressure $P_{M/C}$ during execution of the assist pressure increasing mode.

FIGS. 27A to 27C show time charts illustrating changes in the state of $SRC_{-1}$ 32 and $SRC_{-2}$ 36, changes in output signal pMC, and changes in the readout inhibiting flag XPMCIH, respectively, during execution of the assist pressure increasing mode. The time charts shown in FIG. 27A to 27C are achieved when the output signal pMC fluctuates to such an extent that the open time inhibiting time TOIH and the close time inhibiting time TCIH overlap each other.

In a case where the open time inhibiting time TOIH and the close time inhibiting time TCIH overlap each other, the readout inhibiting flag XPMCIH is not set to "0" while the assist pressure increasing state and the assist pressure holding state are alternately achieved, as shown in FIG. 27C. In such a situation, according to the processes shown in FIG. 25, the pattern operation of the brake force control apparatus is performed (steps 270 to 276), and the mode to be performed subsequent to the assist pressure increasing mode is selected after the pulsation in the master cylinder pressure $P_{M/C}$ has converged (steps 278, 280).

Thus, according to the above-mentioned process, it is possible to perform the BA control in accordance with the driver's intention in a case where the master cylinder pressure $P_{M/C}$ fluctuates to a relatively great extent during execution of the assist pressure increasing mode due to the pumping-up associated decrease and the pulsation.

Figure 28:
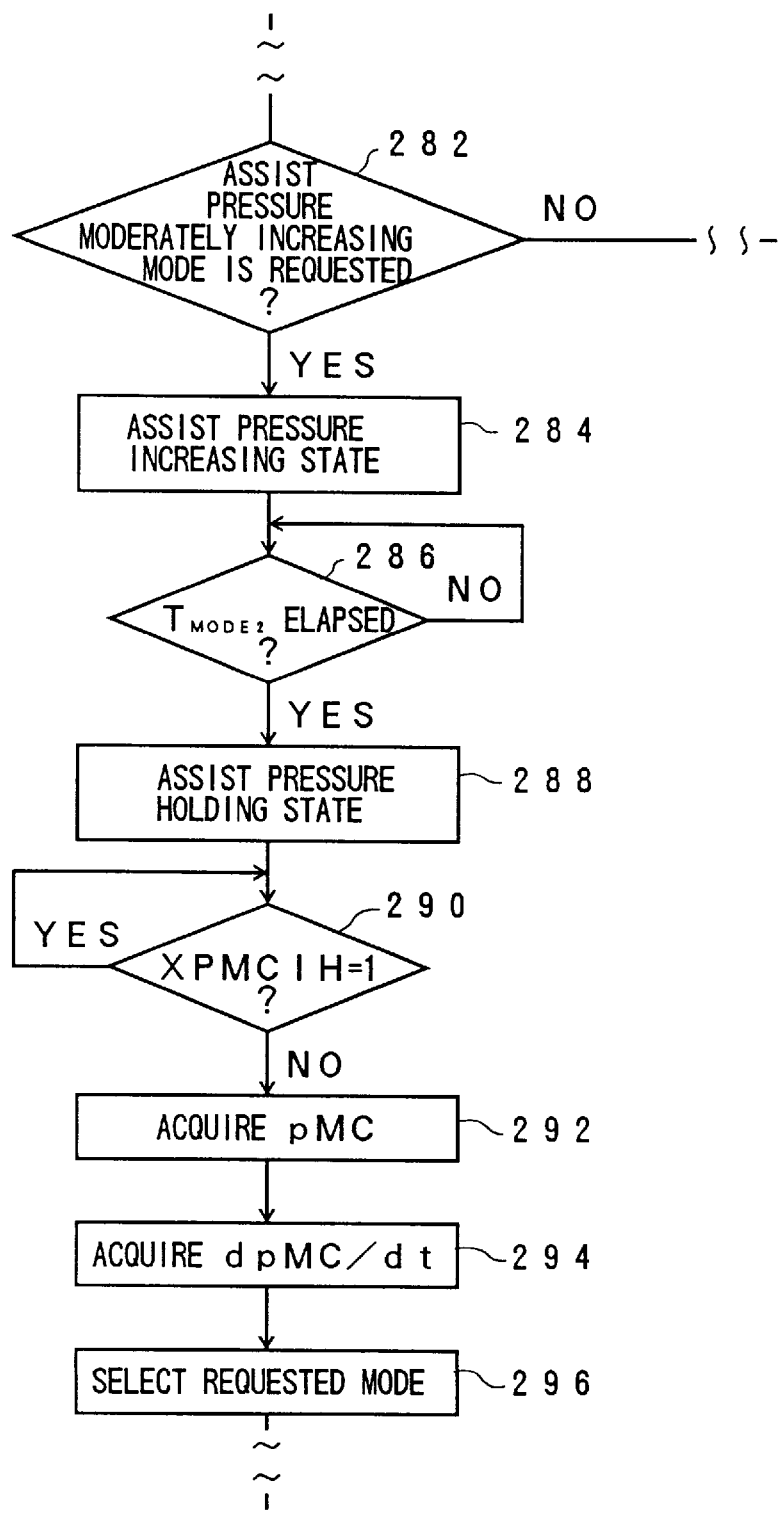
FIG. 28 is a flowchart of the processes performed so as to achieve the assist pressure moderately increasing mode in the third to fifth embodiments of the present invention.

FIG. 28 is a flowchart of a part of the main routine performed by the ECU 10. The ECU 10 achieves the (V) assist pressure moderately increasing mode by performing the processes shown in FIG. 28. The processes shown in FIG. 28 are performed in a situation where the condition for executing the BA control is established, and started from step 282.

In step 282, it is determined whether or not the assist pressure moderately increasing mode is requested. If it is determined that the assist pressure moderately increasing mode is requested, then the process of step 284 is performed. On the other hand, if it is determined that the assist pressure moderately increasing mode is not requested, processes not shown in FIG. 28 are performed thereafter.

In step 284, a process for setting the brake force control apparatus in the assist pressure increasing state shown in FIG. 2, that is, a process for turning on $SMC_{-1}$ 30, $SRC_{-1}$ 32, $SMC_{-2}$ 34 and $SRC_{-2}$ 36 and also turning on the pumps 10, 102 is performed. When the process of step 284 is performed, the wheel cylinder pressure $P_{W/C}$ of the respective wheels has started to be increased to a pressure which is higher than the master cylinder pressure $P_{M/C}$.

In step 286, it is determined whether or not the predetermined time $T_{MODE2}$ has elapsed after the assist pressure increasing state is achieved. As described above, the predetermined time $T_{MODE2}$ is a time for which the assist pressure increasing state should be maintained when the assist pressure moderately increasing mode is requested. The process of step 286 is repeatedly performed until it is determined that the predetermined time $T_{MODE2}$ has elapsed. If it is determined that the predetermined time $T_{MODE2}$ has elapsed, then the process of step 288 is preformed.

In step 288, a process for setting the brake force control apparatus in the assist pressure holding state is performed. After the process of step 288 is performed, the readout inhibiting flag XPMCIH is maintained to be "1" for the close time inhibiting period TCIH.

In step 290, it is determined whether or not the readout inhibiting flag XPMCIH is set to "1". The process of step 290 is repeatedly achieved until it is determined that XPMCIH=1 is not established. If it is determined that XPMCIH=1 is not established, then the process of step 292 is performed. According to the above-mentioned process, the brake force control apparatus can be maintained in the assist pressure holding state until the close time inhibiting period TCIH has elapsed after the assist pressure moderately increasing mode is started.

In step 292, the output signal pMC is acquired. The output signal pMC acquired in step 292 is a value after the readout inhibiting flag XPMCIH is reset to "0", that is, a value which accurately corresponds to the amount of brake operation intended by the driver. Thus, the amount of brake operation intended by the driver can be accurately detected based on the above-mentioned output signal pMC.

In step 294, the change rate dpMC/dt is acquired. The change rate dpMC/dt acquired in step 294 is a value calculated based on the output signal pMC which is obtained in a situation where the readout inhibiting flag XPMCIH is not set to "1". Thus, the brake operating speed intended by the driver can be accurately detected based on the above-mentioned change rate dpMC/dt.

In step 296, the mode to be performed subsequent to the assist pressure moderately increasing mode is selected. Specifically, in step 296, the requested mode is selected in accordance with the map shown in FIG. 10 based on the output signal pMC acquired in step 292 and the change rate dpMC/dt acquired in step 294. When the process of step 296 is finished, processes not shown in FIG. 28 are performed thereafter.

FIG. 29A shows a time chart illustrating changes in the state of $SRC_{-1}$ 32 and $SRC_{-2}$ 36 during execution of the assist pressure moderately increasing mode. Additionally, FIGS. 29B and 29C show time charts illustrating changes generated in the output signal pMC and the readout inhibiting flag XPMCIH, respectively, when $SRC_{-1}$ 32 and $SRC_{-2}$ 36 are operated as shown in FIG. 29A.

According to the processes shown in FIG. 28, the brake force control apparatus is maintained in the assist pressure increasing state independent of the state of the readout inhibiting flag XPMCIH until the predetermined time $T_{MODE2}$ has elapsed after the assist pressure moderately increasing mode is started (steps 282 to 286). And, when the predetermined time $T_{MODE2}$ has elapsed, the state of the brake force control apparatus is changed to the assist pressure holding state independent of the state of the readout inhibiting flag XPMCIH (step 288). Thus, according to the above-mentioned process, the wheel cylinder pressure $P_{W/C}$ of the respective wheels can be increased for a predetermined short time every time the assist pressure moderately increasing mode is requested.

Additionally, according to the processes shown in FIG. 28, the output signal pMC can be inhibited from being read out after the state of the brake force control apparatus is changed to the assist pressure holding state until the readout inhibiting flag XPMCIH is reset to "0", that is, until the output signal pMC accurately corresponds to the amount of brake operation intended by the driver (step 290). And, after the flag XPMCIH is reset to "0", the mode to be performed subsequent to the assist pressure moderately increasing mode can be selected based on the output signal pMC which accurately corresponds to the amount of brake operation performed by the driver (steps 292 to 296). Thus, according to the above-mentioned process, it is possible to perform the BA control in accordance with the driver's intention without being influenced by the pulsation in the master cylinder pressure $P_{M/C}$.

As described above, according to the brake force control apparatus of the present embodiment, it is possible to perform the BA control in which the driver's intention is accurately reflected irrespective of the fact that the output signal does not accurately correspond to the amount of brake operation intended by the driver temporarily when the state of the brake force control apparatus is changed between the assist pressure increasing state and the assist pressure holding state.

Now a description will be given, with reference to FIGS. 30A to 30C and 31, of a fourth embodiment of the present invention. The brake force control apparatus of the present embodiment is achieved by the ECU 10 performing the routine shown in FIG. 31 in the system structure shown in FIG. 1. In the above-mentioned third embodiment, the readout inhibiting time XPMCIH is maintained at "1" for the open time inhibiting period TOIH which is calculated based on the initial output value pMCON and the initial change rate ΔpMCON when the state of the brake force control apparatus is changed from the assist pressure holding state to the assist pressure increasing state. In the brake force control apparatus of the present embodiment, the time at which the readout inhibiting flag XPMCIH is changed from "1" to "0" is directly determined based on the changing trend of the output signal pMC in the above-mentioned situation.

FIG. 30A shows a time chart illustrating changes in the state of $SRC_{-1}$ 32 and $SRC_{-2}$ 36 when the state of the brake force control apparatus is changed from the assist pressure holding state to the assist pressure increasing state. Additionally, FIG. 30B shows a time chart illustrating changes generated in the output signal pMC when $SRC_{-1}$ 32 and $SRC_{-2}$ 36 are operated as shown in FIG. 30A. Further, FIG. 30C shows a time chart illustrating changes generated in the readout inhibiting flag XPMCIH when the output signal pMC changes as shown in FIG. 30B.

When the state of the brake force control apparatus is changed from the assist pressure holding state to the assist pressure increasing state, the pumps 100, 102 start to pump up the brake fluid. The pumping efficiency of the pumps 100, 102 reaches a normal value when a certain time has elapsed after the assist pressure increasing state is achieved. The master cylinder pressure $P_{M/C}$ continues to be increased while the pumping efficiency of the pumps 100, 102 is low, and thereafter starts to be decreased. Thus, the output signal pMC exhibits a maximal value after start of the assist pressure increasing state, as shown in FIG. 30B.

After having started to be decreased, the master cylinder pressure $P_{M/C}$ continues to be decreased until the amount of the brake fluid pumped up by the pumps 100, 102 is balanced with the brake operating speed performed by the driver. When the balance is achieved, the master cylinder pressure $P_{M/C}$ is temporarily increased, and thereafter converges to a pressure corresponding to the amount of brake operation performed by the driver. Thus, the output signal pMC converges to a value which accurately corresponds to the amount of brake operation intended by the driver after exhibiting a minimal value, as shown in FIG. 30B.

Accordingly, in the brake force control apparatus of the present embodiment, it can be determined that the output signal pMC does not accurately correspond to the amount of brake operation intended by the driver until a predetermined time $T_D$ has elapsed after the output signal pMC exhibits a minimal value after start of the assist pressure increasing state. For this reason, the ECU 10 maintains the readout inhibiting flag XPMCIH at "1" until the predetermined time $T_D$ has elapsed after the output signal pMC exhibits a minimal value after the state of the brake force control apparatus is changed from the assist pressure holding state to the assist pressure increasing state.

If the period for which the readout inhibiting flag XPMCIH is maintained at "1" is determined based on the initial output value pMCON and the initial change rate ΔpMCON as in the case of the third embodiment, it is impossible to compensate errors generated due to variations in the performance of the pumps 100, 102. On the contrary, if the readout inhibiting flag XPMCIH is directly processed based on changes in the output signal pMC as in the present embodiment, it is possible to achieve a correspondence between a period during which the flag XPMCIH is maintained at "1" and a period during which the output signal pMC does not corresponds to the amount of brake operation, irrespective of variations in the performance of the pumps 100, 102.

Figure 31:
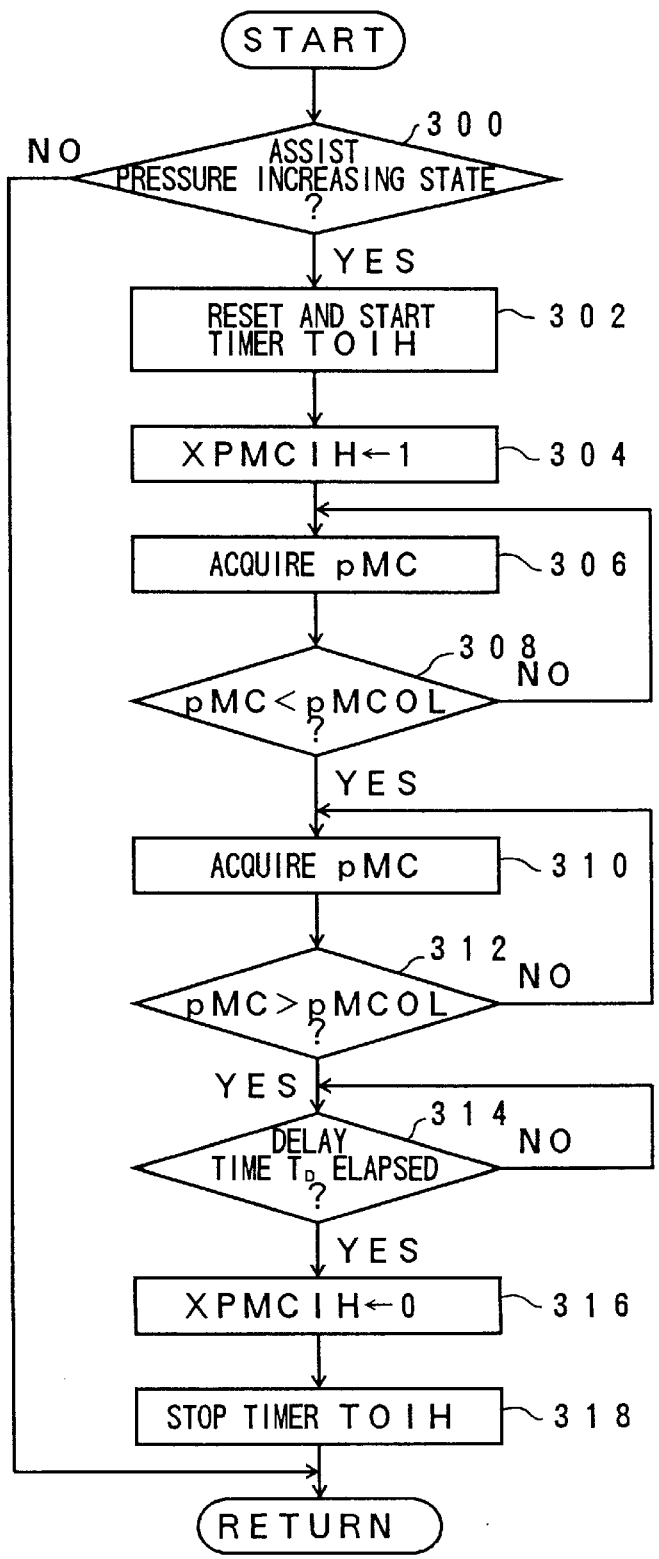
FIG. 31 is a flowchart of an example of a control routine performed so as to process the readout inhibiting flag XPMCIH in the fourth embodiment of the present invention.

FIG. 31 is a flowchart of an example of a control routine performed by the ECU 10 so as to achieve the above-mentioned function. The routine shown in FIG. 31 is repeatedly started every time it is ended. When the routine shown in FIG. 31 is started, the process of step 300 is performed first.

In step 300, it is determined whether or not the assist pressure increasing state is achieved. If it is determined that the assist pressure increasing state is not achieved, no further process is performed thereafter and the present routine is ended. On the other hand, if it is determined that the assist pressure increasing state is achieved, then the process of step 302 is performed. In step 302, a timer TOIH is reset and started. The timer TOIH is a timer for counting the open time inhibiting period during which the readout inhibiting flag XPMCIH is maintained at "1", that is, the output signal pMC is inhibited from being read out after the assist pressure increasing state is started. In the present embodiment, the ECU 10 performs the processes shown in FIGS. 23, 25 and 28, as in the case of the third embodiment. The open time inhibiting period which is counted by the timer TOIH is used in step 272 shown in FIG. 25 for being compared with the valve open time TOPEN.

In step 304, the readout inhibiting flag XPMCIH is set to "1". According to this process, XPMCIH can be set to "1" immediately after the assist pressure increasing state is started.

In step 306, the output signal pMC is acquired. In step 308, it is determined whether or not the output signal pMC acquired in the present process cycle is smaller than the output signal pMCOL acquired in the previous process cycle. If it is determined that pMC<pMCOL is not established, it can be determined that the output signal pMC is being increased. In this case, the process of the above-mentioned step 306 is performed again. On the other hand, if it is determined that pMC<pMCOL is established, it can be determined that the output signal pMC has changed its changing trend from increase to decrease, that is, the output signal pMC has exhibited a maximal value. In this case, the process of step 310 is performed.

In step 310, the output signal pMC is acquired again. In step 312, it is determined whether or not the output signal pMC acquired in the present process cycle is greater than the output signal pMCON acquired in the previous process cycle. If it is determined that the pMC>pMCOL is not established, it can be determined that the output signal pMC is being decreased. In this case, the process of the above-mentioned step 310 is performed again. On the other hand, if it is determined that pMC>pMCOL is established, it can be determined that the output signal pMC has changed its changing trend from decrease to increase, that is, the output signal pMC has exhibited a minimal value. In this case, the process of step 314 is performed.

In step 314, it is determined whether or not the predetermined delay time $T_D$ has elapsed after the output signal pMC has exhibited the minimal value. This process of step 314 is repeatedly performed until it is determined that the delay time $T_D$ has elapsed. If it is determined that the delay time $T_D$ has elapsed, then the process of step 316 is performed.

In step 316, the readout inhibiting flag XPMCIH is reset to "0". According to this process, the readout inhibiting flag XPMCIH can be reset to "0" at a time when the delay time $T_D$ has elapsed after the output signal pMC has exhibited the minimal value.

In step 218, the timer TOIH is stopped. According to this process, the timer TOIH can count the period during which the readout inhibiting flag XPMCIH is maintained at "1". When the process of step 318 is finished, the present routine is ended.

As described above, according to the brake force control apparatus of the present embodiment, it is possible to detect the period during which the output signal pMC does not accurately correspond to the amount of brake operation intended by the driver directly based the changes in the output signal pMC, and maintain the readout inhibiting flag XPMCIH at "1" only during the detected period. Thus, according to the brake force control apparatus of the present embodiment, it is possible to accurately perform the BA control in accordance with the driver's intention without being influenced by variations in the performance of the components in the system.

Now a description will be given, with reference to FIG. 32, of a fifth embodiment of the present invention. The brake force control apparatus of the present embodiment is achieved by the ECU 10 performing the control routine shown in FIG. 32 in the system structure shown in FIG. 1. In the brake force control apparatus of the present embodiment, the readout inhibiting flag is processed directly based on changes in the output signal pMC by using a different scheme from that used in the fourth embodiment.

Figure 32:
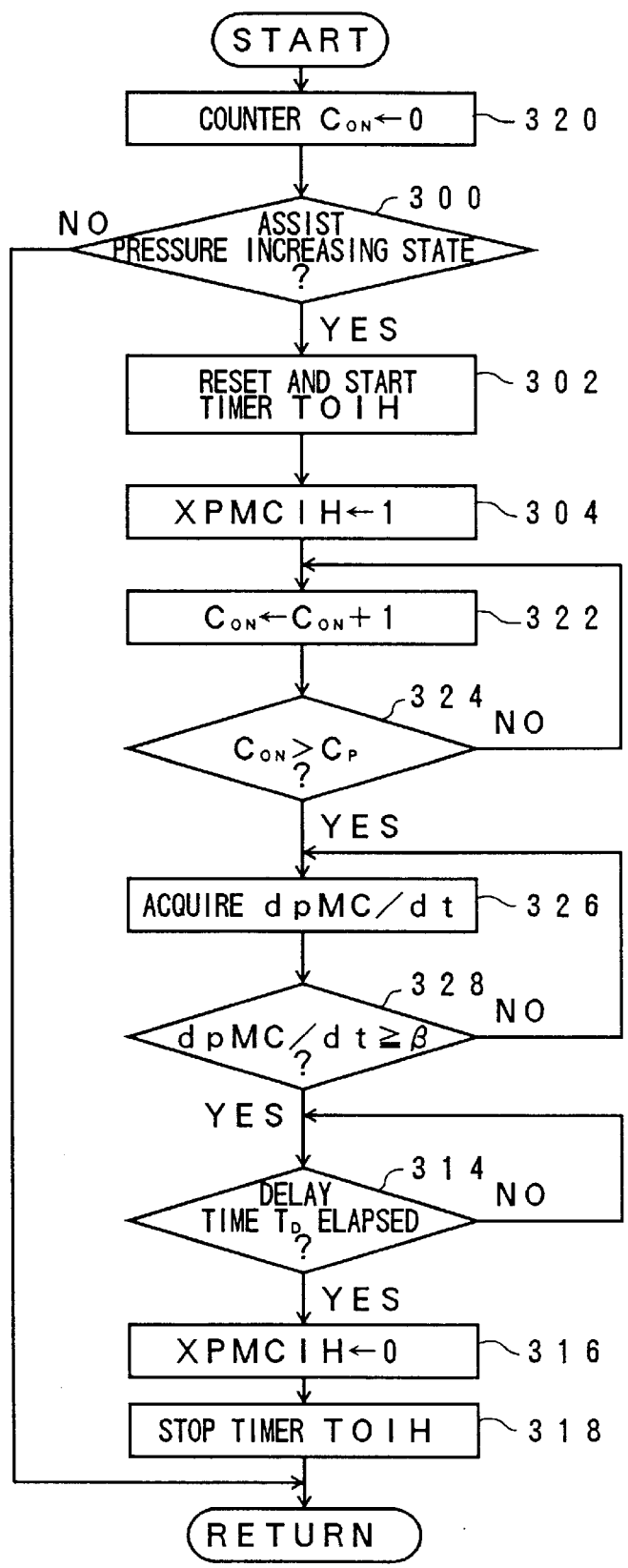
FIG. 32 is a flowchart of an example of a control routine performed so as to process the readout inhibiting flag XPMCIH in the fifth embodiment of the present invention.

FIG. 32 is a flowchart of an example of a control routine performed by the ECU 10 so as to process the readout inhibiting flag XPMCIH. The routine shown in FIG. 32 is repeatedly started every time it is ended. In FIG. 32, steps which perform the same process as corresponding steps shown in FIG. 31 are given the same reference numbers and descriptions thereof will be omitted.

When the routine shown in FIG. 32 is started, the process of step 320 is performed first. In step 320, a counter $C_{ON}$ is reset to "0". The counter $C_{ON}$ is a counter for counting the time which has elapsed after the state of the brake force control apparatus is changed to the assist pressure increasing state.

In the present embodiment, after the processes of steps 300 to 304 are performed subsequent to the above-mentioned step 320, the process of step 322 is performed.

In step 322, the counter $C_{ON}$ is incremented. In step 324, it is determined whether or not the count value of the counter $C_{ON}$ is greater than a predetermined value Cp. The predetermined value Cp is a value greater than a time which is taken for the output signal pMC to reach a maximal value after the assist pressure increasing state is started. If it is determined that $C_{ON}$>Cp is not established in step 324, the ECU 10 judges that the output signal pMC has not yet reached a maximal value. In this case, the process of the above-mentioned step 322 is performed again. On the other hand, if it is determined that $C_{ON}$>Cp is established, the ECU 10 judges that the output signal pMC has started to be decreased. In this case, the process of step 326 is performed.

In step 326, the change rate dpMC/dt is acquired. In step 328, it is determined whether or not the change rate dpMC/dt is greater than or equal to a predetermined value $\beta (\geq 0)$. If it is determined that dpMC/dt$\geq \beta$ is not established, it can be determined that the output signal pMC is being decreased. In this case, the process of the above-mentioned step 326 is performed again. On the other hand, if it is determined that dpMC/dt$\geq \beta$ is established, it can be determined that the output signal has changed its trend from decrease to increase, that is, the output signal has exhibited a minimal value. In this case, the processes of steps subsequent to step 214 are performed thereafter.

According to the above-mentioned processes, the readout inhibiting flag can be maintained at "1" only during a period until the predetermined time $T_D$ has elapsed after the output signal pMC has exhibited a minimal value after start of the assist pressure increasing state, as in the case of the fourth embodiment. Thus, according to the brake force control apparatus of the present embodiment, it is possible to accurately perform the BA control in accordance with the driver's intention without being influences variations in the performance of the components in the system.

The present invention is not limited to these embodiments, but variations and modifications may be made without departing from the scope of the present invention.

The present application is based on Japanese priority applications No. 9-182822 and No. 9-182823 filed on Jul. 8, 1987, the entire contents of which are hereby incorporated by reference.

What is claimed is:

1. A brake force control apparatus comprising:

a master cylinder;

a wheel cylinder;

a fluid pressure passage connecting said master cylinder and said wheel cylinder;

a pump for pumping up brake fluid from said fluid pressure passage;

a fluid pressure sensor for generating an output signal corresponding to a master cylinder pressure;

a brake assist control means for supplying the brake fluid delivered by said pump to the wheel cylinder when an emergency brake operation is performed by a driver based on said output signal; and inhibiting means for inhibiting said output signal from being used when the master cylinder pressure fluctuates due to pumping up of the brake fluid by said pump.

2. A brake force control apparatus comprising:

a master cylinder:

a wheel cylinder;

a fluid pressure passage connecting the master cylinder and the wheel cylinder;

a pump for pumping up brake fluid from the fluid pressure passage;

a fluid pressure sensor for generating an output signal corresponding to a master cylinder pressure;

brake assist control means for supplying the brake fluid delivered by said pump to the wheel cylinder through execution of a brake assist control when an emergency brake operation is performed by a driver;

control signal generating means for determining an amount of decrease in the master cylinder pressure in the fluid pressure passage at a start of the execution of the brake assist control, and for generating a control signal by adding the determined amount of decrease to the output signal; and fluid pressure control means for carrying out the execution of the brake assist control based on said control signal.

3. The brake force control apparatus as claimed in claim 2, wherein said control signal generating means comprises:
  minimal value detecting means for detecting a minimal value which is generated in said output signal after said pump has started to pump up the brake fluid;
  pressure decrease determining means for determining an amount of decrease generated in said output signal until said output signal reaches said minimal value; and
  first generating means for correcting said output signal based on said amount of decrease, determined by said pressure decrease determining means, after said minimal value is detected.

4. A brake force control apparatus comprising:
  a master cylinder:
  a wheel cylinder:
  a fluid pressure passage connecting the master cylinder and the wheel cylinder:
  a pump for pumping up brake fluid from the fluid pressure passage:
  a fluid pressure sensor for generating an output signal corresponding to a master cylinder pressure:
  brake assist control means for supplying the brake fluid delivered by said pump to the wheel cylinder through execution of a brake assist control when an emergency brake operation is performed by a driver:
  control signal generating means for determining an amount of decrease in the master cylinder pressure in the fluid pressure passage, caused at a start of the execution of the brake assist control, and for generating a control signal by adding the determined amount of decrease to the output signal; and
  fluid pressure control means for carrying out the execution of brake assist control based on said control signal, wherein said control signal generating means comprises first generating means for maintaining said control signal at a constant value after said pump has started to pump up the brake fluid.

5. The brake force control apparatus as claimed in claim 4, wherein said control signal generating means further comprises:
  second generating means for setting said control signal to be equal to said output signal when said output signal exceeds a predetermined value.

6. The brake force control apparatus as claimed in claim 4, wherein said control signal generating means further comprises:
  second generating means for, when a decrease exceeding a guard value is generated in said output signal, setting said control signal to a value which is a sum of said output signal and said guard value.

7. The brake force control apparatus as claimed in claim 6, wherein said control signal generating means further comprises:
  first setting means for setting said guard value based on a time for which said pump continuously pumps up the brake fluid.

8. The brake force control apparatus as claimed in claim 6, wherein said fluid pressure control means achieves a plurality of modes having different times for which said pump continuously pumps up the brake fluid, and wherein said control signal generating means further comprises:
  first setting means for setting said guard value based on the mode performed by said fluid pressure control means.

9. The brake force control apparatus as claimed in claim 6, wherein said control signal generating means further comprises:
  initial fluid pressure detecting means for detecting an initial fluid pressure based on the output signal which is output by said fluid pressure sensor at a time when said pump starts to pump up the brake fluid; and
  second setting means for setting said guard value based on said initial fluid pressure.

10. A brake force control apparatus comprising:
  a master cylinder:
  a wheel cylinder:
  a fluid pressure passage connecting the master cylinder and the wheel cylinder;
  a pump for pumping up brake fluid from the fluid pressure passage;
  a fluid pressure sensor for generating an output signal corresponding to a master cylinder pressure;
  brake assist control means for supplying the brake fluid delivered by said pump to the wheel cylinder through execution of a brake assist control when an emergency brake operation is performed by a driver;
  control signal generating means for determining an amount of decrease in the master cylinder pressure in the fluid pressure passage, caused at a start of the execution of the brake assist control, and for generating a control signal by adding the determined amount of decrease to the output signal; and
  fluid pressure control means for carrying out the execution of brake assist control based on said control signal, wherein said control signal generating means comprises:
    first generating means for maintaining said control signal at a constant value until a predetermined time has elapsed after said pump has started to pump up the brake fluid; and
    second generating means for setting said control signal to be equal to said output signal.

11. The brake force control apparatus as claimed in claim 2, further comprising:
  a valve provided in said fluid pressure passage between the master cylinder and the wheel cylinder;
  wherein said fluid pressure sensor and an inlet of said pump are connected to a part of said fluid pressure passage between said valve and the master cylinder.

12. A brake force control apparatus which comprises a pump for pumping up brake fluid from a fluid pressure passage connecting a master cylinder and a wheel cylinder and performs a brake assist control for supplying the brake fluid delivered by said pump to the wheel cylinder when an emergency brake operation is performed by a driver, further comprising:
  a valve for connecting or disconnecting said fluid pressure passage and said pump;
  control means for executing said brake assist control based on a master cylinder pressure; and
  inhibiting means for inhibiting execution of said brake assist control based on the master cylinder pressure for a predetermined inhibited period when the state of said valve is changed.

13. The brake force control apparatus as claimed in claim 12, further comprising:
  inhibited period setting means for setting said inhibited period based on at least one of the master cylinder pressure at a time when the pump starts to pump up the brake fluid and a change rate of the master cylinder pressure at that time.

14. The brake force control apparatus as claimed in claim 12, further comprising:

fluid pressure changing trend detecting means for detecting a changing trend in the master cylinder pressure;

inverting time detecting means for detecting an inverting time at which the master cylinder pressure changes its changing trend from decrease to increase after said pump has started to pump up the brake fluid based on said changing trend; and inhibited time setting means for defining said inhibited period as a period after said inverting time until a predetermined time has elapsed.

15. The brake force control apparatus as claimed in claim 4, wherein said control signal generating means further comprises:

second generating means for maintaining said control signal at a constant value until a predetermined time has elapsed after said pump has stopped pumping up the brake fluid; and third generating means for setting said control signal to be equal to said output signal.

16. The brake force control apparatus as claimed in claim 10, wherein said control signal generating means further comprises third generating means for maintaining the control signal at a constant value after the pump has started to pump up the brake fluid.

* * * * *

UNITED STATES PATENT AND TRADEMARK OFFICE
CERTIFICATE OF CORRECTION

PATENT NO. : 6,170,924 B1
DATED : January 9, 2001
INVENTOR(S) : Nobuyasu Nakanishi et al.

Page 1 of 1

It is certified that error appears in the above-identified patent and that said Letters Patent is hereby corrected as shown below:

Column 13,
Line 9, change "$_2$32" to -- $_2$ 32 --.

Column 22,
Line 1, change "Instep" to -- In step --.
Line 29, change "①" to -- ② --.

Column 27,
Line 1, change "Instep" to -- In step --.

Signed and Sealed this

Fourteenth Day of May, 2002

Attest:

JAMES E. ROGAN
Attesting Officer    Director of the United States Patent and Trademark Office